(12) United States Patent
Mao et al.

(10) Patent No.: US 11,751,100 B2
(45) Date of Patent: Sep. 5, 2023

(54) TECHNIQUES FOR INTEGRATED ACCESS AND BACKHAUL (IAB) NODES

(71) Applicant: Intel Corporation, Santa Clara, CA (US)

(72) Inventors: Wei Mao, San Jose, CA (US); Murali Narasimha, Lake Oswego, OR (US); Jaemin Han, Portland, OR (US); Meryem Simsek, San Jose, CA (US); Hosein Nikopour, San Jose, CA (US); Sudeep Palat, Cheltenham (GB); Navid Naderializadeh, Woodland Hills, CA (US)

(73) Assignee: Intel Corporation, Santa Clara, CA (US)

( * ) Notice: Subject to any disclaimer, the term of this patent is extended or adjusted under 35 U.S.C. 154(b) by 191 days.

(21) Appl. No.: 17/014,945

(22) Filed: Sep. 8, 2020

(65) Prior Publication Data

US 2021/0058826 A1    Feb. 25, 2021

Related U.S. Application Data

(60) Provisional application No. 62/925,545, filed on Oct. 24, 2019, provisional application No. 62/909,068, (Continued)

(51) Int. Cl.
*H04W 28/08*    (2023.01)
*H04W 28/086*   (2023.01)
*H04W 84/04*    (2009.01)

(52) U.S. Cl.
CPC ... *H04W 28/0933* (2020.05); *H04W 28/0804* (2020.05); *H04W 84/047* (2013.01)

(58) Field of Classification Search
CPC ......... H04W 28/0808; H04W 28/0842; H04W 28/0933; H04W 24/02; H04W 28/0804; H04W 84/047; H04W 84/042; H04W 40/248; H04W 88/14; H04W 28/0268; H04W 40/12; H04W 40/24; H04W 40/22; H04L 45/24; H04L 45/22
See application file for complete search history.

(56) References Cited

U.S. PATENT DOCUMENTS 11,115,856 B2 *  9/2021  Chen ................. H04W 72/0486
11,212,858 B2 * 12/2021  Novlan ................ H04B 7/0695
(Continued)

OTHER PUBLICATIONS

3GPP, "Technical Specification Group Radio Access Network; NG-RAN; F1 application protocol (F1AP) (Release 15)," 3GPP TS 38.473 V15.6.0 (Jul. 2019), 5G, 220 pages.
(Continued)

*Primary Examiner* — Jung Liu
(74) *Attorney, Agent, or Firm* — Schwabe, Williamson & Wyatt, P.C.

(57) ABSTRACT

Various embodiments herein provide techniques for integrated access and backhaul (IAB) nodes. For example, embodiments include techniques associated with: rate-proportional routing for network coding; utilizing multiple routes in IAB networks; user equipment (UE) and parent selection for efficient topology in IAB networks; establishing efficient IAB topologies; and/or adaptive coded-forwarding for network coding. Other embodiments may be described and claimed.

11 Claims, 31 Drawing Sheets

Related U.S. Application Data filed on Oct. 1, 2019, provisional application No. 62/909,067, filed on Oct. 1, 2019, provisional application No. 62/908,379, filed on Sep. 30, 2019, provisional application No. 62/898,386, filed on Sep. 10, 2019.

(56) References Cited

U.S. PATENT DOCUMENTS

| | | | |
|---|---|---|---|
| 11,284,327 B2* | 3/2022 | Cho | H04L 45/22 |
| 2021/0243672 A1* | 8/2021 | Deshmukh | H04W 40/248 |
| 2021/0250804 A1* | 8/2021 | Chen | H04W 72/0486 |
| 2021/0315030 A1* | 10/2021 | Teyeb | H04L 61/5076 |
| 2021/0377784 A1* | 12/2021 | Marco | H04W 28/10 |
| 2021/0378035 A1* | 12/2021 | Zhu | H04W 36/0055 |
| 2022/0070696 A1* | 3/2022 | Jung | H04W 24/02 |
| 2022/0070959 A1* | 3/2022 | Jung | H04W 76/19 |
| 2022/0078865 A1* | 3/2022 | Novlan | H04W 76/15 |
| 2022/0124502 A1* | 4/2022 | Jactat | H04W 12/106 |
| 2022/0174630 A1* | 6/2022 | Wei | H04W 56/0015 |
| 2022/0182917 A1* | 6/2022 | Muhammad | H04L 45/42 |
| 2022/0201777 A1* | 6/2022 | Teyeb | H04W 76/20 |
| 2022/0303209 A1* | 9/2022 | Zou | H04W 40/04 |
| 2022/0303867 A1* | 9/2022 | Majmundar | H04W 40/22 |

OTHER PUBLICATIONS

Wei Mao et al. "Rate-proportional Routing for Network Coding", U.S. Appl. No. 62/898,386, filed Sep. 10, 2019, 67 pages.

* cited by examiner

*Integration procedure for IAB node (TS 38.401)*

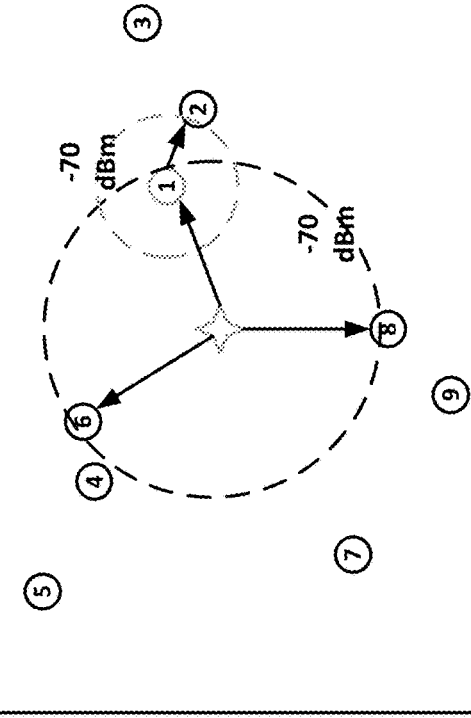
Figure 16B: Step 2
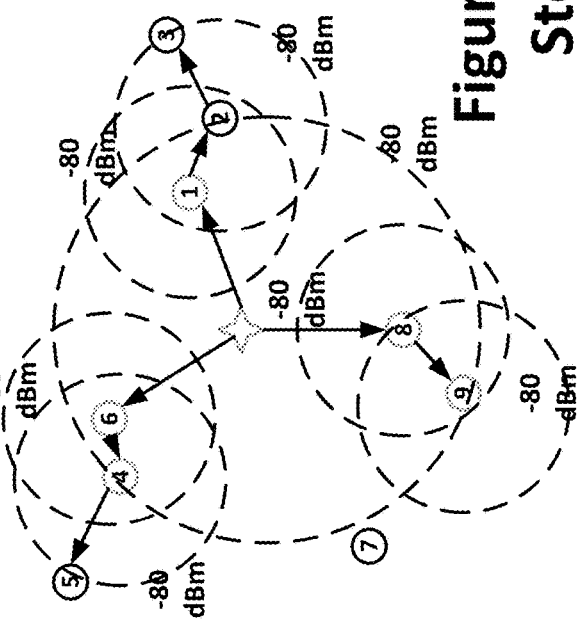
Figure 16D: Step 4
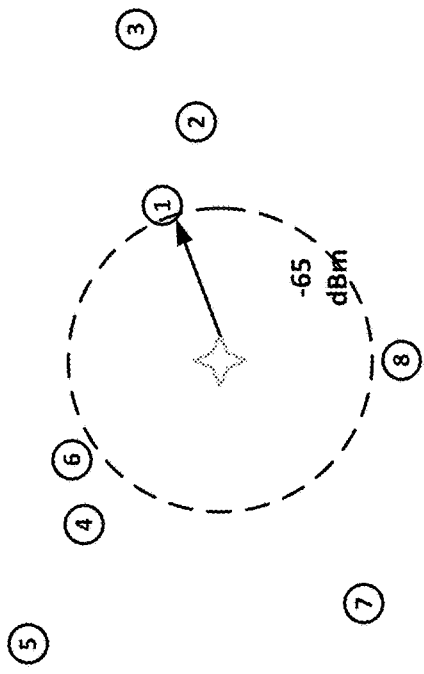
Figure 16A: Step 1
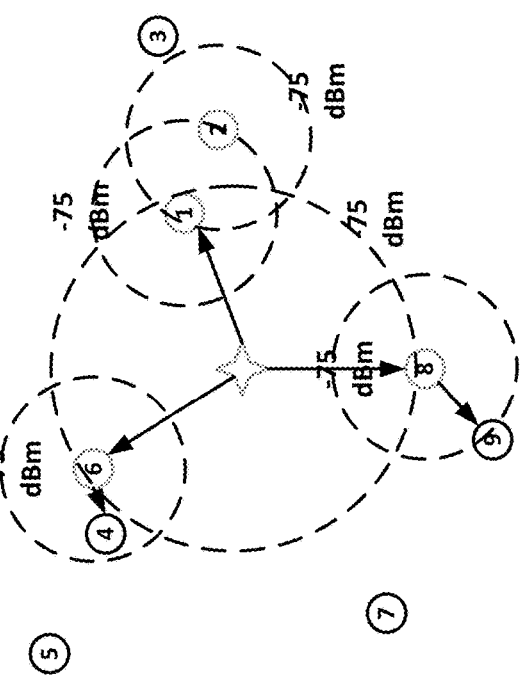
Figure 16C: Step 3

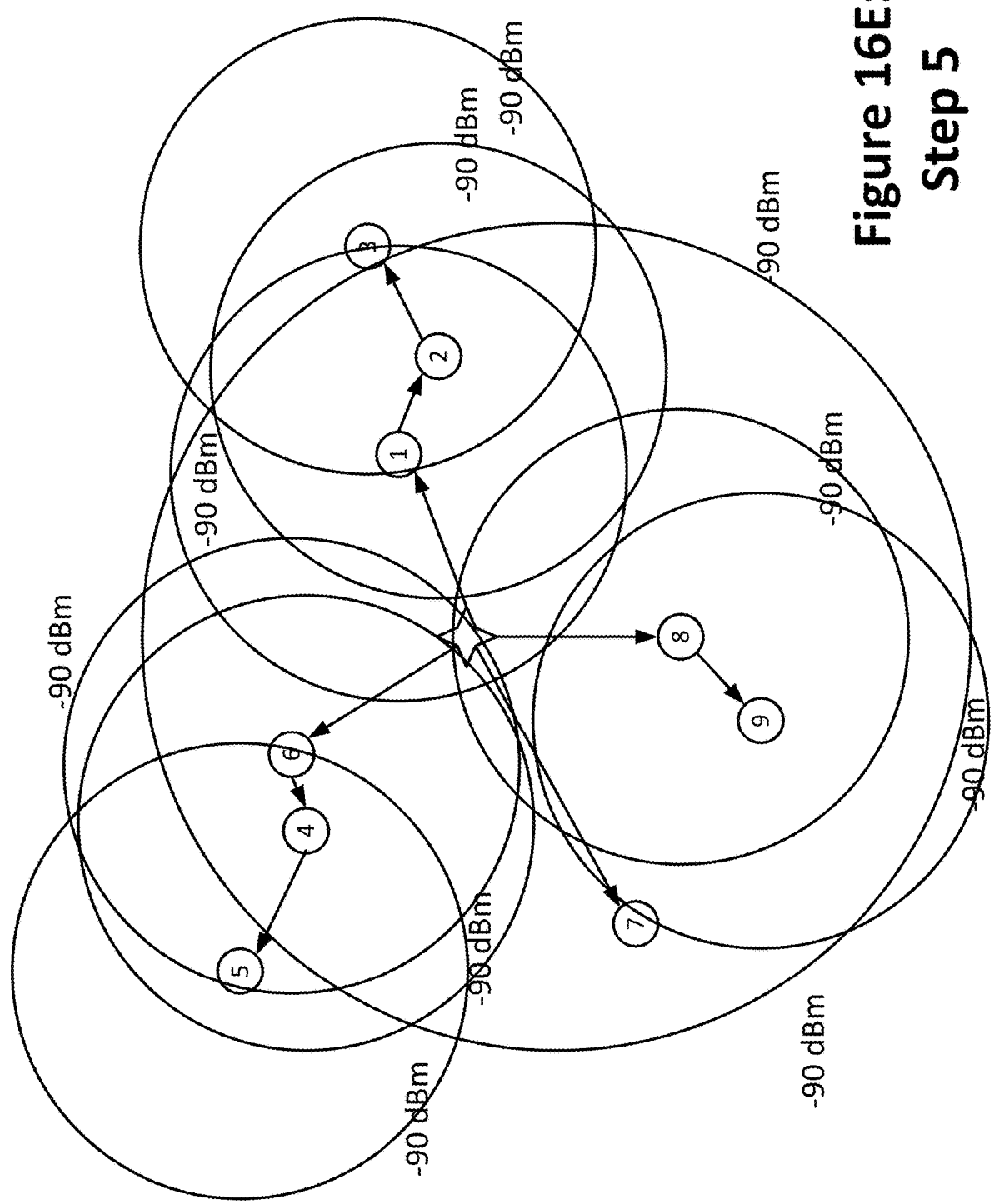
Figure 16E: Step 5

TECHNIQUES FOR INTEGRATED ACCESS AND BACKHAUL (IAB) NODES

CROSS REFERENCE TO RELATED APPLICATION

The present application claims priority to U.S. Provisional Patent Application No. 62/898,386 which was filed Sep. 10, 2019, U.S. Provisional Patent Application No. 62/908,379, which was filed Sep. 30, 2019, U.S. Provisional Patent Application No. 62/909,067, which was filed Oct. 1, 2019, U.S. Provisional Patent Application No. 62/909,068, which was filed Oct. 1, 2019, and U.S. Provisional Patent Application No. 62/925,545, which was filed Oct. 24, 2019, the disclosures of which are hereby incorporated by reference.

FIELD

Embodiments relate generally to the technical field of wireless communications.

BACKGROUND

In integrated access and backhaul (IAB) networks, network coding can be used for enhancing network reliability and reducing delay. When multiple paths from source to destination exists, the network coded packet segments need to be routed to different paths. How routing is performed on these paths impacts the reliability performance and network load.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 16A-16E illustrate operations of a method for IAB node activation, in accordance with various embodiments.

DETAILED DESCRIPTION

Figure 1:
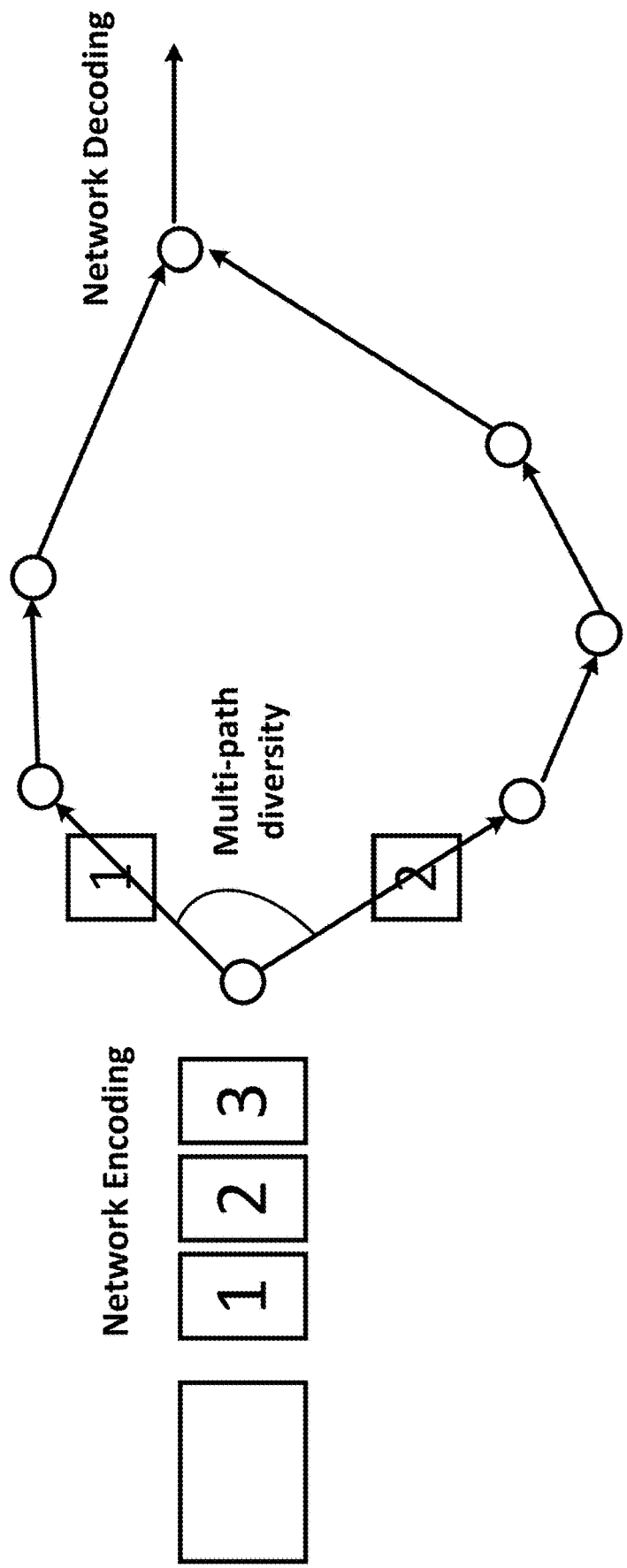
FIG. 1 schematically illustrates network encoding to exploit multi-path diversity, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Various embodiments herein provide techniques for integrated access and backhaul (IAB) nodes. For example, embodiments include techniques associated with:

rate-proportional routing for network coding;
utilizing multiple routes in IAB networks;
user equipment (UE) and parent selection for efficient topology in IAB networks;
establishing efficient IAB topologies; and/or
adaptive coded-forwarding for network coding.

Rate-Proportional Routing for Network Coding

In IAB networks, network coding can be used for enhancing network reliability and reducing delay. When multiple paths from source to destination exists, the network coded packet segments need to be routed to different paths. How routing is performed on these paths impacts the reliability performance and network load, and thus needs to be investigated.

Traditional routing algorithm uses round-robin method to distribute packet segments across different paths, where each path takes turns to be activated and each time one network coded packet segment is sent to the activated path. As a result the traffic data is distributed evenly among the paths, and each path gets the same amount of data on average.

Round-robin routing is simple but inefficient in some cases. For example, if two paths have different supported rates, then distributing the same amount of data to both of them causes overloading of the weaker path, or under-loading of the stronger path. In the first case the weaker path will experience congestion and longer delay, hence the overall performance is impacted. In the second case, the stronger path will be under-utilized and the total data traffic throughput is impaired.

Embodiments describe a routing solution that distribute network coded data probabilistically across different paths, where the probability of sending a packet segment to a path is in proportion to the corresponding supported data rate.

The described rate-proportional routing algorithm takes into account the differences between the supported rates of different paths and thus can increase network efficiency, enhance reliability and decrease latency.

In a multi-hop mesh network, there might be multiple paths/routes existing between message source and destination nodes. Using network coding on such a network topology can exploit the multi-path diversity between source and destination, as shown in FIG. 1. A packet is broken into several segments and network coding (i.e., linear combination) is performed on these segments to produce more encoded segments. These encoded segments are distributed to the multiple paths between source and destination. As long as the destination node accumulates enough encoded segments, the original packet can be recovered and costly higher layer retransmission and congestion control can be avoided, although some of these paths may experience congestion or link-blockage.

Traditional round-robin routing protocol distributes the network coded packet segments evenly among the paths. That is, each path receives the same amount of data. In our proposed solution, we are aware of each path's data-transmission capability and distribute packet segments accordingly. Assume there are n paths $\{r_1, r_2, \ldots r_n\}$, and path $r_i$ can support a data rate $R_i$. For each packet segment, we independently generate a random path number x, whose range is $\{1, 2, \ldots, n\}$ and x=i with probability pi=Ri/R, where R is the sum of all the rates Ri. The packet segment is then sent to the path rx.

Figure 2:
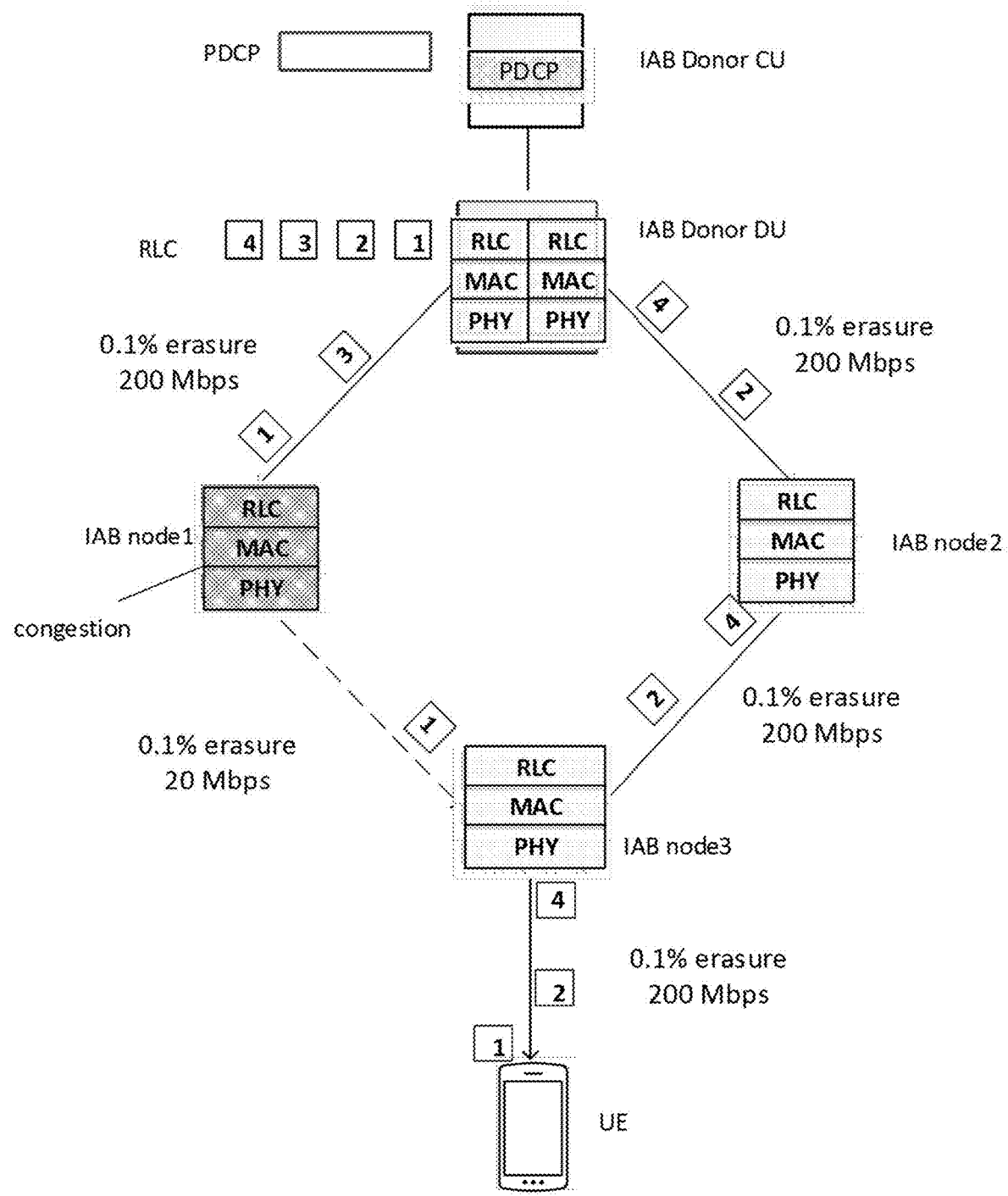
FIG. 2 illustrates an IAB network in accordance with various embodiments.

For example, in the IAB network in FIG. 2, there are two paths between the IAB donor node and UE (Donor-node 1-node 3-UE, and Donor-node 2-node 3-UE). Because of congestion at node 1, the supported data rate of link 2-3 is only 10% of the other links, hence the left path only supports 10% of the data rate for the right one. The network coding is performed at PDCP layer and the PDCP packets arrive at the donor according to a Poisson process. Each packet has a latency bound of 20 ms. That is, if the packet is received & decoded at the UE within 20 ms, it is considered to have been successfully received; otherwise, it is considered a failure.

Figure 3:
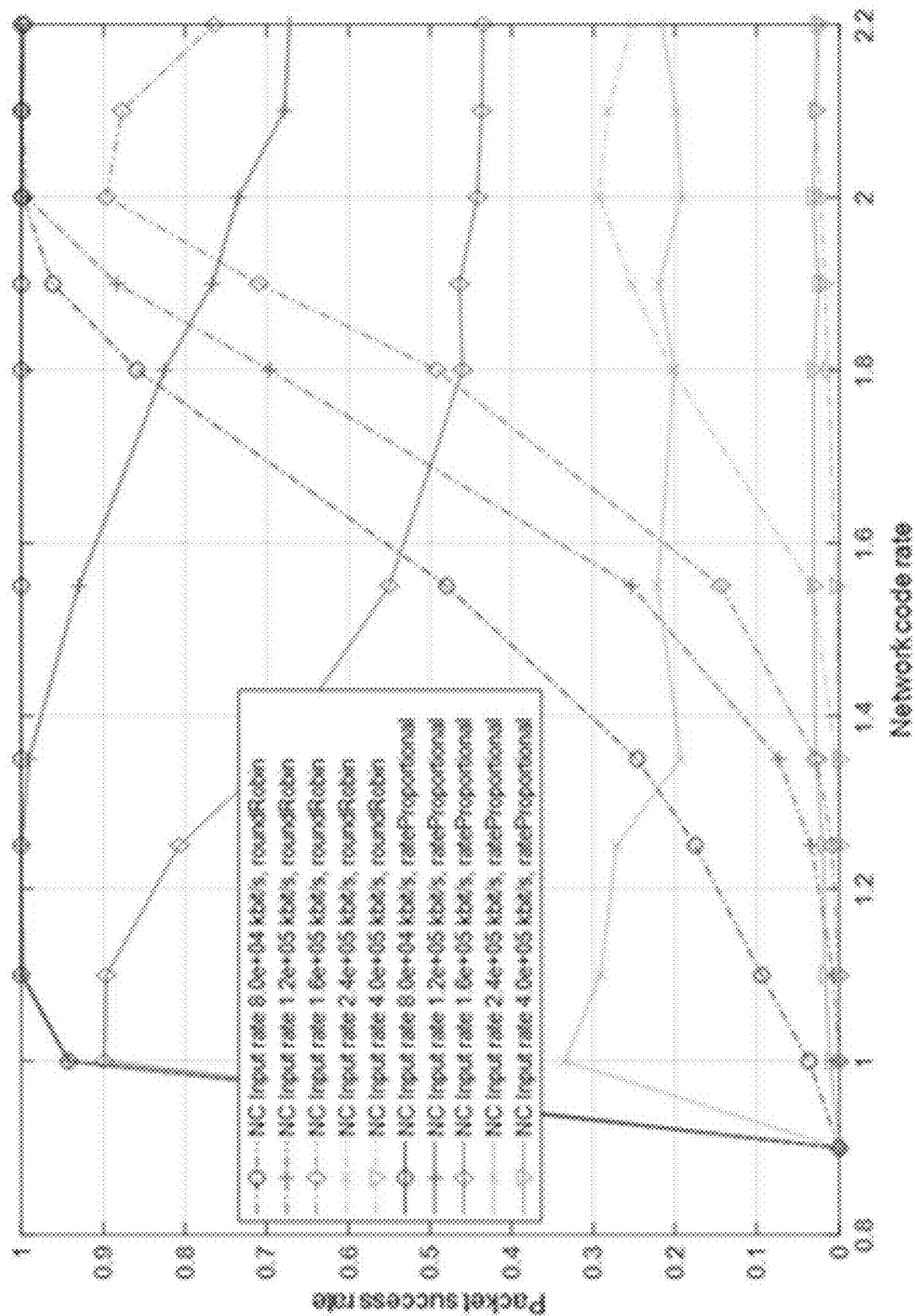
FIG. 3 illustrates simulation results to compare packet success rate (ratio of timely received packets) of round-robin routing and a rate-proportional routing scheme, in accordance with various embodiments.

FIG. 3 compares the packet success rate (the ratio of timely received packets) of round-robin and the rate-proportional routing schemes, with different network coding rate (e.g., the number of encoded segments/the number of originally divided segments), under different network input data traffic rate. We can see that to achieve the same (or better) reliability (packet success rate), the rate-proportional routing scheme requires much smaller network code rate, which means much less traffic load on the network. Hence more user can be supported with the rate-proportional routing scheme.

The following procedure may be used to enable transmission of network coded segments in a rate proportional manner:

1. A node receives a packet to be transmitted to a destination and segments it into k segments
2. Network coded segments are generated from the k segments
3. The node identifies the routes $\{r_1, r_2, \ldots, r_n\}$ to the destination. The node also assigns weights $\{R_1, R_2, \ldots, R_n\}$ corresponding to the routes $\{r_1, r_2, \ldots, r_n\}$.
4. The node transmits coded segments on routes $r_i$ such that the number of network coded segments transmitted on $r_i$ is proportional to $R_i$.

Ensuring that the weights used above reflect the relative data rates supported by the corresponding routes is critical for efficient operation of the above procedure. The following methods can be used determine the weights.

Statistics from Destination Node

The destination node can track, for each successfully received packet, the number of network coded segments received on each of the routes $\{r_1, r_2, \ldots, r_n\}$. Given that the destination can decode the packet when at least k segments are received, when the total number of received segments, k', exceeds k for the first time, the number of segments received on the routes can be represented as fractions $\{r_{1s}/k', r2s/k', \ldots\}$ where r1s and r2s are the number of segments received on route r1 and r2. It is assumed that the source node generates and transmits some redundant network coded segments (e.g., the number of segments transmitted by the source is greater than k). Furthermore, the segments are initially distributed in equal proportions to the routes $\{r1, r2, \ldots, rn\}$.

This information can be averaged over many successfully received packets and reported to the sender. That is, the fraction corresponding to route r1 can be an average of the fractions computed for many successfully received packets.

Once the sender receives this information, it can adjust its distribution of network coded segments to the different routes based on the fractions indicated by the destination.

Link Level Signal Quality

The intermediate nodes can transmit to the source node link level signal measurement information. For example, for downstream traffic, the intermediate nodes can transmit information about measured RSRP on the link to the parent node. For upstream traffic the intermediate nodes can transmit information about measurements of SRS transmissions.

Based on the received link level signal information, the source node can determine the supported data rates on each link along each of the routes. Based on this, it can further determine the data rates supported on each route (although this does not take into account the load at each of the nodes). The source node can then distribute network coded segments to different routes in proportion to the data rates determined (e.g., the data rates determined for the routes serve as the weights).

Learning at the Source Node

The source node can use a phased approach, with a first phase in which it determines the fraction of segments to be distributed to the different routes and a second phase where the segments are distributed according to the fractions determined in the first phase. In the first phase, the source node transmits all network coded segments corresponding to a first packet along a first route, all network coded segments corresponding to a second packet along a second route, and so on. The source can further request an acknowledgement for each of the packets in the first phase.

The destination node acknowledges the packet upon successful decoding (after reception of adequate network coded segments). Based on the duration to reception of the acknowledgement for packet sent on route $r_i$, the source can adjust the fraction of segments transmitted via route That is, the fraction of segments transmitted via route $r_i$ is inversely proportional to the duration to reception of the acknowledgement.

Methods for Utilizing of Multiple Routes in IAB Networks

Figure 4:
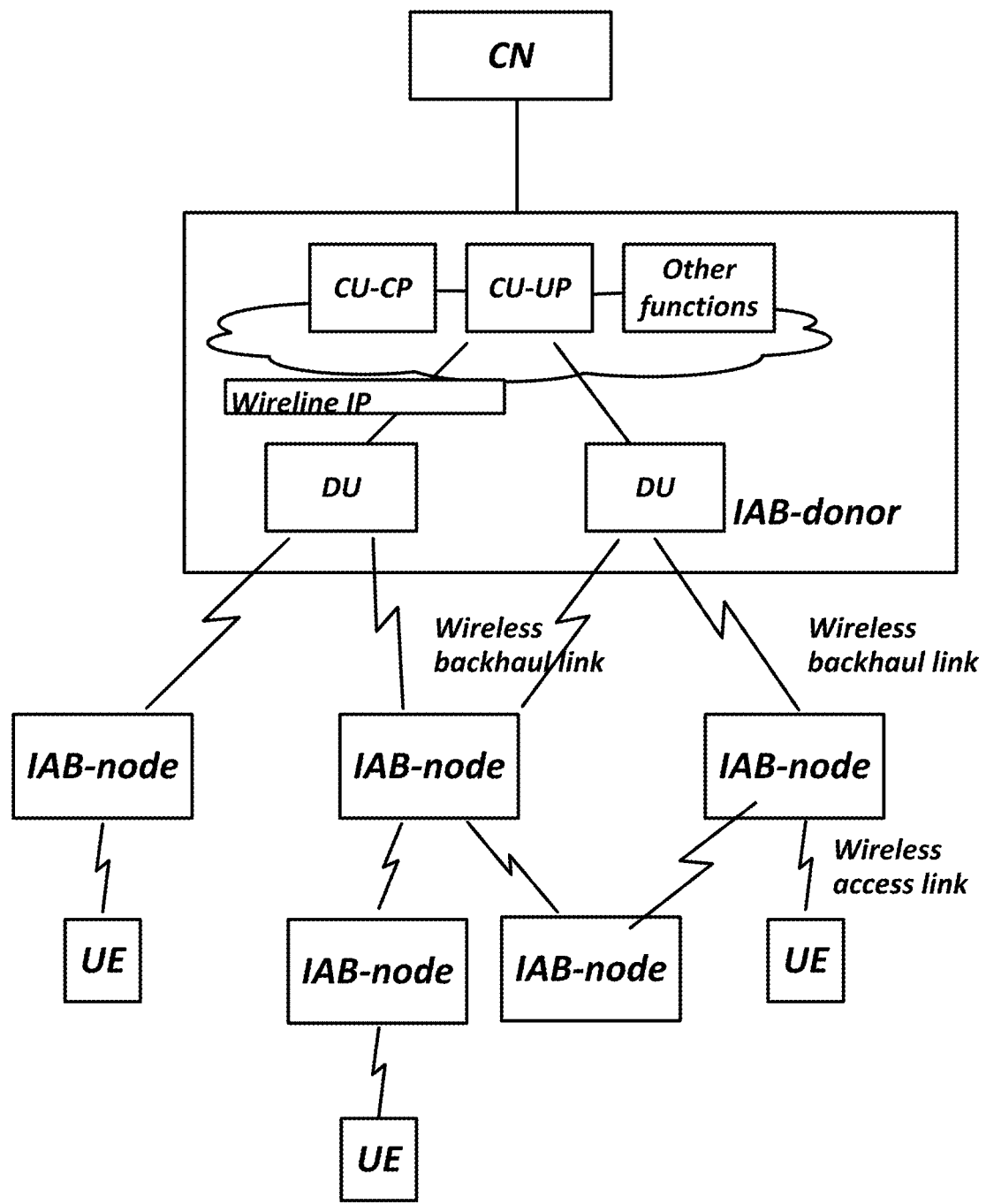
FIG. 4 illustrates an IAB network in accordance with various embodiments.

FIG. 4 illustrates an IAB network in accordance with various embodiments. Each Integrated Access and Backhaul (IAB) node in an IAB network has to support attachment of UEs and other IAB nodes. However, IAB nodes do not have full-fledged base station (gNB) capabilities. An IAB network leverages the Central Unit-Distributed Unit (CU-DU) split architecture. The Radio resource control (RRC) functionality is placed in the CU of the donor IAB node. Each IAB node functions as a DU. The IAB node is controlled by the IAB donor in a manner similar to the DU control by the CU. Specifically, the F1 control plane protocol between the CU and the DU is modified to support transmission over multiple hops; the modified F1 protocols enable the IAB donor to control the IAB nodes.

Such a network can have multiple "routes" between a donor DU (or CU-UP) and an access IAB node (IAB node directly serving a UE). Routing in IAB networks is expected to be predominantly centrally controlled; that is, the IAB donor determines the precise route taken by a packet. There is an opportunity to use the multiple routes to obtain throughput gains. In order to achieve this goal, it is necessary to be able to route data along both/multiple routes to and from the UE.

Embodiments herein provide methods to partition the data such that the multiple routes can be efficiently used and corresponding throughput improvements realized.

Figure 5:
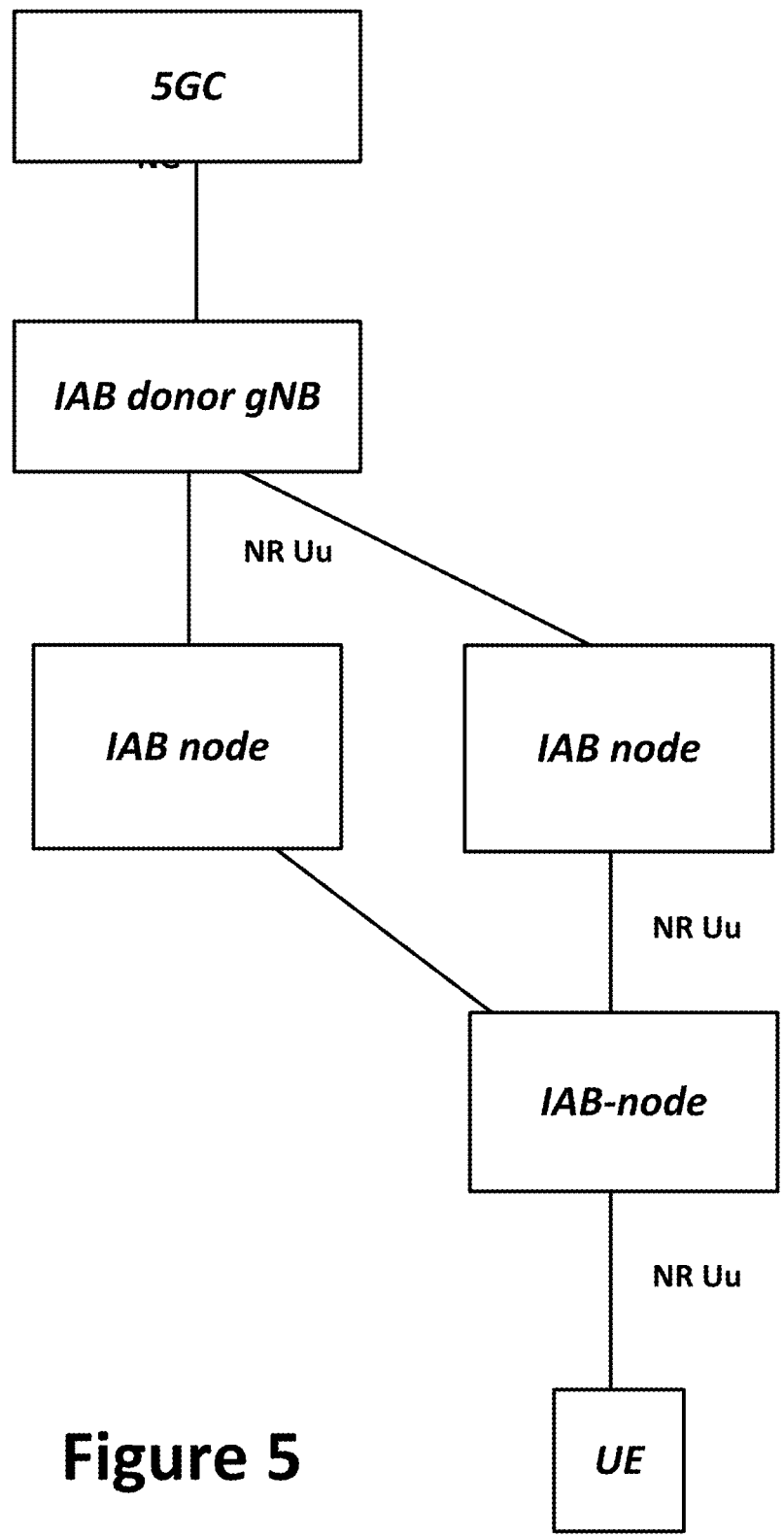
FIG. 5 shows an example of a network architecture for IAB in which there are multiple routes, in accordance with various embodiments.

FIG. 5 shows an example of a network architecture for IAB in which there are multiple routes. There are two routes from the IAB donor gNB to the access IAB node of the UE. The access IAB node is connected to two intermediate IAB nodes, each of which is connected to the IAB donor gNB.

Given that IAB nodes do not have PDCP functionality, it is understood (and agreed) that BAP layer is responsible for routing data for a given UE bearer along multiple routes.

Figure 6:
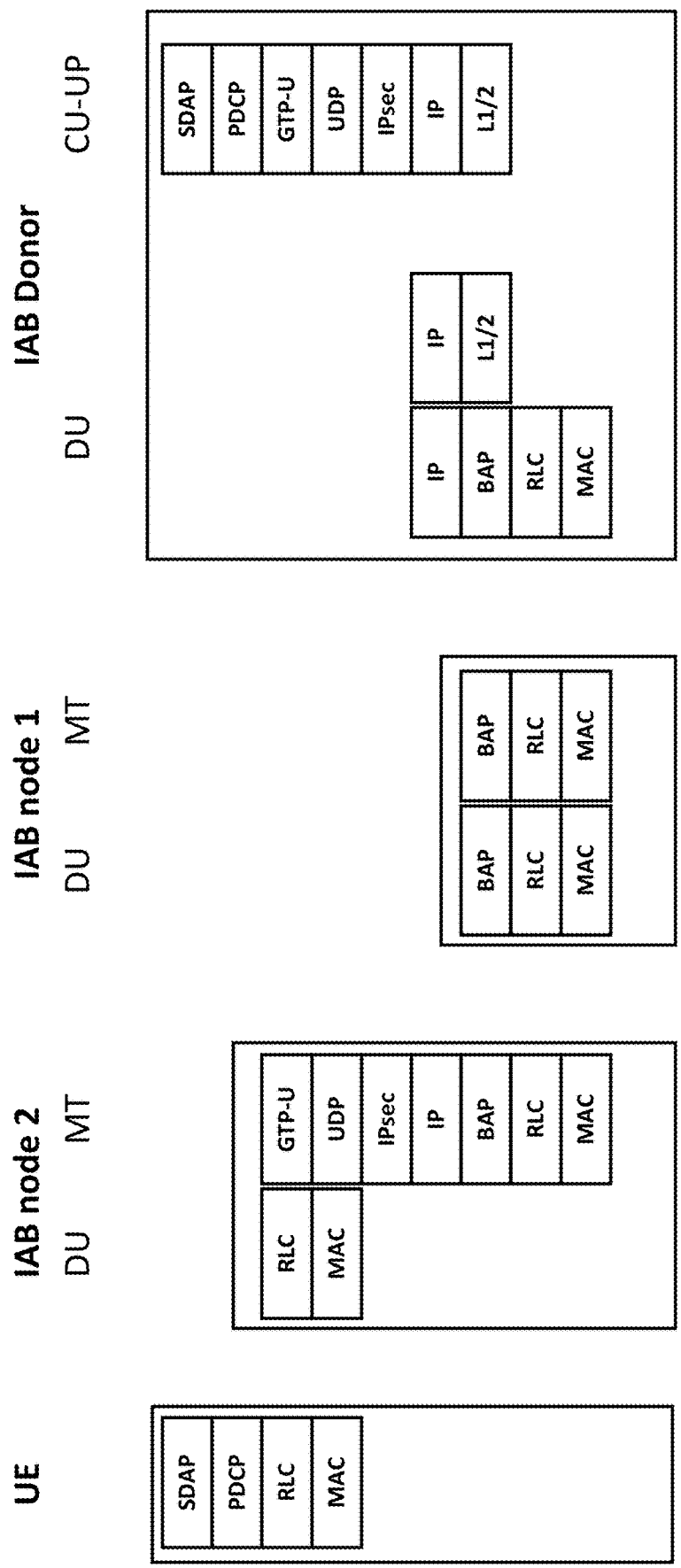
FIG. 6 shows an example protocol architecture for RRC connectivity between a UE and an IAB donor in a multi-hop IAB network, in accordance with various embodiments.

FIG. 6 shows an example protocol architecture for RRC connectivity between a UE and an IAB donor.

Each IAB node operates as a combination of a DU (serving the next hop) and an MT (providing connectivity to the parent node). The mobile terminal (MT) of an IAB node embodies UE functionality to enable connectivity to the parent. The Backhaul Adaptation protocol (BAP) layer performs the routing functions at the IAB donor and at the IAB nodes. The routing is based on BAP routing identifiers. A BAP routing identifier is inserted into the header of each packet. The BAP layer at an IAB node is configured with a routing table which enables it to determine the next hop (e.g., next link to transmit the packet on) based on the BAP routing ID. The following is a summary of the BAP routing ID and the routing function:

The BAP routing id (carried in the BAP header) consists of BAP address and BAP path ID. The path ID is used to distinguish different routes to the same BAP address.

Each BAP address defines a unique destination (unique for IAB network of one Donor, either an IAB access node, or the IAB donor)

Each BAP routing id has only one entry in the routing table.

Based on the above, there are two ways in which routing information for a given destination node can be encoded in a routing table of an IAB node:

The BAP routing ID can be just the BAP address of the destination node.

There can be multiple BAP routing IDs with the BAP address of the destination node.

Figure 7:
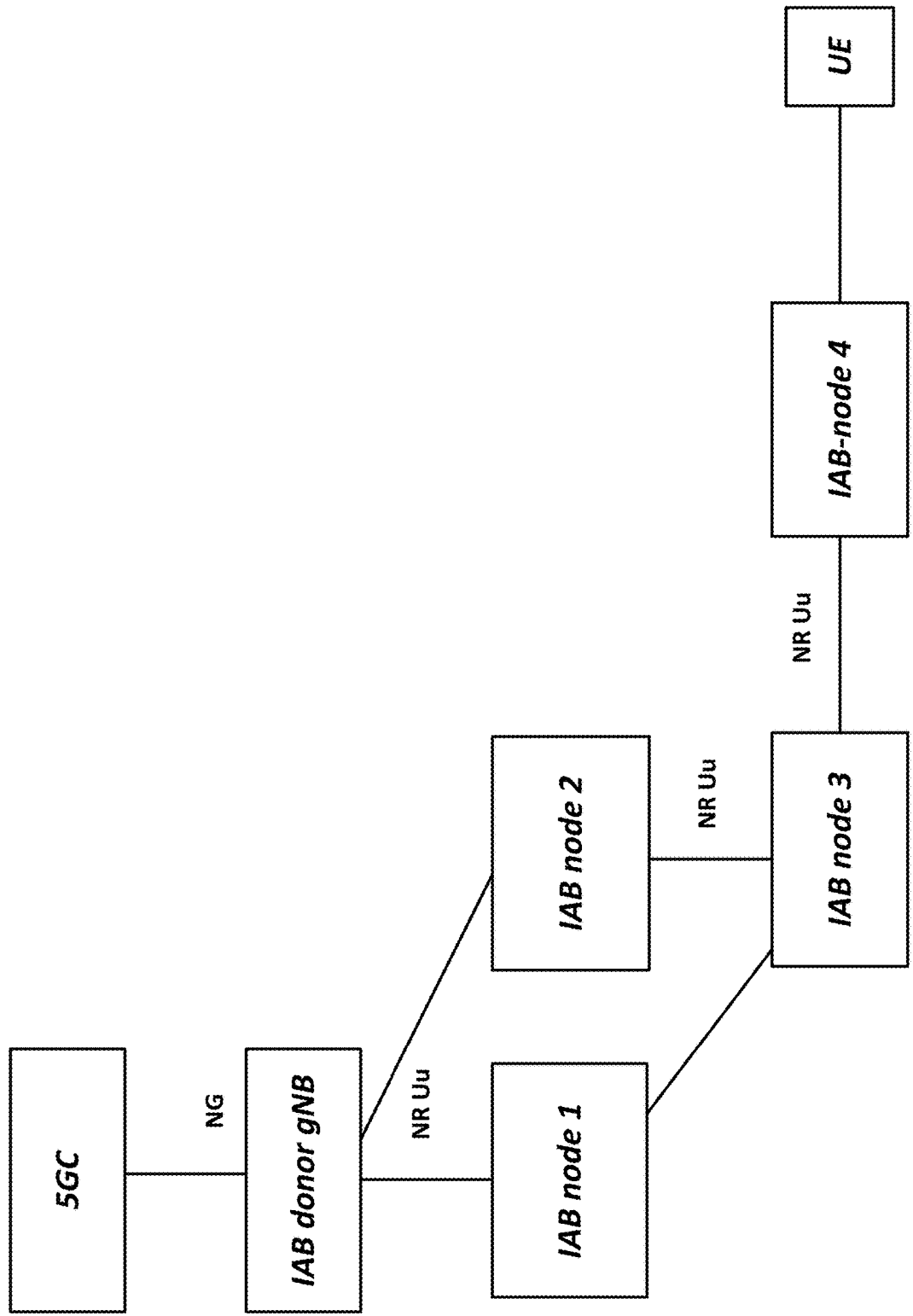
FIG. 7 illustrates another IAB network in accordance with various embodiments.

Consider the IAB network shown in FIG. 7. The access IAB node has IAB node 3 as parent. IAB node 3 is connected to two parents which are connected to the same IAB donor.

Considering the upstream traffic from the UE, the data split would occur at IAB node 3. Note however, that IAB node 4 has to construct the BAP header for the UE's data and transmit it on the next hop. One of the steps in BAP processing at IAB node 4 is to choose a BAP routing ID. In this case, given that there are two paths to the same destination (IAB donor gNB), there are two BAP routing IDs. The access IAB node should split the data such that some portion of the data is assigned the first BAP routing ID and the remaining is assigned the second BAP routing ID.

However, IAB node 4 does not have means to make a reasonable split of data between the two BAP routing IDs.

The access IAB node is unaware of the topology upstream. It also does not know the characteristics of the links on the two paths. Splitting data according to some pre-determined ratio can result in significant problems. For example, if the supported data rate on one path is lower than on the other path, and the access IAB node splits the data equally between the two paths, congestion can result on one path and under-utilization on the other.

Thus, there does not exist a mechanism currently to systematically split upstream data into two paths.

Solution 1—Configuring a split at the routing end point (access IAB node or donor IAB node)

The example embodiment is described here with respect to upstream traffic from the UE to the network.

1. The CU configures information at the access IAB node 4 for splitting of the data. This information can include the fraction of data that should be associated with each of the BAP routing IDs that can be used to route the UE's traffic (or the traffic of a specific bearer of the UE).
2. The access IAB node assigns BAP routing IDs to each packet from the UE to be carried over the backhaul in proportion to the fraction associated with the BAP routing ID.
   a. The access IAB node may be configured to adjust split on its own from the ratio configured by the CU, based on flow control BAP layer feedback received from its parent IAB nodes. For example, if the IAB donor receives flow control feedback to indicate that congestion has occurred on the route corresponding to a BAP routing ID, it can modify the fractions of data carried over the routes to reduce the data flow over the congested route.
3. The intermediate IAB node which has multiple egress links forwards the packets via one of the egress links based on the BAP routing ID.

Figure 8:
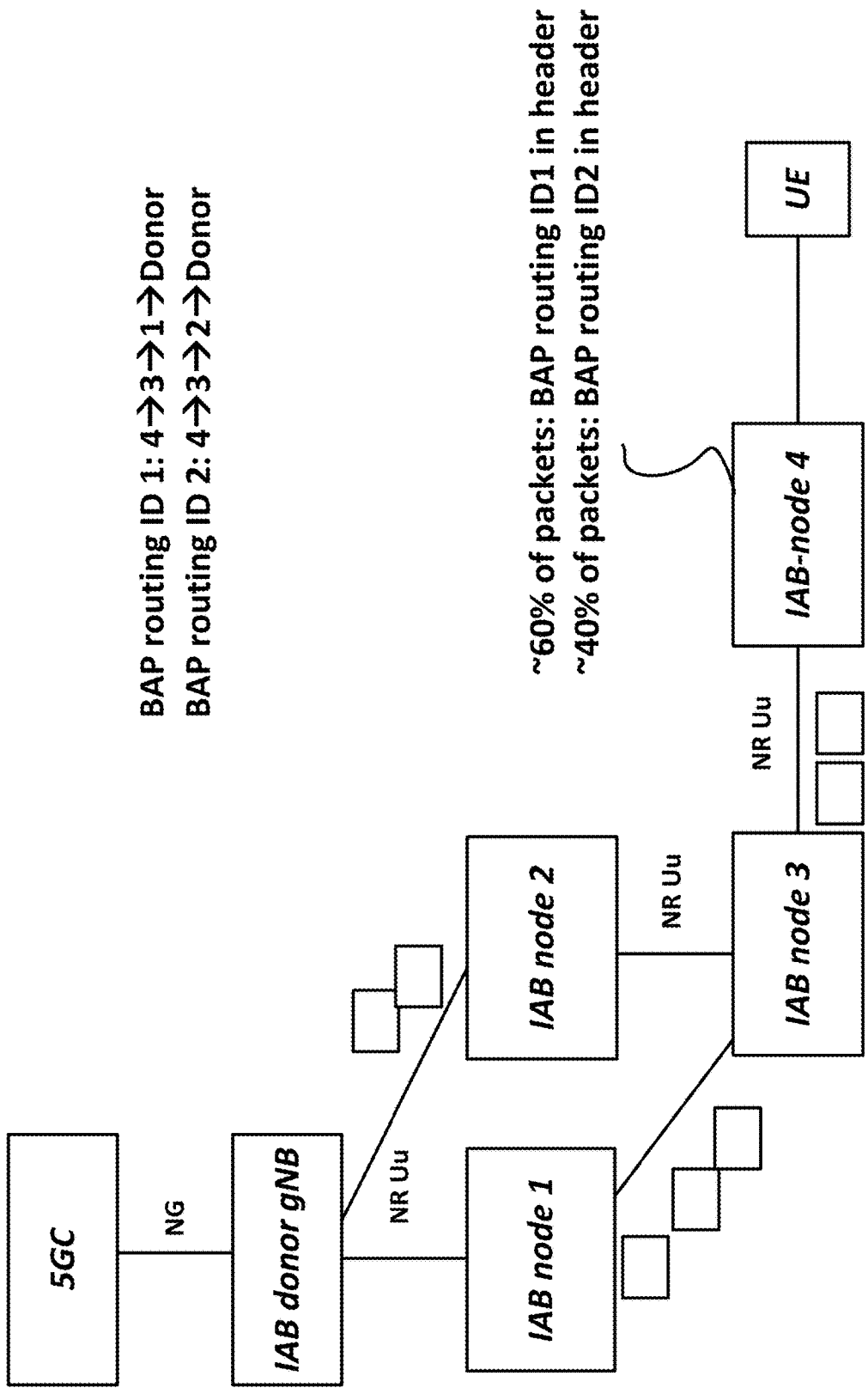
FIG. 8 schematically illustrates a routing technique for upstream traffic in an IAB network, in accordance with various embodiments.

For example (see FIG. 8), BAP routing ID1 can correspond to 4→3→1→donor and BAP routing ID2 can correspond to 4→3→2→donor. The CU may configure node 4 to associate 70% of the traffic to BAP routing ID1 and 30% of the traffic to BAP routing ID2. IAB node 4, during its BAP processing operations, assigns BAP routing ID1 and BAP routing ID2 such that 60% and 40% of the traffic respectively flow over 4→3→1→donor and 4→3→2→donor routes.

The CU determines the ratios of traffic to be carried on the different routes based on its knowledge of link conditions between nodes along the routes. When link conditions change, the CU can update the configured information for splitting the data. Or the CU may configure the access IAB node to adjust split ratio on its own. The configured information needs to be separated/organized by the UE and possibly the UE bearer (e.g., different UE's can have different splits, and different UE bearers of the same UE can have different splits).

Figure 9:
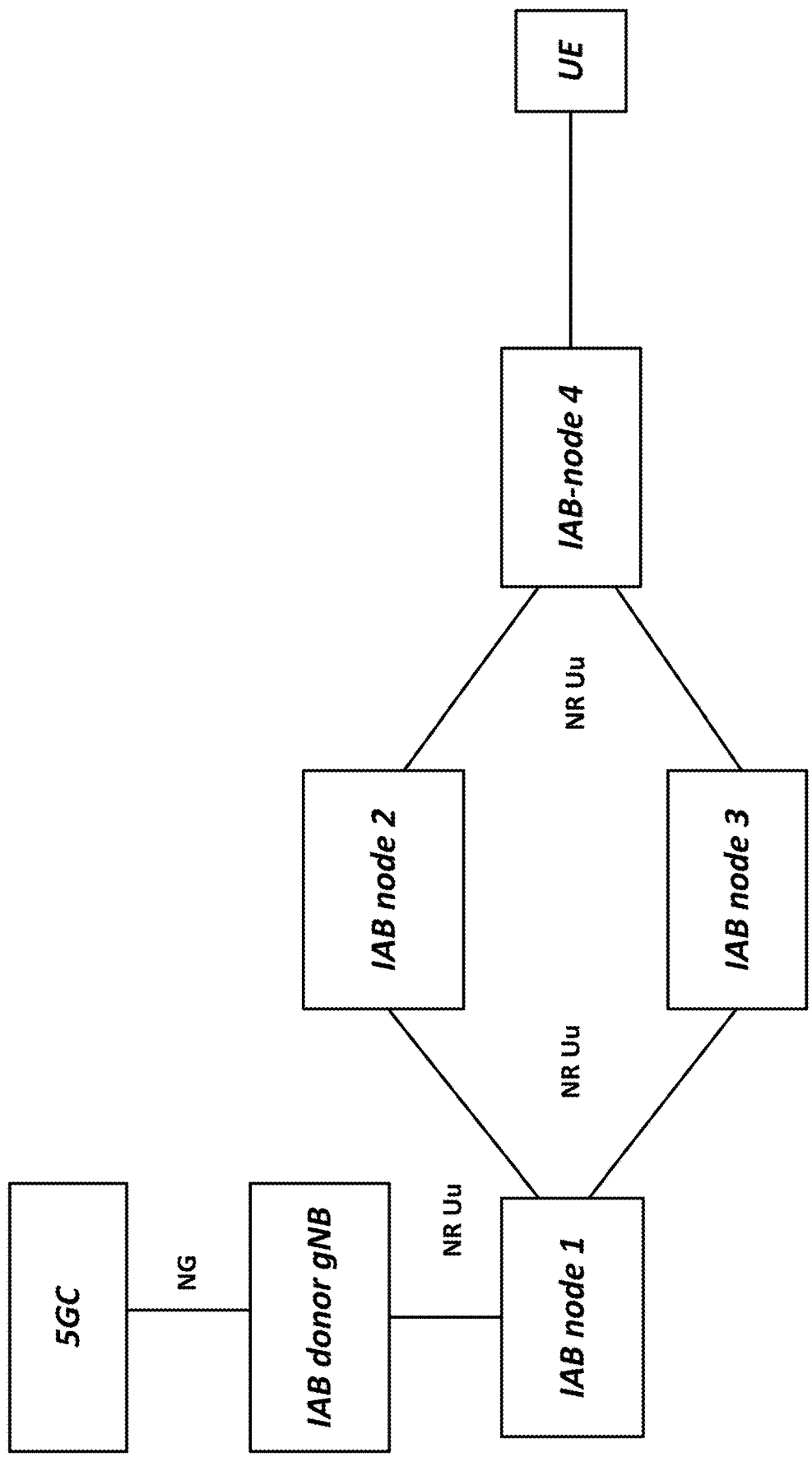
FIG. 9 schematically illustrates a routing technique for downstream traffic in an IAB network, in accordance with various embodiments.
Figure 10:
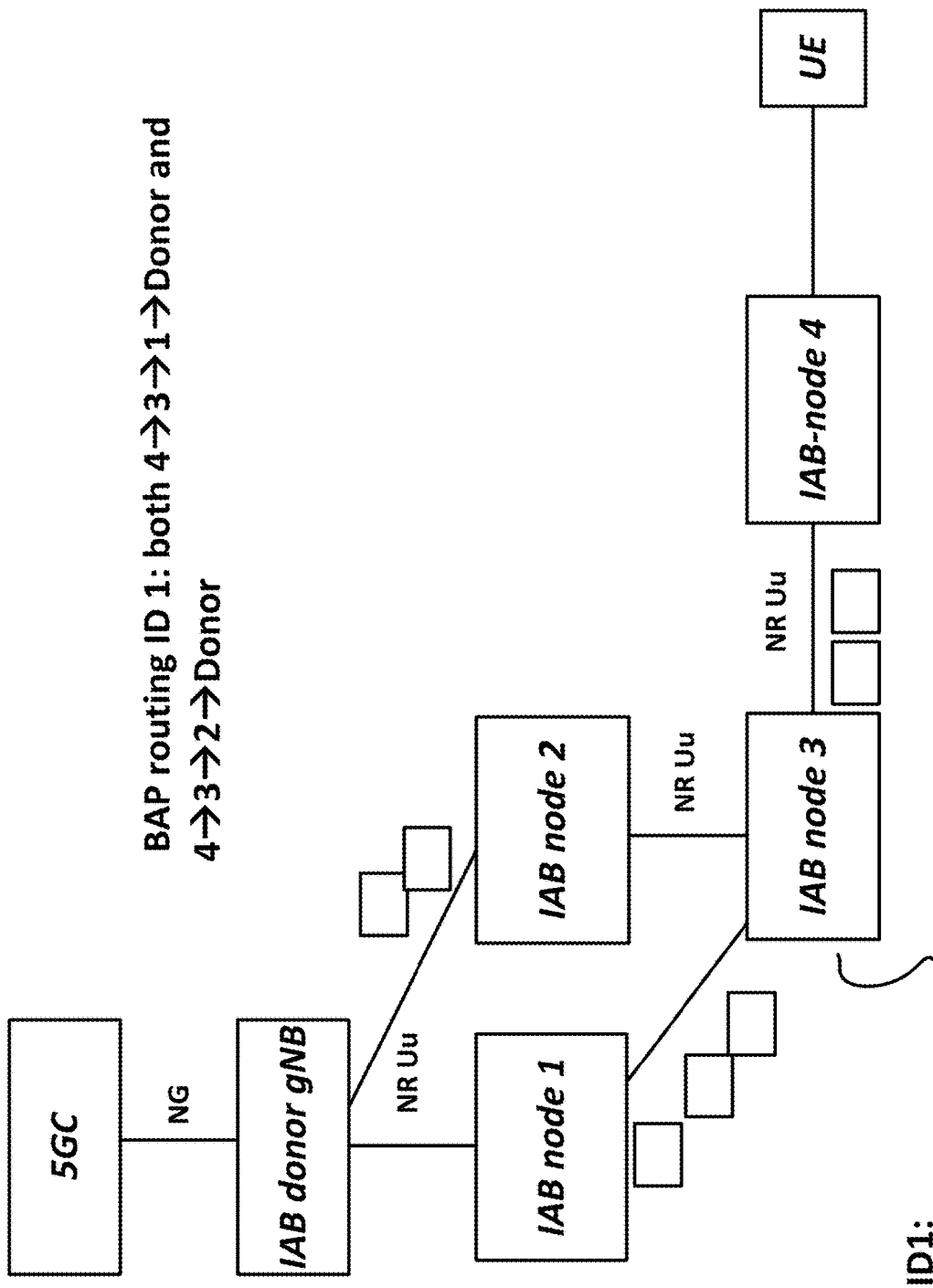
FIG. 10 schematically illustrates another routing technique in an IAB network in accordance with various embodiments.

The same procedure can be applied for downstream traffic (see FIG. 9). The IAB donor can be configured with the splitting information as described to ensure that it associates one of multiple BAP routing IDs to downstream packets. However, for downstream, the configuration information needs to be distinguished based on the access IAB node, the UE and possibly the UE bearer (e.g., different access IAB nodes can require different splits based on the different number of routes; different UEs and different UE bearers of the same UE can have different splits).

Solution 2—Configuring Intermediate Node to Split Data Stream

This solution enables an intermediate IAB node to make decisions about which packets traverse which routes. The example embodiment is described with respect to upstream traffic.

1. The CU configures information for splitting of the data stream at an intermediate IAB node with multiple parents. This split information can include the fraction of the ingress data that should be transmitted on each of the egress links.
2. The access IAB node uses a single BAP routing ID for the traffic to be transmitted via multiple routes (to the donor). That is, the path-id portion of the BAP routing ID can be omitted or a default value can be used even if there are multiple routes.
3. The intermediate IAB node, determines that for the BAP routing ID there are multiple egress links. It splits the packets between the multiple egress links according to the configured split.
   a. The intermediate IAB node may be further configured to adjust split from the ratio configured by the CU, based on flow control BAP layer feedbacks received from its parent IAB nodes (UL case) or children IAB nodes (DL case) on the routes.

Given that in the above method the split at the intermediate IAB nodes is based on the BAP routing ID, it does not have the ability to treat traffic from different UEs of different UE bearers differently. That is, all traffic to a given destination is split according to the configured split information. In order to enable splitting of different traffic streams (of UEs, UE bearers), one or more of the following information can be included in the BAP header:

UE Id
UE bearer ID
Source address

Then the split configuration can be organized according to this information. For example, one split configuration can be established for a given UE bearer ID at an intermediate IAB node and an different split configuration can be established for a different UE bearer ID at the same node.

Similar to solution 1, solution 2 can be used for downstream traffic also. The split configuration would need to account for different access IAB nodes being destination. Thus, the split configuration at an intermediate IAB node needs to be different for traffic destined to different access IAB nodes.

User Equipment Parent Selection for Efficient Topology in Integrated Access and Backhaul Integrated access and backhaul (IAB) nodes can be integrated into the network (referred to as IAB node "activation" below) in different sequences within the same area. Even if all IAB nodes are to be activated at about the same time, the completion of the node integration phases will take different durations for different IAB nodes. There will be variations in the amount of time taken due to the number of hops and signal conditions. Given that UEs/MTs can attach to the IAB node upon completion of the IAB DU setup, the differences in the durations to complete the integration procedure at different IAB nodes can result in:

IAB nodes selecting sub-optimal parents, and
UEs selecting sub-optimal parents.

One consequence of such sub-optimal parent selection is that handovers of the IAB nodes and UEs will need to be performed immediately after the network is setup or even during the network setup. This can impose a large signalling load in the network and may also be infeasible as the number of IAB nodes gets large.

UEs attach to IAB nodes as the IAB nodes are integrated according to the current procedure.

The UE parent selection according to the current/legacy procedures leads to an uneven distribution of UEs at IAB nodes resulting excessive load at some nodes and under-utilization at other nodes.

Methods are provided that modify the node integration procedure to enable a more efficient resulting topology.

UE Parent Selection for Efficient Topology in IAB

IAB networks (see, e.g., FIG. 4) are setup to improve capacity and coverage while limiting the cost of backhaul. IAB nodes in an area are expected to be activated at the same time. This is especially true for scenarios where IAB networks are used to provide additional capacity at events—e.g., at sporting events and concerts.

IAB nodes can be integrated into the network (referred to as IAB node "activation" below) in different sequences within the same area. Even if all IAB nodes are to be activated at about the same time, the completion of the node integration phases will take different durations for different IAB nodes. There will be variations in the amount of time taken due to the number of hops and signal conditions. Given that UEs/MTs can attach to the IAB node upon completion of the IAB DU setup, the differences in the durations to complete the integration procedure at different IAB nodes can result in:

IAB nodes selecting sub-optimal parents, and

UEs selecting sub-optimal parents.

One consequence of such sub-optimal parent selection is that handovers of the IAB nodes and UEs will need to be performed immediately after the network is setup or even during the network setup. This can impose a large signalling load in the network and may also be infeasible as the number of IAB nodes gets large.

Embodiments provide methods to ensure efficient selection of parents by UEs during the integration procedure so that signalling related to handovers of UEs and IAB nodes can be avoided or minimized.

Given that the MT of an IAB node functions as a UE, once an IAB node is integrated into the network, UEs are able to attach to it. For example, if a UE that is attached to a donor IAB node, measures a better RSRP to a newly activated node than to the IAB donor, it switches its parent from the IAB donor to the newly activated IAB node (either through a cell reselection if the UE is in idle mode or through a network controlled handover if the UE is in connected mode).

Figure 11:
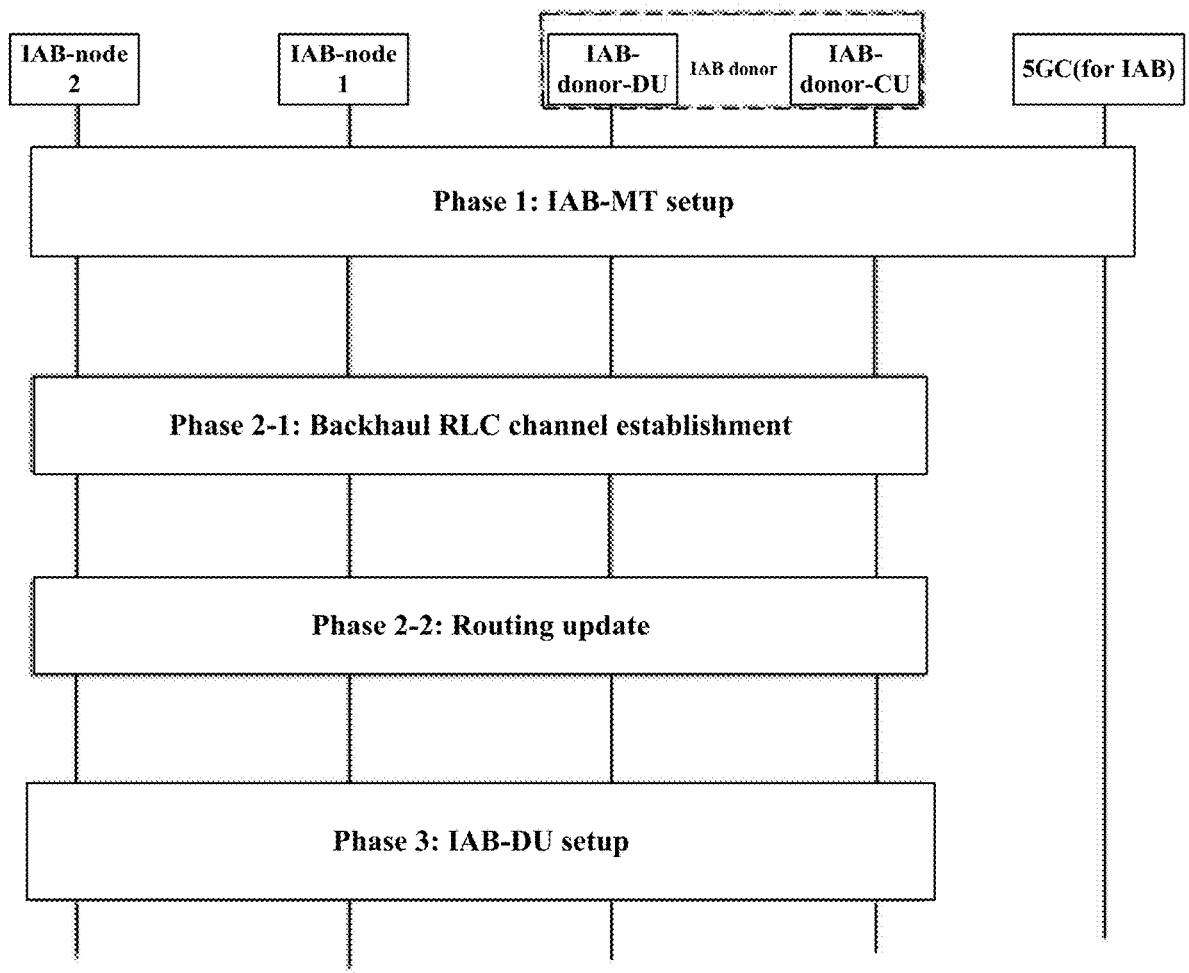
FIG. 11 illustrates a procedure for IAB node integration in accordance with various embodiments.

IAB nodes follow the same procedures as UEs for attaching to the network. The overall procedure for IAB node integration is shown in FIG. 11 below (from 3GPP Technical Standard 38.401 [1]). In the first stage the IAB MT setup is performed. The MT of an IAB node, in its role as a regular UE, identifies a parent node (another IAB node or an IAB donor). The MT then performs random access and transmits an RRC connection setup request to the CU via the parent node. Following that, the backhaul RLC channel for carrying CP traffic to and from the IAB node is established. This is followed by a routing update phase which includes configuration of BAP routing identifiers and updating of routing tables of the IAB donor DU and all IAB nodes on the path to the IAB node. Following that, in the IAB DU setup phase, the DU functionality of the IAB node is configured (which consists of setting up of the F1-C connection between the IAB node and the IAB donor CU). Once this is completed, the IAB node can provide service to UEs.

Figure 13:
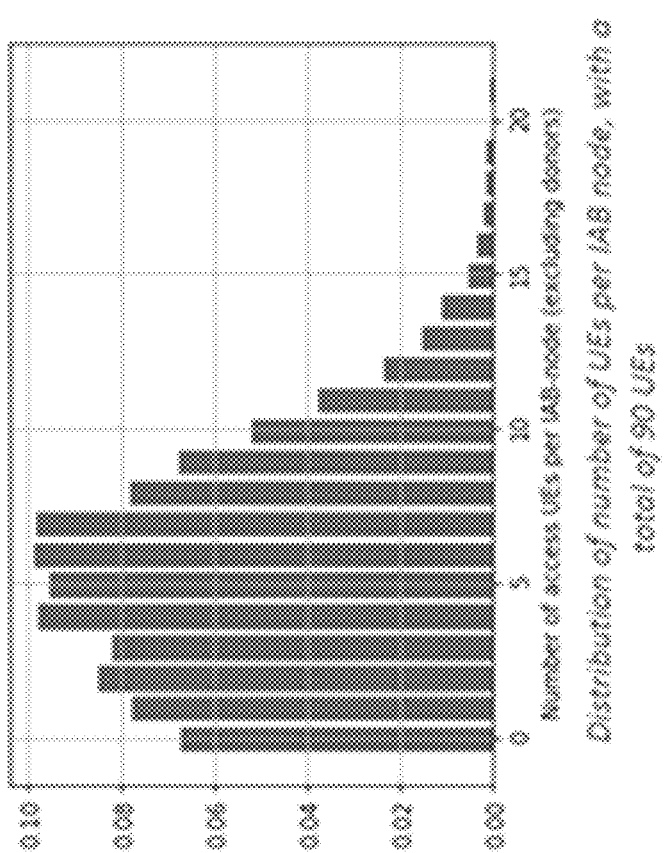
FIG. 13 illustrates distribution of number of UEs per IAB node, with a total of 90 UEs, in accordance with various embodiments.
Figure 12:
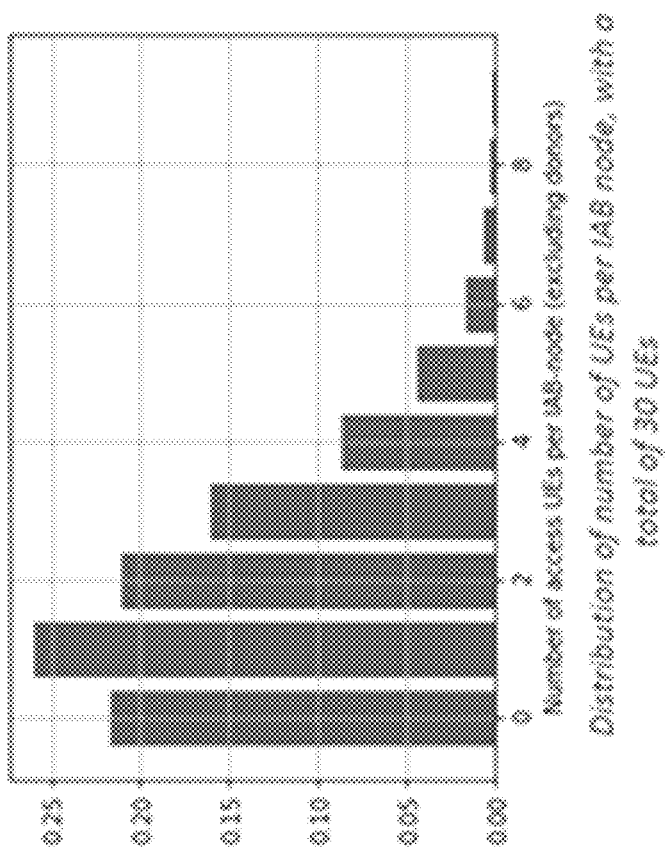
FIG. 12 illustrates distribution of number of UEs per IAB node, with a total of 30 UEs, in accordance with various embodiments.

As noted above, different IAB nodes are integrated at different times. If UEs attach to an IAB node immediately after it is integrated, the result is generally an inefficient and uneven UE association. This is illustrated in FIG. 12 and FIG. 13. FIG. 12 and FIG. 13 show the distribution of the number of UEs attached to IAB nodes, with a total of 30 and 90 UEs respectively. Table 1 shows the mean and standard deviation of the number of UEs per IAB node and the number of UEs attached to the IAB donor.

TABLE 1

Details of distribution of number of UEs (UEs allowed to select parents once IAB node is integrated)

| Total number of UEs | Number of UEs per IAB node | | Number of UEs attached to IAB donor | |
|---|---|---|---|---|
| | Mean | Std. Deviation | Mean | Std. Deviation |
| 30 | 1.88 | 1.58 | 13.08 | 3.66 |
| 90 | 5.65 | 3.61 | 39.14 | 7.82 |

Clearly the distribution of UEs is very uneven. Some of the uneven distribution of UEs is due to the difference in transmit powers of the IAB donor and the IAB nodes. However, the large proportion of IAB nodes with no UEs or a very small number of UEs indicates significant inefficiencies.

Figure 15:
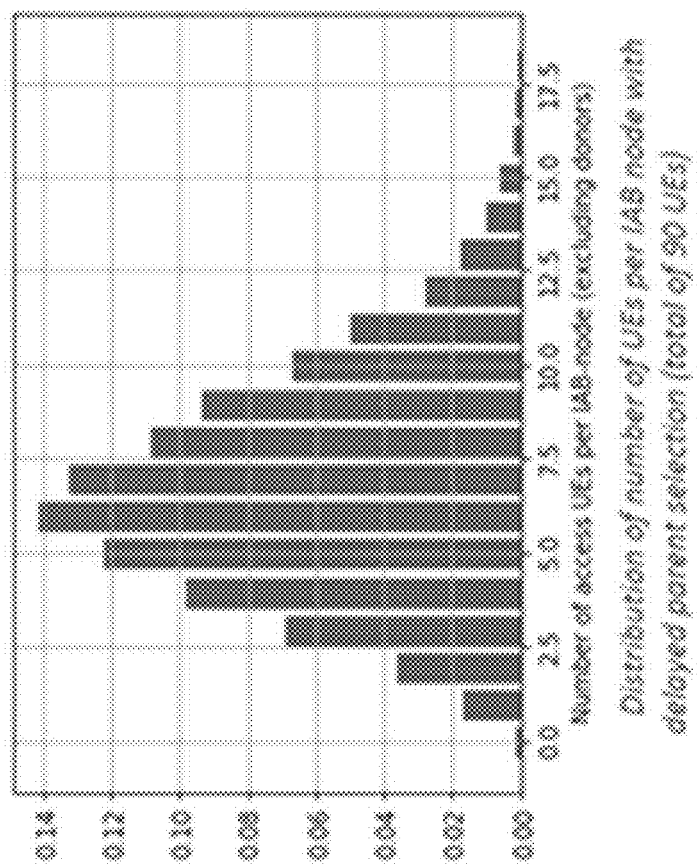
FIG. 15 illustrates distribution of number of UEs per IAB node with delayed parent selection and a total of 90 UEs, in accordance with various embodiments.
Figure 14:
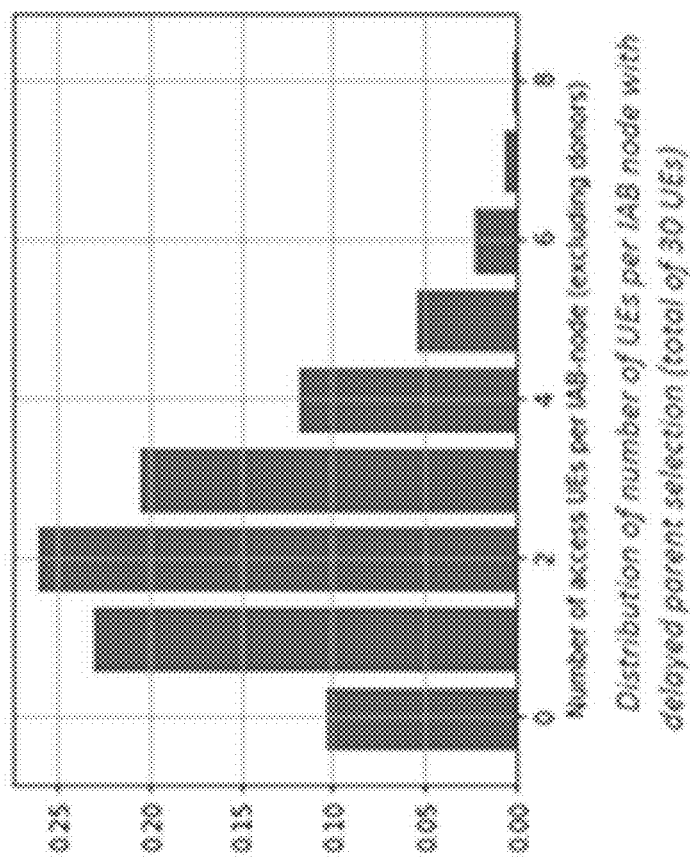
FIG. 14 illustrates distribution of number of UEs per IAB node with delayed parent selection and a total of 30 UEs, in accordance with various embodiments.

The above results are compared to a scheme where the UEs do not perform parent selection until all the IAB nodes are integrated into the network. FIG. 14 and FIG. 15 show the distribution of number of UEs per IAB node if the UEs perform parent selection only after all IAB nodes are activated. Table 2 shows the mean and standard deviation of the number of UEs per IAB node and the number of UEs attached to the IAB donor for the same.

TABLE 2

Details of distribution of number of UEs (UE parent selection delayed until all IAB nodes integrated)

| Total number of UEs | Number of UEs per IAB node | | Number of UEs attached to IAB donor | |
|---|---|---|---|---|
| | Mean | Std. Deviation | Mean | Std. Deviation |
| 30 | 2.29 | 1.50 | 9.37 | 2.98 |
| 90 | 6.85 | 2.93 | 28.38 | 5.41 |

It is clear from the above data that delaying the UE parent selection until all the IAB nodes are integrated can significantly improve the distribution of UEs and the utilization of IAB nodes. If the UEs are able to select parents as soon as any IAB node is integrated into the network, large numbers of handovers will be needed to achieve an efficient association of UEs to IAB nodes.

Embodiment 1—for UEs in Idle Mode

Based on the above observations, a method is provided below that delays the UE parent selection process until all the IAB nodes are integrated into the network.

1. It is determined at the CU that IAB nodes need to be integrated into the network. This can happen based on signalling between the operator network and the RAN or other signalling.
2. A new IAB node performs access (either to the IAB donor or to one of the already integrated IAB nodes). It is integrated into the network according to the procedure of FIG. 2.
3. The CU configures the new IAB node to indicate that access by UEs is barred. Furthermore, access by MTs of IAB nodes is allowed even though access by UEs is barred. The indication is transmitted for example through system information.
4. UEs may detect and measure the new IAB node; however they do not select it as a parent.

5. Once it is determined that all the IAB nodes are integrated into the network (which can be based on OAM or other signalling between the operator network and the RAN), the CU indicates to the newly integrated IAB nodes that the access barring restriction of the UEs can be lifted.
6. UEs perform and evaluate received signal measurements. UEs in idle mode select a newly integrated IAB node as a parent if the selection criteria are met. UEs that are in connected mode report the measurements to the CU, which performs may perform a handover to a newly integrated IAB node if the handover criteria are met.

Example implementation for Step 1 can be as follows. When Donor CU powers up, it will first setup NGAP with 5GC by sending NG SETUP REQUEST message. The NG SETUP RESPONSE message from AMF in 3GPP Technical Standard (TS) 38.413 can be enhanced to include an indicator for Donor CU to complete IAB nodes integrations before starting to serve UEs:

9.2.6.2 NG Setup Response

This message is sent by the AMF to transfer application layer information for an NG-C interface instance.

Direction: AMF→NG-RAN node

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF Name | M | | 9.3.3.21 | | YES | reject |
| Served GUAMI List | | 1 | | | YES | reject |
| >Served GUAMI Item | | 1 . . . <maxnoofServedGUAMIs> | | | — | |
| >>GUAMI | M | | 9.3.3.3 | | — | |
| >>Backup AMF Name | O | | AMF Name 9.3.3.21 | | — | |
| Relative AMF Capacity | M | | 9.3.1.32 | | YES | ignore |
| PLMN Support List | | 1 | | | YES | reject |
| >PLMN Support Item | | 1 . . . <maxnoofPLMNs> | | | — | |
| >>PLMN Identity | M | | 9.3.3.5 | | — | |
| >>Slice Support List | M | | 9.3.1.17 | Supported S-NSSAIs per PLMN | — | |
| Criticality Diagnostics | O | | 9.3.1.3 | | YES | ignore |
| UE Retention Information | O | | 9.3.1.117 | | YES | ignore |
| Delay UE Serving | O | | ENUMERATED (True, . . .) | indicates to RAN, in case of IAB Donor CU, not to start serving UEs. | | |

| Range bound | Explanation |
|---|---|
| maxnoofServedGUAMIs | Maximum no. of GUAMIs served by an AMF. Value is 256. |
| maxnoofPLMNs | Maximum no. of PLMNs per message. Value is 12. |

Example implementation for Step 3 can be as follows. When an IAB node is being integrated and its IAB-DU powers up, it will first setup F1AP with Donor CU by sending F1 SETUP REQUEST message. The F1 SETUP RESPONSE message from Donor CU in 3GPP TS 38.473 can be enhanced to include an indicator not to start serving UEs until further notice:

9.2.1.5 F1 Setup Response

This message is sent by the gNB-CU to transfer information associated to an F1-C interface instance.

Direction: gNB-CU→gNB-DU

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| gNB-CU Name | O | | PrintableString(SIZE(1 . . . 150, . . .)) | Human readable name of the gNB-CU. | YES | ignore |

| IE/Group Name | Presence | Range | IE type and reference | Semantics description | Criticality | Assigned Criticality |
|---|---|---|---|---|---|---|
| Cells to be Activated List | | 0 . . . 1 | | | YES | reject |
| >Cells to be Activated List Item | | 1 . . . <maxCellingNBDU> | | List of cells to be activated | EACH | reject |
| >> NR CGI | M | | 9.3.1.12 | | — | |
| >> NR PCI | O | | INTEGER (0 . . . 1007) | Physical Cell ID | — | |
| >>gNB-CU System Information | O | | 9.3.1.42 | RRC container with system information owned by gNB-CU | YES | reject |
| >>Available PLMN List | O | | 9.3.1.65 | | YES | ignore |
| >>Extended Available PLMN List | O | | 9.3.1.76 | This is included if Available PLMN List IE is included and if more than 6 Available PLMNs is to be signalled. | YES | ignore |
| >>Delay UE Serving | O | | ENUMERATED (True, . . .) | indicates to DU, in case of IAB-DU, not to start serving UEs in this activated cell. | | |
| gNB-CU RRC version | M | | RRC version 9.3.1.70 | | YES | reject |

| Range bound | Explanation |
|---|---|
| maxCellingNBDU | Maximum no. cells that can be served by a gNB-DU. Value is 512. |

Example implementation for Step 5 can be as follows. After all the IAB nodes are registered in 5GC and integrated into IAB network, AMF may send AMF Configuration Update message in NGAP to the Donor CU to start serving UEs:

9.2.6.7 AMF Configuration Update

This message is sent by the AMF to transfer updated information for an NG-C interface instance.

Direction: AMF→NG-RAN node

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF Name | O | | 9.3.3.21 | | YES | reject |
| Served GUAMI List | | 0 . . . 1 | | | YES | reject |
| >Served GUAMI Item | | 1 . . . <maxnoofServedGUAMIs> | | | | |
| >>GUAMI | M | | 9.3.3.3 | | — | |
| >>Backup AMF Name | O | | AMF Name 9.3.3.21 | | — | |
| Relative AMF Capacity | O | | 9.3.1.32 | | YES | ignore |
| PLMN Support List | | 0 . . . 1 | | | YES | reject |
| >PLMN Support Item | | 1 . . . <maxnoofPLMNs> | | | — | |
| >>PLMN Identity | M | | 9.3.3.5 | | | |
| >>Slice Support List | M | | 9.3.1.17 | Supported S-NSSAIs per PLMN | — | |
| AMF TNL Association to Add List | | 0 . . . 1 | | | YES | ignore |
| >AMF TNL Association to Add Item | | 1 . . . <maxnoofTNLAssociations> | | | — | |
| >>AMF TNL Association Address | M | | CP Transport Layer Information 9.3.2.6 | AMF Transport Layer information used to set up the new TNL association. | — | |

-continued

| IE/Group Name | Presence | Range | IE type and reference | Semantics description | Criticality | Assigned Criticality |
|---|---|---|---|---|---|---|
| >>TNL Association Usage | O | | 9.3.2.9 | | — | |
| >>TNL Address Weight Factor | M | | 9.3.2.10 | | — | |
| AMF TNL Association to Remove List | | 0 . . . 1 | | | YES | ignore |
| >AMF TNL Association to Remove Item | | 1 . . . <maxnoofTNLAssociations> | | | — | |
| >>AMF TNL Association Address | M | | CP Transport Layer Information 9.3.2.6 | AMF Transport Layer information used to identify the TNL association to be removed. | — | |
| AMF TNL Association to Update List | | 0 . . . 1 | | | YES | ignore |
| >AMF TNL Association to Update Item | | 1 . . . <maxnoofTNLAssociations> | | | — | |
| >>AMF TNL Association Address | M | | CP Transport Layer Information 9.3.2.6 | AMF Transport Layer information used to identify the TNL association to be updated. | — | |
| >>TNL Association Usage | O | | 9.3.2.9 | | — | |
| >>TNL Address Weight Factor | O | | 9.3.2.10 | | — | |
| Start Serving UEs | O | | ENUMERATED (True, . . .) | indicates to RAN, in case of IAB Donor CU, to start serving UEs. | | |

| Range bound | Explanation |
|---|---|
| maxnoofServedGUAMIs | Maximum no. of GUAMIs served by an AMF. Value is 256. |
| maxnoofPLMNs | Maximum no. of PLMNs per message. Value is 12. |
| maxnoofTNLAssociations | Maximum no. of TNL Associations between the NG-RAN node and the AMF. Value is 32. |

Then, Donor CU may send GNB-CU CONFIGURATION UPDATE message in F1AP to each IAB-DU to start serving UEs:

9.2.1.10 gNBb-CU Configuration Update

This message is sent by the gNB-CU to transfer updated information associated to an F1-C interface instance.

NOTE: If F1-C signalling transport is shared among several F1-C interface instances, this message may transfer updated information associated to several F1-C interface instances.

Direction: gNB-CU→gNB-DU

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| Cells to be Activated List | | 0 . . . 1 | | List of cells to be activated or modified | YES | reject |
| >Cells to be Activated List Item | | 1 . . . <maxCellingNBDU> | | | EACH | reject |
| >> NR CGI | M | | 9.3.1.12 | | — | |
| >> NR PCI | O | | INTEGER (0 . . . 1007) | Physical Cell ID | — | |
| >> gNB-CU System Information | O | | 9.3.1.42 | RRC container with system information owned by gNB-CU | YES | reject |
| >>Available PLMN List | O | | 9.3.1.65 | | YES | ignore |

-continued

| IE/Group Name | Presence | Range | IE type and reference | Semantics description | Criticality | Assigned Criticality |
|---|---|---|---|---|---|---|
| >>Extended Available PLMN List | O | | 9.3.1.76 | This is included if Available PLMN List IE is included and if more than 6 Available PLMNs is to be signalled. | YES | ignore |
| Cells to be Deactivated List | | 0 . . . 1 | | List of cells to be deactivated | YES | reject |
| >Cells to be Deactivated List Item | | 1 . . . <maxCellingNBDU> | | | EACH | reject |
| >> NR CGI | M | | 9.3.1.12 | | — | |
| gNB-CU TNL Association To Add List | | 0 . . . 1 | | | YES | ignore |
| >gNB-CU TNL Association To Add Item IEs | | 1 . . . <maxnoofTNLAssociations> | | | EACH | ignore |
| >>TNL Association Transport Layer Information | M | | CP Transport Layer Address 9.3.2.4 | Transport Layer Address of the gNB-CU. | — | |
| >>TNL Association Usage | M | | ENUMERATED (ue, non-ue, both, . . .) | Indicates whether the TNL association is only used for UE-associated signalling, or non-UE-associated signalling, or both. For usage of this IE, refer to TS 38.472 [22]. | — | |
| gNB-CU TNL Association To Remove List | | 0 . . . 1 | | | YES | ignore |
| >gNB-CU TNL Association To Remove Item IEs | | 1 . . . <maxnoofTNLAssociation> | | | EACH | ignore |
| >>TNL Association Transport Layer Address | M | | CP Transport Layer Address 9.3.2.4 | Transport Layer Address of the gNB-CU. | — | |
| >>TNL Association Transport Layer Address gNB-DU | O | | CP Transport Layer Address 9.3.2.4 | Transport Layer Address of the gNB-DU. | YES | reject |
| gNB-CU TNL Association To Update List | | 0 . . . 1 | | | YES | ignore |
| >gNB-CU TNL Association To Update Item IEs | | 1 . . . <maxnoofTNLAssociations> | | | EACH | ignore |
| >>TNL Association Transport Layer Address | M | | CP Transport Layer Address 9.3.2.4 | Transport Layer Address of the gNB-CU. | — | |
| >>TNL Association Usage | O | | ENUMERATED (ue, non-ue, both, . . .) | Indicates whether the TNL association is only used for UE-associated signalling, or non-UE-associated signalling, or both. For usage of this IE, refer to TS 38.472 [22]. | — | |
| Cells to be barred List | | 0 . . .1 | | List of cells to be barred. | YES | ignore |
| >Cells to be barred List Item | | 1 . . . <maxCellingNBDU> | | | EACH | ignore |
| >>NR CGI | M | | 9.3.1.12 | | — | |
| >> Cell Barred | M | | ENUMERATED (barred, not-barred, . . .) | | — | |

-continued

| IE/Group Name | Presence | Range | IE type and reference | Semantics description | Criticality | Assigned Criticality |
|---|---|---|---|---|---|---|
| Protected E-UTRA Resources List | | 0 . . . 1 | | List of Protected E-UTRA Resources. | YES | reject |
| >Protected E-UTRA Resources List Item | | 1 . . . <maxCellineNB> | | | EACH | reject |
| >>Spectrum Sharing Group ID | M | | INTEGER (1 . . . maxCellineNB) | Indicates the E-UTRA cells involved in resource coordination with the NR cells affiliated with the same Spectrum Sharing Group ID. | — | |
| >> E-UTRA Cells List | | 1 | | List of applicable E-UTRA cells. | — | |
| >>> E-UTRA Cells List Item | | 1 . . . <maxCellineNB> | | | — | |
| >>>>EUTRA Cell ID | M | | BIT STRING(SIZE(28)) | Indicates the E-UTRAN Cell Global Identifier as defined in subclause 9.2.14 in TS 36.423 [9]. | — | |
| >>>>Served E-UTRA Cell Information | M | | 9.3.1.64 | | — | |
| Start Serving UEs for All Activated Cells | O | | ENUMERATED (True, . . .) | indicates to DU, in case of IAB-DU, to start serving UEs for all activated cells. | YES | ignore |

Embodiment 2—for UEs in Connected Mode

The network can selectively allow handovers of UEs to newly integrated IAB nodes, based on knowledge of other IAB nodes that are to be integrated.
1. It is determined at the CU that IAB nodes need to be integrated into the network. This can happen based on OAM signalling or other signalling between the operator network and the RAN.
2. A new IAB node performs access (either to the IAB donor or to one of the already integrated IAB nodes). It is integrated into the network according to the procedure of FIG. 2.
3. A UE performs measurement of the newly integrated IAB node and reports the measurement to the CU (for example, the measurement report may be triggered based on a handover measurement event such as A3). The CU checks if there are other IAB nodes pending integration near the newly integrated IAB node. If the CU identifies one or more such IAB nodes, it delays the handover of the UE until the other IAB nodes pending integration are integrated into the network.

Delaying of handover can have unfavourable consequences for the UEs and the system (UEs experience increased interference, and degraded performance). For this reason, instead of performing handovers of UEs, the network can transition the UE to Idle mode (using e.g., an RRC connection release message) and in addition indicate a minimum duration for which the UE should remain in idle mode. The duration covers the period of time needed for integration of the IAB nodes. The UEs can perform parent selection and reattach to the network, and may find a newly integrated IAB node to be a more suitable parent than the previous parent.

Methods for Establishing Efficient Integrated Access and Backhaul Network Topologies As discussed above, IAB nodes can be integrated into the network (referred to as IAB node "activation") in different sequences within the same area. Even if all IAB nodes are to be activated at about the same time, the completion of the node integration phases will take different durations for different IAB nodes. There will be variations in the amount of time taken due to the number of hops and signal conditions. Given that UEs/MTs can attach to the IAB node upon completion of the IAB DU setup, the differences in the durations to complete the integration procedure at different IAB nodes can result in:

IAB nodes selecting sub-optimal parents, and
UEs selecting sub-optimal parents.

One consequence of such sub-optimal parent selection is that handovers of the IAB nodes and UEs will need to be performed immediately after the network is setup or even during the network setup. This can impose a large signaling load in the network and may also be infeasible as the number of IAB nodes gets large.

This disclosure provides methods to ensure efficient selection of parents by IAB nodes and UEs during the integration procedure so that signaling related to handovers of UEs and IAB nodes can be avoided or minimized.

Various embodiments enable more efficient network operations and improved network capacity.

IAB networks (see, e.g., FIG. 4) are setup to improve capacity and coverage while limiting the cost of backhaul. IAB nodes in an area are expected to be activated at the same time. This is especially true for scenarios where IAB networks are used to provide additional capacity at events—e.g., at sporting events and concerts.

IAB nodes can be integrated into the network (referred to as IAB node "activation" below) in different sequences within the same area. Even if all IAB nodes are to be activated at about the same time, the completion of the node integration phases will take different durations for different IAB nodes. There will be variations in the amount of time taken due to the number of hops and signal conditions.

Given that UEs/MTs can attach to the IAB node upon completion of the IAB DU setup, the differences in the durations to complete the integration procedure at different IAB nodes can result in:

IAB nodes selecting sub-optimal parents, and

UEs selecting sub-optimal parents.

One consequence of such sub-optimal parent selection is that handovers of the IAB nodes and UEs will need to be performed immediately after the network is setup or even during the network setup. This can impose a large signalling load in the network and may also be infeasible as the number of IAB nodes gets large.

This disclosure provides methods to ensure efficient selection of parents by IAB nodes and UEs during the integration procedure so that signalling related to handovers of UEs and IAB nodes can be avoided or minimized. While the general principles here are explained for IAB node parent selection, similar techniques can be applied to UEs as well.

Methods for Efficient IAB Node Parent Selection

IAB nodes follow the same procedures as UEs for attaching to the network. The overall procedure for IAB node integration is shown in FIG. 11 (from 3GPP TS 38.401). In the first stage the IAB MT setup is performed. The MT of an IAB node, in its role as a regular UE, identifies a parent node (another IAB node or an IAB donor). The MT then performs random access and transmits an RRC connection setup request to the CU via the parent node. Following that, the backhaul RLC channel for carrying CP traffic to and from the IAB node is established. This is followed by a routing update phase which includes configuration of BAP routing identifiers and updating of routing tables of the IAB donor DU and all IAB nodes on the path to the IAB node. Following that, in the IAB DU setup phase, the DU functionality of the IAB node is configured (which includes setting up of the F1-C connection between the IAB node and the IAB donor CU). Once this is completed, the IAB node can provide service to UEs.

The sequence in which the IAB nodes are activated and integrated into the network greatly influences the resulting topology. A comparison of topologies resulting from the following may be analyzed:

randomly chosen sequence of IAB nodes is activated and integrated into the network The sequence in which IAB nodes are integrated into the network is based on the maximum RSRPs across all possible links between nodes that are already integrated into the network and nodes that are not yet integrated. For purposes of discussion this is referred to as the Ideal sequence.

The desired sequence is described as an algorithm below:

The set of potential parents P initially consists of the IAB donor only.

While there are IAB nodes to be activated:

From the set of un-activated IAB nodes, select the IAB node N with the strongest signal to a potential parent $P_i$ in P, make $P_i$ the parent node of N, and activate N Add N to P The analysis shows that the ideal sequence results in a much more efficient topology of the IAB network.

The ideal sequence of activations relies on knowledge of signal measurements such as RSRP measured at the IAB nodes. Note however, that the ideal sequence of node activations cannot be implemented in a practical network due to the fact that the centralized unit (CU)—which controls topology of the network—does not have information about such measurements.

Embodiments provide methods that approach the performance of the ideal sequence while not having the requirement of centralized measurement information.

Node Activation Based on Threshold Changing Over Time

The method consists of transmitting a message indicating the signal level threshold (such as RSRP threshold) by nodes that are integrated into the network. The threshold is used by IAB nodes to determine whether to select the node the node indicating the threshold as a parent.

This is illustrated using the FIGS. 16A-D and 17, as discussed below.

1. Step 1: The set of integrated nodes initially consists of only the IAB donor. The IAB donor indicates a signal level threshold (−65 dBm for example). IAB nodes perform measurements for parent selection. For example, IAB node 1 performs measurements and finds that the RSRP of the IAB donor's signal is at least −65 dBm. IAB node 1 selects the IAB donor as parent, performs access and follows the procedure of FIG. 1 to be integrated into the network.

2. Step 2: The set of integrated nodes consists of the IAB donor and IAB node 1.
   a. The IAB donor reduces the indicated threshold to −70 dBm. IAB node 1 concurrently indicates an RSRP threshold of −70 dBm.
   b. IAB node 6 and 8 perform measurements and find that the RSRP of the IAB donor's signal is above −70 dBm. Node 6 and 8 also find that the RSRP of IAB node 1's signal is below −70 dBm. Based on this nodes 6 and 8 select the IAB donor as parent and is integrated into the network.
   c. IAB node 2 performs measurements and finds that the RSRP of IAB node 1's signal is above the −70 dBm threshold. IAB node also finds the IAB donor's RSRP to be below the −70 dBm threshold. Based on this IAB node 2 selects IAB node 1 as parent and is integrated into the network.

3. Step 3: The set of integrated nodes consists of the IAB donor, IAB nodes 1, 2, 6 and 8.
   a. The IAB donor and IAB node 1 reduce the indicated threshold to −75 dBm. IAB nodes 2, 6 and 8 concurrently indicate an RSRP threshold of −75 dBm.
   b. IAB node 4 performs measurements and finds IAB node 6's signal to be above the threshold (and signals of the other integrated nodes to be below the threshold). It selects node 6 as a parent and is integrated into the network.
   c. IAB node 9 performs measurements and finds IAB node 8's signal to be above the threshold (and signals of the other integrated nodes to be below the threshold). It selects node 8 as a parent and is integrated into the network.

4. Step 4: The set of integrated nodes consists of the IAB donor, IAB nodes 1, 2, 4, 6, 8 and 9.
   a. The IAB donor and IAB node 1, 2, 6, 8 reduce the indicated threshold to −80 dBm. IAB node 4 and IAB node 9 concurrently indicate an RSRP threshold of −80 dBm.
   b. IAB node 5 performs measurements and finds IAB node 4's signal to be above the threshold (and signals of the other integrated nodes to be below the threshold). It selects node 4 as a parent and is integrated into the network.
   c. IAB node 3 performs measurements and finds IAB node 2's signal to be above the threshold (and signals of the other integrated nodes to be below the threshold). It selects node 2 as a parent and is integrated into the network.
5. Step 5: The set of integrated nodes consists of the IAB donor, IAB nodes 1, 2, 3, 4, 5, 6, 8 and 9.
   a. The IAB donor and IAB node 1, 2, 4, 6, 8 and 9 reduce the indicated threshold to −90 dBm. IAB node 3 and IAB node 5 concurrently indicate an RSRP threshold of −90 dBm. Note that the threshold increment steps need not be the same size. However, all integrated nodes indicate the same threshold value.
   b. IAB node 7 performs measurements and finds both the IAB donor and IAB node 9's RSRP to be above the threshold (and signals of the other integrated nodes to be below the threshold). It also finds the IAB donor's RSRP to be higher than that of IAB node 9. It selects the IAB donor as a parent and is integrated into the network.

The thresholds and increments of the thresholds shown are examples.

The indication of the threshold at any given time is preferably provided through broadcast system information of the cell. For example, the IAB donor can broadcast the threshold value in a system information block message. Similarly, the IAB nodes that are integrated into the network can broadcast the threshold value in a system information block message. The threshold values broadcast by the IAB donor and the integrated IAB nodes should be substantially similar, although adjustments to favour some nodes over others can be performed (and would result in slightly different values of thresholds broadcast by the nodes).

Additionally, the update of the threshold is performed by the IAB donor and the integrated IAB nodes in a synchronous manner. The system information broadcast of each node is controlled by the CU. Using step 2 above as an example, after node 1 is integrated into the network, the CU updates the system information message (to reflect the updated threshold) transmitted by the IAB donor and also starts transmission of the system information from IAB node 1 with the updated threshold. In another embodiment, the CU may generate the system information message with the updated threshold and send it to the IAB node 1, or may send the updated threshold over F1AP so that the IAB node 1 can generate the corresponding system information message. Similarly at step 3, the CU updates the system information messages transmitted by the IAB donor and IAB node 1, and initiates transmission of the system information message from IAB nodes 2, 6 and 8 (with the updated threshold). The updates of the threshold can be performed periodically with enough duration between the updates to enable new IAB nodes to select parents and integrate into the network.

Node Activation Based on Location Information

Location information of IAB nodes can be used to sequence the activation of nodes to yield a topology close to the ideal sequence. In situations where the radio links between the IAB donor and the IAB nodes and among the IAB nodes are line of sight, the location based activation may provide good performance.
1. The CU receives location information of all IAB nodes in the area. This could be through the operators OAM (Operations and Management) communication. The IAB nodes can provide their location to the OAM server using means not described here.
2. Based on the location information, the CU computes approximate expected RSRP values for each pair of nodes.
3. The algorithm shown for ideal sequencing is then followed to integrate the IAB nodes. Collection of measurements of non-integrated IAB nodes In order to facilitate the ideal sequencing, it may be possible to collect measurements of IAB nodes using a non-3gpp communication path. For example, IAB nodes and IAB donors may be equipped with WiFi or Bluetooth capabilities.
1. IAB nodes that are able to detect and measure the IAB donor, indicate their measurements to the IAB donor via the alternate communication path.
2. The IAB donor selects the IAB node (node A) that has the best measurement and indicates that it can integrate into the network. Node A performs access to the IAB node and is integrated.
3. The integrated node set I now consists of the IAB donor and node A. The IAB nodes now perform measurements of the IAB donor and node A and report this via the alternate path. The IAB donor selects the pair (I, c) where I is in I and c is an unintegrated IAB node, such that the RSRP of I measured at c is the highest of all such pairs. The IAB donor then indicates that c should integrate into the network.
4. This process continues until all IAB nodes are integrated.

Adaptive Coded-Forwarding for Network Coding

In IAB networks, network coding can be used for enhancing network reliability and reducing delay. When network coded packet segments are sent through the network with possibly complex topology and with different capacity and reliability conditions on different links, how data are forwarded through the links can impact the end-to-end reliability performance and the traffic load on the network, and thus needs to be investigated.

In an IAB network, between a source and a destination there may exist multiple paths, each of which may be composed of multiple hops. On each path data packets/packet segments are usually forwarded along the links without additional processing, which can be called the direct-forwarding strategy.

The direct-forwarding strategy fails to utilize the properties of network coding and is blind to the complex network conditions in IAB networks, and so becomes inefficient in some cases. The following are two examples. 1) If a multi-hop path has a weak link with a higher packet dropping rate, then network coding with direct-forwarding needs to provide enough redundant coded segments over the whole path to guarantee end-to-end reliability, which leads to unnecessary network load for the good links on the path. 2) If two paths are merging and each of them carries some encoded segments of the same packet, then it could be the case that the combined redundancy for the merged section is more than necessary for the required reliability on the corresponding links, which again unnecessarily overloads that part of network.

Embodiments herein provide an adaptive coded-forwarding scheme for network coding on IAB networks, which 1) supplements the direct-forwarding scheme by encoding and forwarding extra outgoing symbols if possible when the reliability target on a link is not met, and 2) throttles the number of outgoing symbols in case of excess redundancy (when the reliability target on a link is already met).

The adaptive coded-forwarding scheme supplements direct forwarding and can forward network coded data in a smart way that takes into account the complex network topology, different capacity and reliability conditions on different links, and the properties of network coding. It improves the end-to-end reliability performance and the traffic load on the IAB network.

In a multi-hop IAB network, there might be multiple paths/routes existing between message source and destination nodes. Network coding on such a network topology can exploit the multi-path diversity between source and destination to enhance reliability. In network coding, a packet is broken into several segments and linear combinations of these segments are formed to produce more encoded segments, which are then distributed to the multiple paths between source and destination. As long as the destination node accumulates enough encoded segments (not necessarily all of them), the original packet can be recovered and costly higher layer retransmission and congestion control can be avoided, although some of the paths may experience congestion or link-blockage.

The encoded packet segments are usually forwarded along the links of each path without additional processing, which is called the direct-forwarding scheme. In embodiments of an adaptive coded-forwarding scheme, basic forwarding may be performed for the encoded segments, but with the one or both of the following two strategies added:

(1) When there is enough number of coded segments for a packet received, a node decodes the packet and checks how many encoded segments each outgoing link has sent. If it is less than a predefined number that matches the needed link reliability, then the node encodes the packet into more segments and supplies the link with these extra coded segments until the predefined number is reached. During the period when the node is waiting for enough number of coded segments to decode the packet, it continues to forward the coded segments that it has received. This ensures that the adaptive coded forwarding scheme does not increase latency.

(2) Regardless of (1), each node keeps track of how many encoded segments of each packet has been transmitted on every outgoing link. If there are already enough segments for the required reliability (reaching the predefined number mentioned above), we stop the transmission of any additional segments from the same packet on the corresponding link.

Figure 17:
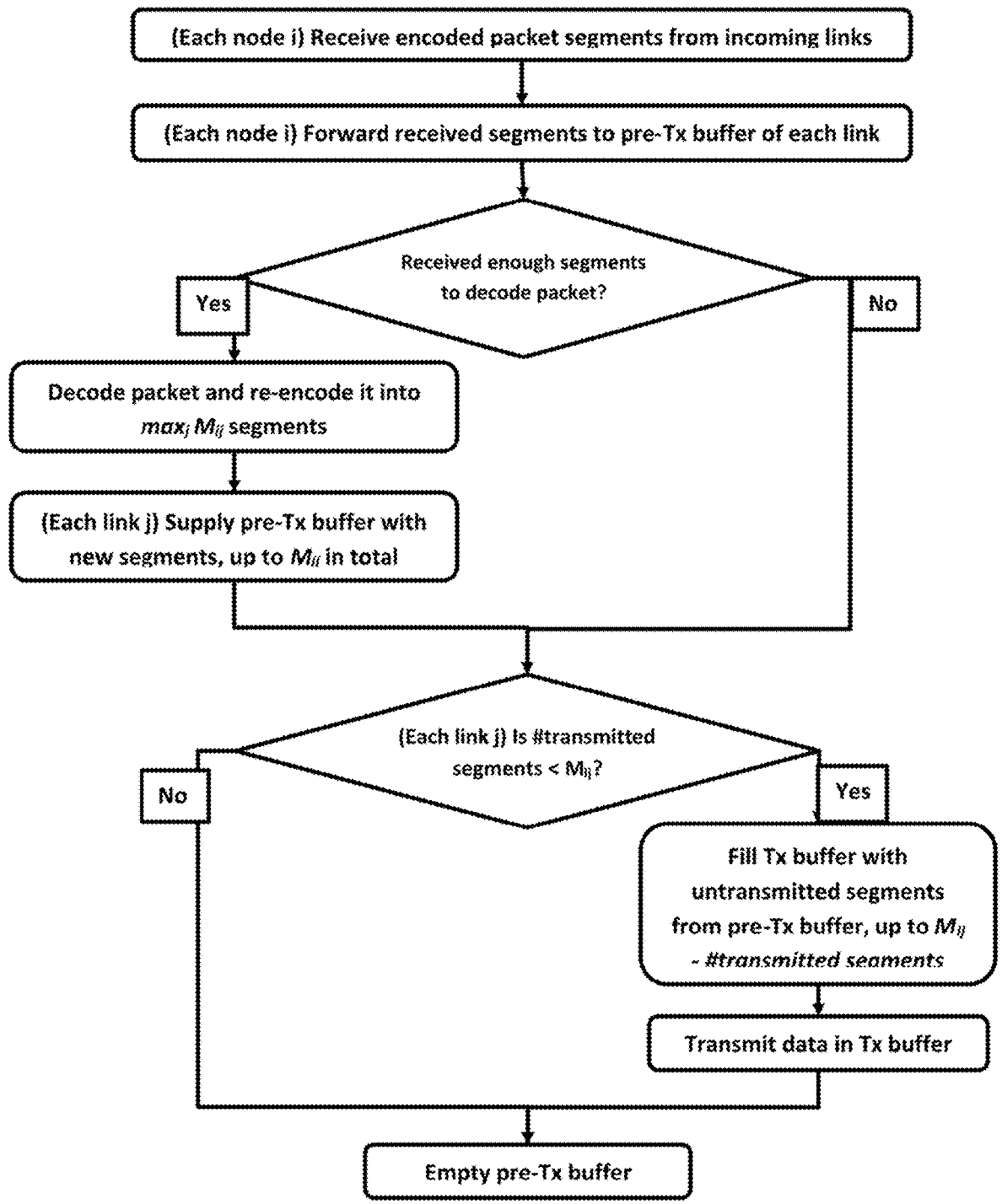
FIG. 17 is a flowchart for an adaptive code-forwarding scheme in accordance with various embodiments.

The flowchart for the adaptive coded-forwarding scheme is shown in FIG. 17 for each packet for each time slot, assuming the predefined number of encoded segments is $M_{ij}$ for link j of node i. Note that for each link there are two buffers for transmission, a pre-Tx buffer and a Tx buffer.

For reference, FIG. 6 shows a protocol architecture for IAB. Network coding in IAB is preferably performed at the Backhaul Adaptation protocol (BAP) layer. This allows network coding to operate between the IAB donor DU and the access IAB node of the UE (IAB node 2). Furthermore, adaptive coded forwarding can be performed at intermediate IAB nodes such as IAB node 1.

Figure 18:
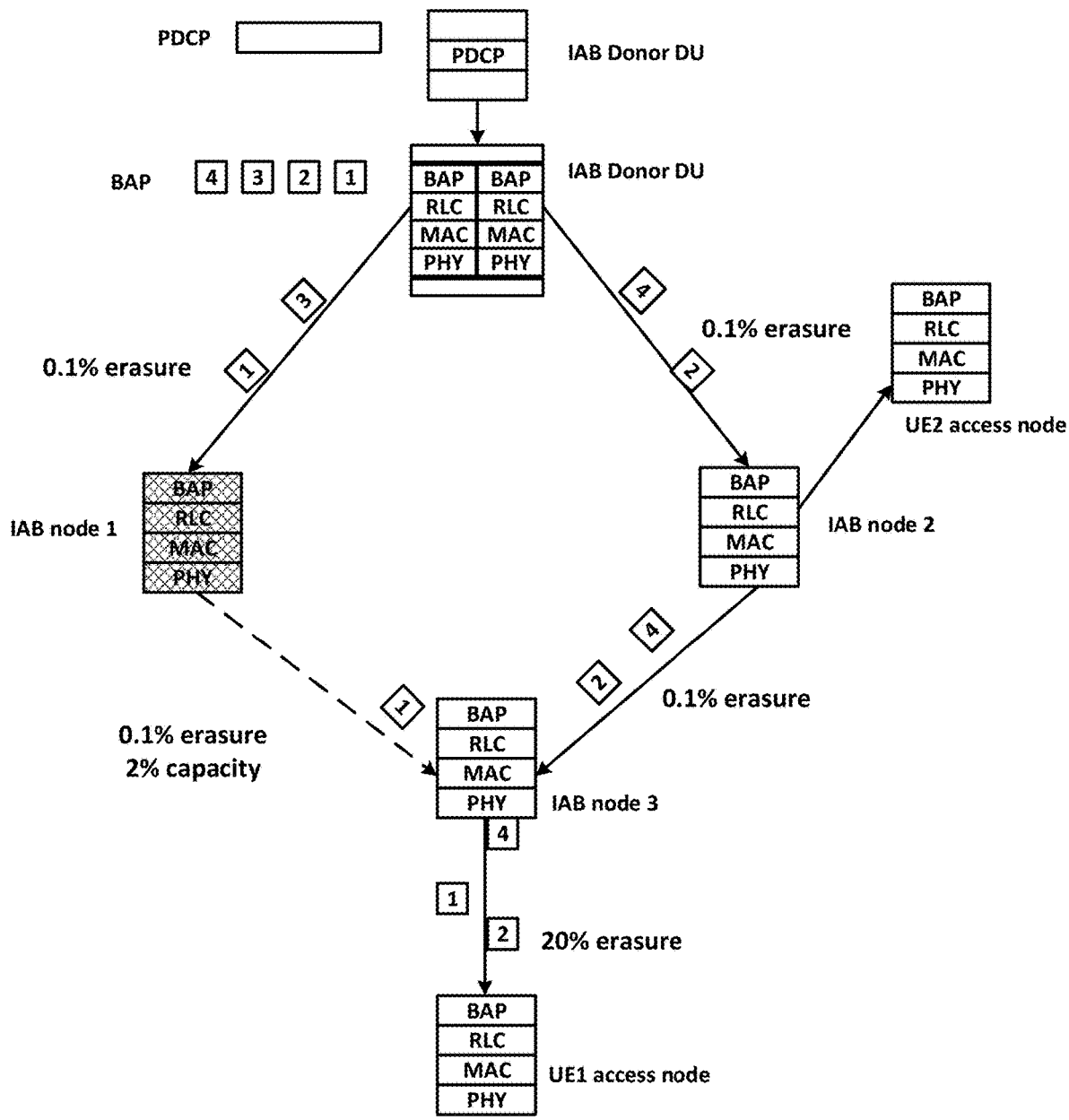
FIG. 18 illustrates an IAB network in accordance with various embodiments.

The performances of the two forwarding schemes is compared using simulations on the IAB network (connected with two UEs through two IAB nodes) in FIG. 18. The comparison is limited to the backhaul links (e.g., links between the donor DU and the access IAB node) as the UE is not involved in the network coding operation. In this network, there are two paths between the IAB donor node and UE1 (Donor-node 1-node 3-UE1 access node, and Donor-node 2 node 3-UE1 access node), whereas for UE2 there is only one path (Donor-node 2-UE2 access node). Because of congestion at node 1, the supported data rate of link 1-3 is only 2% of the other links. Furthermore, because the link between node 3 and UE1 access node is weak due to blockage or mobility, the packet dropping rate is high (20%). The network coding is performed at BAP layer and the upper layer packets arrive at the donor DU according to a Poisson process. Each packet has a latency bound of 20 ms. That is, if the packet is received & decoded at the destination within 20 ms, it is considered to have been successfully received; otherwise, it is considered a failure. The average packet arrival rate are the same for both UEs, and the routing scheme is rate-proportional, where at the donor each UE's packet segments are distributed to each available path with a probability in proportion to the corresponding supported data rate. In the simulations we fix the network coding rate of UE2 (10% redundancy) but change it for UE1, differently for each forwarding scheme. For direct-forwarding, no re-encoding is performed in the middle of any path, so we change the overall network coding rate for UE1. For adaptive coded-forward, we only change the network coding rate for the link node 3-UE1 access node (e.g., the weak link) but keep the network coding rate fixed (10% redundancy, same as for UE2) for the other links. For each UE the network coding rate on each link determines the "pre-defined number" $M_{ij}$ in the adaptive coded-forwarding scheme.

Figure 19:
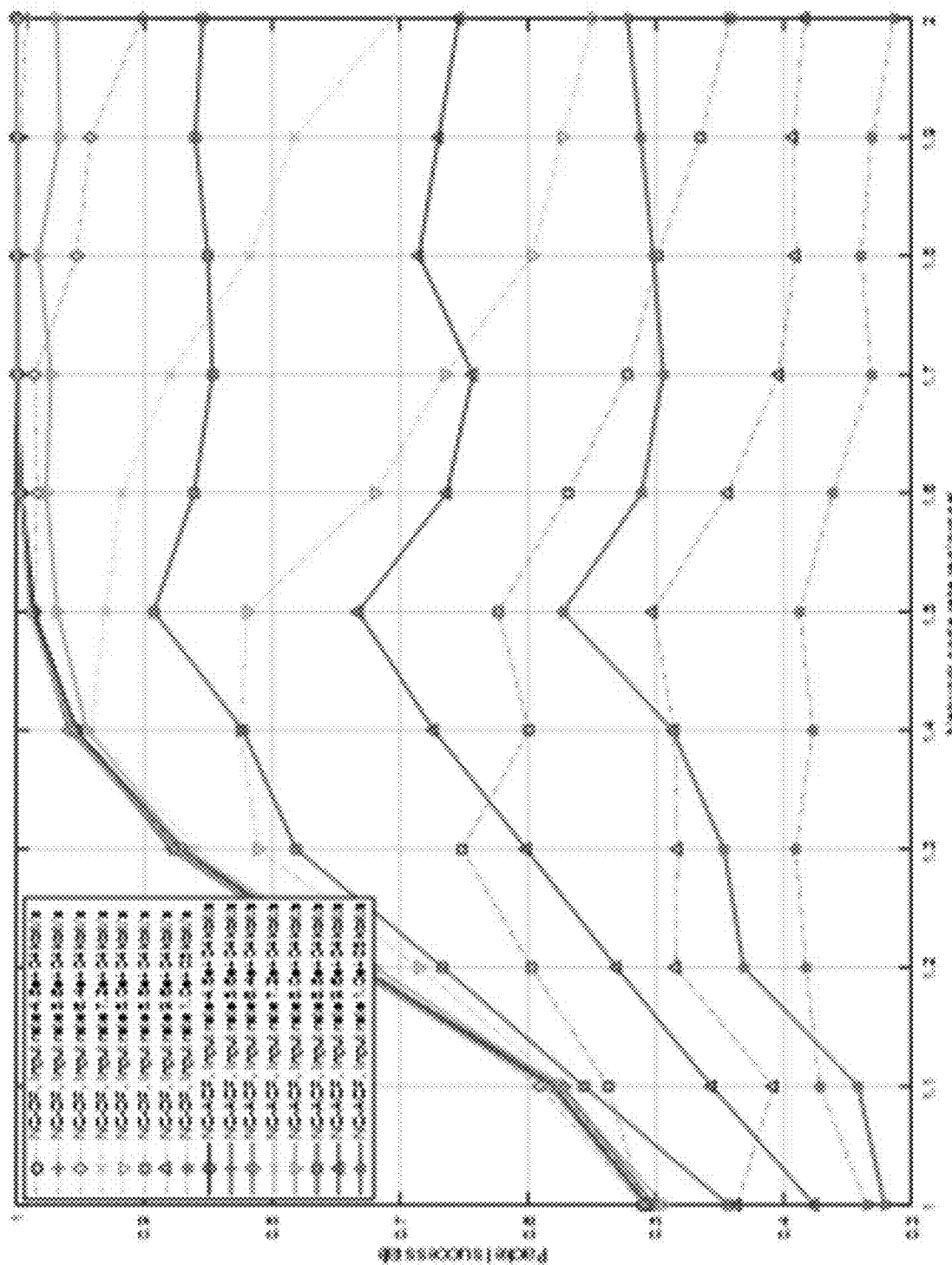
FIG. 19 illustrates a packet success rate for different network coding rates, in accordance with various embodiments.
Figure 20:
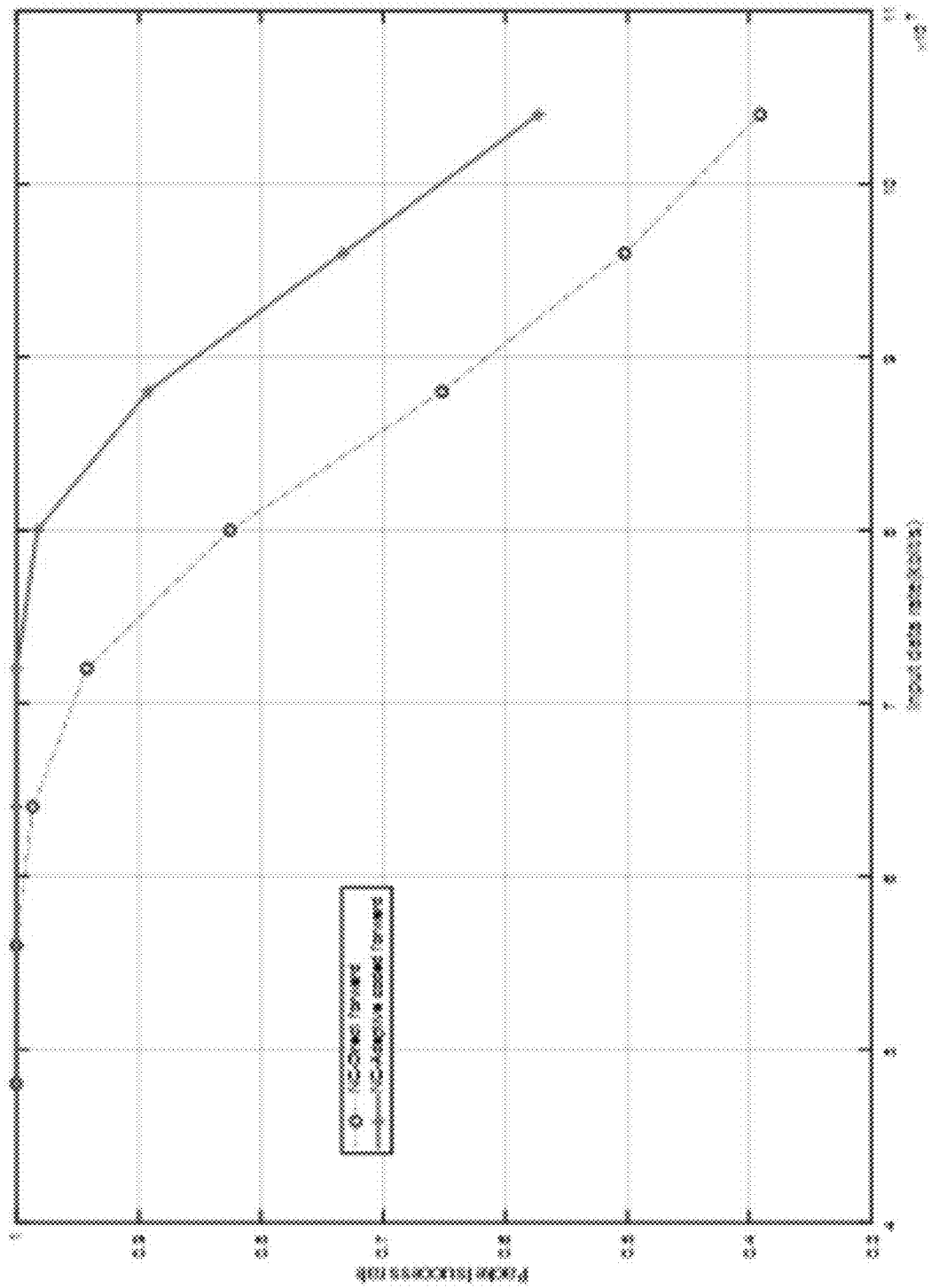
FIG. 20 illustrates a packet success rate for different network input data rate and best network coding rate for each scheme, in accordance with various embodiments.
Figure 21:
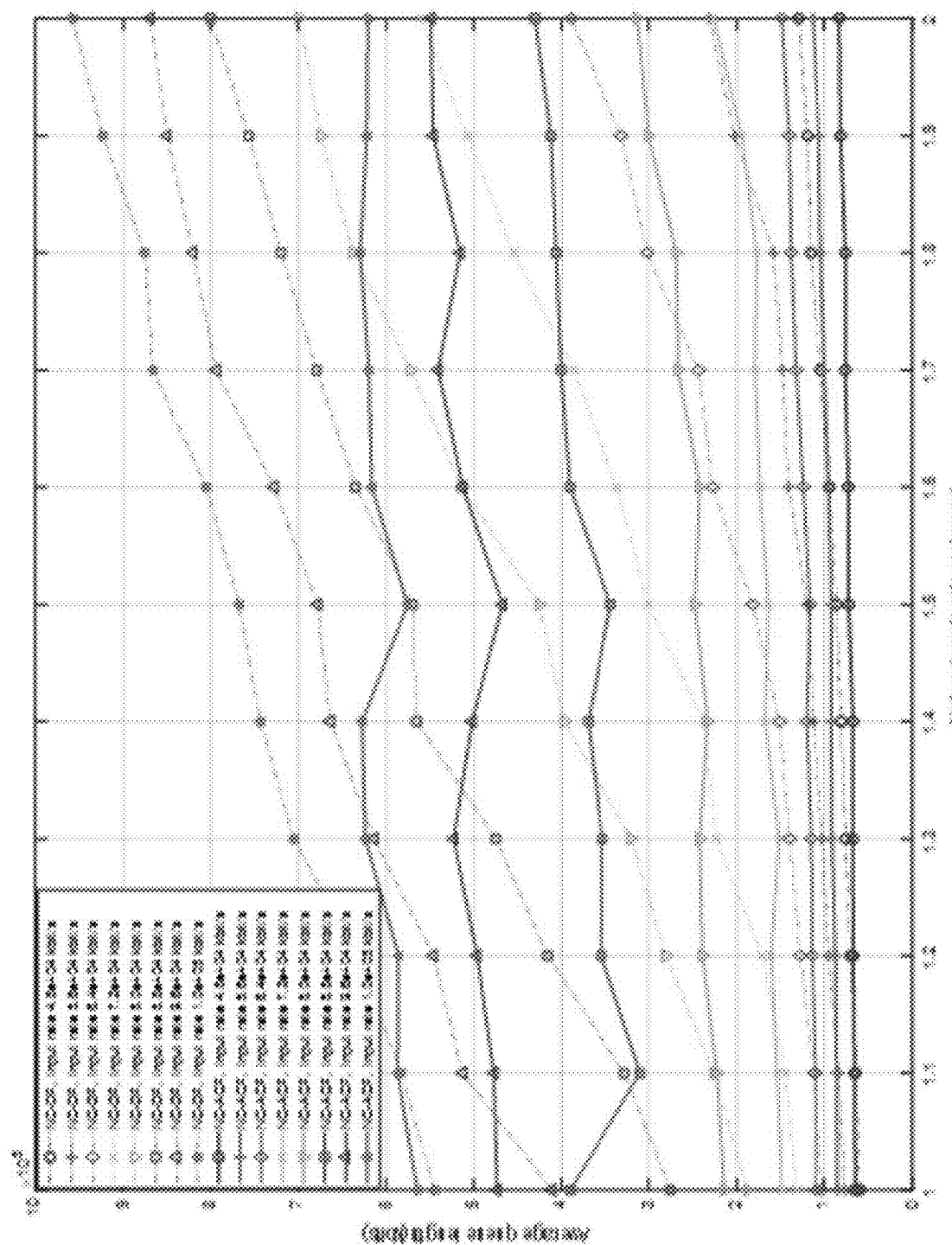
FIG. 21 illustrates average link transmit (Tx) buffer size, in accordance with various embodiments.

In FIG. 19, the packet success rates (the ratio of timely received packets) of direct-forwarding (NC-DF in the plot) and our adaptive coded-forwarding (NC-ACF in the plot) schemes are shown, with different network coding rate to provide redundancy for the weak link node 3-UE1 access node, under different network input data traffic rate. To demonstrate the proportion of coding redundancy, the reciprocal of network coding rate is used in the plot. As shown, when the input data rate is fixed, with different network coding rates the packet success rates are different for each scheme. However, the best success rate achieved under the adaptive coded-forwarding scheme is considerably higher than the direct-forwarding scheme. This is more clearly illustrated in FIG. 20, where for different network coding rates the highest packet success rate of each scheme is plotted under different input data rates. Given a reliability target of 95% or above, the adaptive coded-forwarding scheme improves 15%-20% on the supported input data rate over direct forwarding. Moreover, the Tx buffer sizes (averaged over time and links) for the two schemes are shown in FIG. 21, which reflect the traffic load of the network. As network coding redundancy is increased, the adaptive coded-forwarding scheme induces less network traffic.

Systems and Implementations

Figure 25:
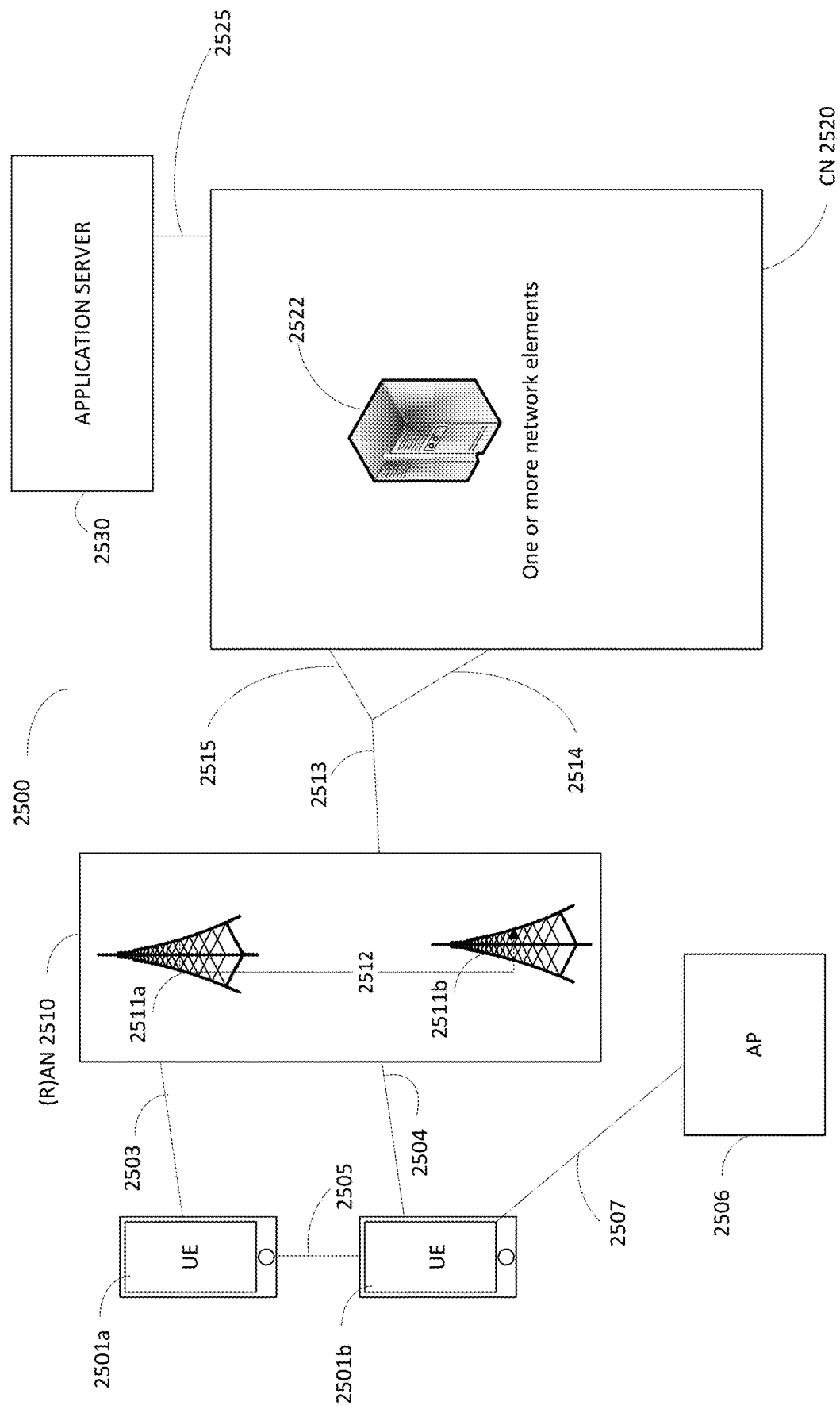
FIG. 25 illustrates an example architecture of a system of a network, in accordance with various embodiments.

FIG. 25 illustrates an example architecture of a system 2500 of a network, in accordance with various embodiments. The following description is provided for an example system 2500 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 25, the system 2500 includes UE 2501a and UE 2501b (collectively referred to as "UEs 2501" or "UE 2501"). In this example, UEs 2501 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 2501 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 2501 may be configured to connect, for example, communicatively couple, with an or RAN 2510. In embodiments, the RAN 2510 may be an NG RAN or a 5G RAN, an E-UTRAN, or a legacy RAN, such as a UTRAN or GERAN. As used herein, the term "NG RAN" or the like may refer to a RAN 2510 that operates in an NR or 5G system 2500, and the term "E-UTRAN" or the like may refer to a RAN 2510 that operates in an LTE or 4G system 2500. The UEs 2501 utilize connections (or channels) 2503 and 2504, respectively, each of which comprises a physical communications interface or layer (discussed in further detail below).

In this example, the connections 2503 and 2504 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 2501 may directly exchange communication data via a ProSe interface 2505. The ProSe interface 2505 may alternatively be referred to as a SL interface 2505 and may comprise one or more logical channels, including but not limited to a PSCCH, a PSSCH, a PSDCH, and a PSBCH.

The UE 2501b is shown to be configured to access an AP 2506 (also referred to as "WLAN node 2506," "WLAN 2506," "WLAN Termination 2506," "WT 2506" or the like) via connection 2507. The connection 2507 can comprise a local wireless connection, such as a connection consistent with any IEEE 802.11 protocol, wherein the AP 2506 would comprise a wireless fidelity (Wi-Fi®) router. In this example, the AP 2506 is shown to be connected to the Internet without connecting to the core network of the wireless system (described in further detail below). In various embodiments, the UE 2501b, RAN 2510, and AP 2506 may be configured to utilize LWA operation and/or LWIP operation. The LWA operation may involve the UE 2501b in RRC_CONNECTED being configured by a RAN node 2511a-b to utilize radio resources of LTE and WLAN. LWIP operation may involve the UE 2501b using WLAN radio resources (e.g., connection 2507) via IPsec protocol tunneling to authenticate and encrypt packets (e.g., IP packets) sent over the connection 2507. IPsec tunneling may include encapsulating the entirety of original IP packets and adding a new packet header, thereby protecting the original header of the IP packets.

The RAN 2510 can include one or more AN nodes or RAN nodes 2511a and 2511b (collectively referred to as "RAN nodes 2511" or "RAN node 2511") that enable the connections 2503 and 2504. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 2511 that operates in an NR or 5G system 2500 (for example, a gNB), and the term "E-UTRAN node" or the like may refer to a RAN node 2511 that operates in an LTE or 4G system 2500 (e.g., an eNB). According to various embodiments, the RAN nodes 2511 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 2511 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 2511; a MAC/PHY split wherein RRC, PDCP, RLC, and MAC layers are operated by the CRAN/vBBUP and the PHY layer is operated by individual RAN nodes 2511; or a "lower PHY" split wherein RRC, PDCP, RLC, MAC layers and upper portions of the PHY layer are operated by the CRAN/vBBUP and lower portions of the PHY layer are operated by individual RAN nodes 2511. This virtualized framework allows the freed-up processor cores of the RAN nodes 2511 to perform other virtualized applications. In some implementations, an individual RAN node 2511 may represent individual gNB-DUs that are connected to a gNB-CU via individual F1 interfaces (not shown by FIG. 25). In these implementations, the gNB-DUs may include one or more remote radio heads or RFEMs (see, e.g., FIG. 28), and the gNB-CU may be operated by a server that is located in the RAN 2510 (not shown) or by a server pool in a similar manner as the CRAN/vBBUP. Additionally or alternatively, one or more of the RAN nodes 2511 may be next generation eNBs (ng-eNBs), which are RAN nodes that provide E-UTRA user plane and control plane protocol terminations toward the UEs 2501, and are connected to a 5GC (e.g., CN 2720 of FIG. 27) via an NG interface (discussed infra).

In V2X scenarios one or more of the RAN nodes 2511 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 2501 (vUEs 2501). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 2511 can terminate the air interface protocol and can be the first point of contact for the UEs 2501. In some embodiments, any of the RAN nodes 2511 can fulfill various logical functions for the RAN 2510 including, but not limited to, radio network controller (RNC) functions such as radio bearer management, uplink and downlink dynamic radio resource management and data packet scheduling, and mobility management.

In embodiments, the UEs 2501 can be configured to communicate using OFDM communication signals with each other or with any of the RAN nodes 2511 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 2511 to the UEs 2501, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 2501 and the RAN nodes 2511 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 2501 and the RAN nodes 2511 may operate using LAA, eLAA, and/or feLAA mechanisms. In these implementations, the UEs 2501 and the RAN nodes 2511 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 2501 RAN nodes 2511, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 2501, AP 2506, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 2501 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 2501. The PDCCH carries information about the transport format and resource allocations related to the PDSCH channel, among other things. It may also inform the UEs 2501 about the transport format, resource allocation, and HARQ information related to the uplink shared channel. Typically, downlink scheduling (assigning control and shared channel resource blocks to the UE 2501*b* within a cell) may be performed at any of the RAN nodes 2511 based on channel quality information fed back from any of the UEs 2501. The downlink resource assignment information may be sent on the PDCCH used for (e.g., assigned to) each of the UEs 2501.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as EREGs. An ECCE may have other numbers of EREGs in some situations.

The RAN nodes 2511 may be configured to communicate with one another via interface 2512. In embodiments where the system 2500 is an LTE system (e.g., when CN 2520 is an EPC 2620 as in FIG. 26), the interface 2512 may be an X2 interface 2512. The X2 interface may be defined between two or more RAN nodes 2511 (e.g., two or more eNBs and the like) that connect to EPC 2520, and/or between two eNBs connecting to EPC 2520. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 2501 from an SeNB for user data; information of PDCP PDUs that were not delivered to a UE 2501; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 2500 is a 5G or NR system (e.g., when CN 2520 is an 5GC 2720 as in FIG. 27), the interface 2512 may be an Xn interface 2512. The Xn interface is defined between two or more RAN nodes 2511 (e.g., two or more gNBs and the like) that connect to 5GC 2520, between a RAN node 2511 (e.g., a gNB) connecting to 5GC 2520 and an eNB, and/or between two eNBs connecting to 5GC 2520. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 2501 in a connected mode (e.g., CM-CONNECTED) including functionality to manage the UE mobility for connected mode between one or more RAN nodes 2511. The mobility support may include context transfer from an old (source) serving RAN node 2511 to new (target) serving RAN node 2511; and control of user plane tunnels between old (source) serving RAN node 2511 to new (target) serving RAN node 2511. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 2510 is shown to be communicatively coupled to a core network—in this embodiment, core network (CN) 2520. The CN 2520 may comprise a plurality of network elements 2522, which are configured to offer various data and telecommunications services to customers/subscribers (e.g., users of UEs 2501) who are connected to the CN 2520 via the RAN 2510. The components of the CN 2520 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 2520 may be referred to as a network slice, and a logical instantiation of a portion of the CN 2520 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 2530 may be an element offering applications that use IP bearer resources with the core network (e.g., UMTS PS domain, LTE PS data services, etc.). The application server 2530 can also be configured to support one or more communication services (e.g., VoIP sessions, PTT sessions, group communication sessions, social networking services, etc.) for the UEs 2501 via the EPC 2520.

In embodiments, the CN 2520 may be a 5GC (referred to as "5GC 2520" or the like), and the RAN 2510 may be connected with the CN 2520 via an NG interface 2513. In embodiments, the NG interface 2513 may be split into two parts, an NG user plane (NG-U) interface 2514, which carries traffic data between the RAN nodes 2511 and a UPF, and the S1 control plane (NG-C) interface 2515, which is a signaling interface between the RAN nodes 2511 and AMFs. Embodiments where the CN 2520 is a 5GC 2520 are discussed in more detail with regard to FIG. 27.

In embodiments, the CN 2520 may be a 5G CN (referred to as "5GC 2520" or the like), while in other embodiments, the CN 2520 may be an EPC). Where CN 2520 is an EPC (referred to as "EPC 2520" or the like), the RAN 2510 may be connected with the CN 2520 via an S1 interface 2513. In embodiments, the S1 interface 2513 may be split into two parts, an S1 user plane (S1-U) interface 2514, which carries traffic data between the RAN nodes 2511 and the S-GW, and the S1-MME interface 2515, which is a signaling interface between the RAN nodes 2511 and MMES.

Figure 26:
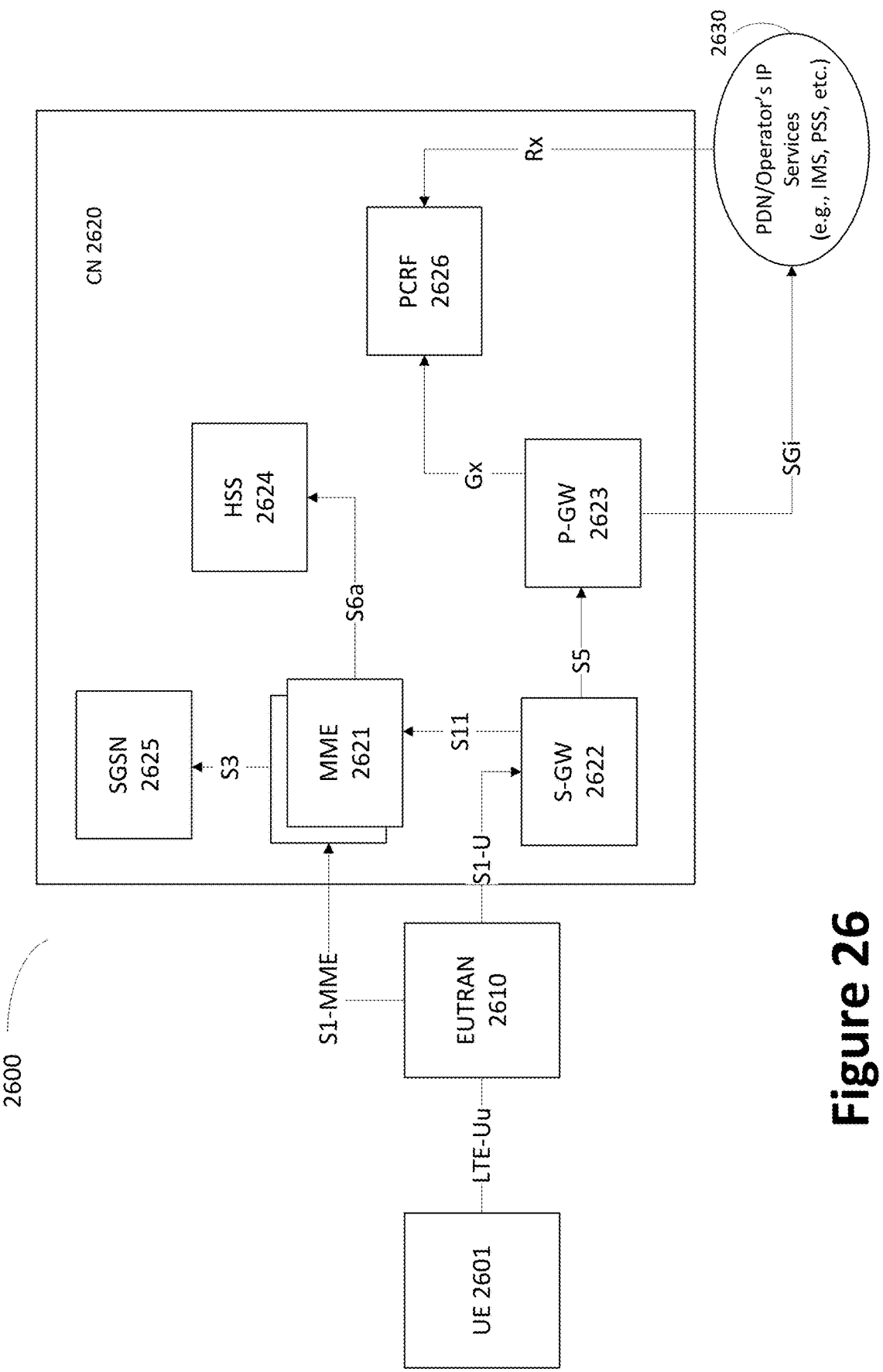
FIG. 26 illustrates an example architecture of a system including a first CN, in accordance with various embodiments.

FIG. 26 illustrates an example architecture of a system 2600 including a first CN 2620, in accordance with various embodiments. In this example, system 2600 may implement the LTE standard wherein the CN 2620 is an EPC 2620 that corresponds with CN XQ20 of Figure XQ. Additionally, the UE 2601 may be the same or similar as the UEs XQ01 of Figure XQ, and the E-UTRAN 2610 may be a RAN that is the same or similar to the RAN XQ10 of Figure XQ, and which may include RAN nodes XQ11 discussed previously. The CN 2620 may comprise MMES 2621, an S-GW 2622, a P-GW 2623, a HSS 2624, and a SGSN 2625.

The MMES 2621 may be similar in function to the control plane of legacy SGSN, and may implement MM functions to keep track of the current location of a UE 2601. The MMES 2621 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 2601, provide user identity confidentiality, and/or perform other like services to users/subscribers. Each UE 2601 and the MME 2621 may include an MM or EMM sublayer, and an MM context may be established in the UE 2601 and the MME 2621 when an attach procedure is successfully completed. The MM context may be a data structure or database object that stores MM-related information of the UE 2601. The MMES 2621 may be coupled with the HSS 2624 via an S6a reference point, coupled with the SGSN 2625 via an S3 reference point, and coupled with the S-GW 2622 via an S11 reference point.

The SGSN 2625 may be a node that serves the UE 2601 by tracking the location of an individual UE 2601 and performing security functions. In addition, the SGSN 2625 may perform Inter-EPC node signaling for mobility between 2G/3G and E-UTRAN 3GPP access networks; PDN and S-GW selection as specified by the MMEs 2621; handling of UE 2601 time zone functions as specified by the MMEs 2621; and MME selection for handovers to E-UTRAN 3GPP access network. The S3 reference point between the MMEs 2621 and the SGSN 2625 may enable user and bearer information exchange for inter-3GPP access network mobility in idle and/or active states.

The HSS 2624 may comprise a database for network users, including subscription-related information to support the network entities' handling of communication sessions. The EPC 2620 may comprise one or several HSSs 2624, depending on the number of mobile subscribers, on the capacity of the equipment, on the organization of the network, etc. For example, the HSS 2624 can provide support for routing/roaming, authentication, authorization, naming/addressing resolution, location dependencies, etc. An S6a reference point between the HSS 2624 and the MMEs 2621 may enable transfer of subscription and authentication data for authenticating/authorizing user access to the EPC 2620 between HSS 2624 and the MMEs 2621.

The S-GW 2622 may terminate the S1 interface XQ13 ("S1-U" in FIG. 26) toward the RAN 2610, and routes data packets between the RAN 2610 and the EPC 2620. In addition, the S-GW 2622 may be a local mobility anchor point for inter-RAN node handovers and also may provide an anchor for inter-3GPP mobility. Other responsibilities may include lawful intercept, charging, and some policy enforcement. The S11 reference point between the S-GW 2622 and the MMEs 2621 may provide a control plane between the MMEs 2621 and the S-GW 2622. The S-GW 2622 may be coupled with the P-GW 2623 via an S5 reference point.

The P-GW 2623 may terminate an SGi interface toward a PDN 2630. The P-GW 2623 may route data packets between the EPC 2620 and external networks such as a network including the application server XQ30 (alternatively referred to as an "AF") via an IP interface XQ25 (see e.g., Figure XQ). In embodiments, the P-GW 2623 may be communicatively coupled to an application server (application server XQ30 of Figure XQ or PDN 2630 in FIG. 26) via an IP communications interface XQ25 (see, e.g., Figure XQ). The S5 reference point between the P-GW 2623 and the S-GW 2622 may provide user plane tunneling and tunnel management between the P-GW 2623 and the S-GW 2622. The S5 reference point may also be used for S-GW 2622 relocation due to UE 2601 mobility and if the S-GW 2622 needs to connect to a non-collocated P-GW 2623 for the required PDN connectivity. The P-GW 2623 may further include a node for policy enforcement and charging data collection (e.g., PCEF (not shown)). Additionally, the SGi reference point between the P-GW 2623 and the packet data network (PDN) 2630 may be an operator external public, a private PDN, or an intra operator packet data network, for example, for provision of IMS services. The P-GW 2623 may be coupled with a PCRF 2626 via a Gx reference point.

PCRF 2626 is the policy and charging control element of the EPC 2620. In a non-roaming scenario, there may be a single PCRF 2626 in the Home Public Land Mobile Network (HPLMN) associated with a UE 2601's Internet Protocol Connectivity Access Network (IP-CAN) session. In a roaming scenario with local breakout of traffic, there may be two PCRFs associated with a UE 2601's IP-CAN session, a Home PCRF (H-PCRF) within an HPLMN and a Visited PCRF (V-PCRF) within a Visited Public Land Mobile Network (VPLMN). The PCRF 2626 may be communicatively coupled to the application server 2630 via the P-GW 2623. The application server 2630 may signal the PCRF 2626 to indicate a new service flow and select the appropriate QoS and charging parameters. The PCRF 2626 may provision this rule into a PCEF (not shown) with the appropriate TFT and QCI, which commences the QoS and charging as specified by the application server 2630. The Gx reference point between the PCRF 2626 and the P-GW 2623 may allow for the transfer of QoS policy and charging rules from the PCRF 2626 to PCEF in the P-GW 2623. An Rx reference point may reside between the PDN 2630 (or "AF 2630") and the PCRF 2626.

Figure 27:
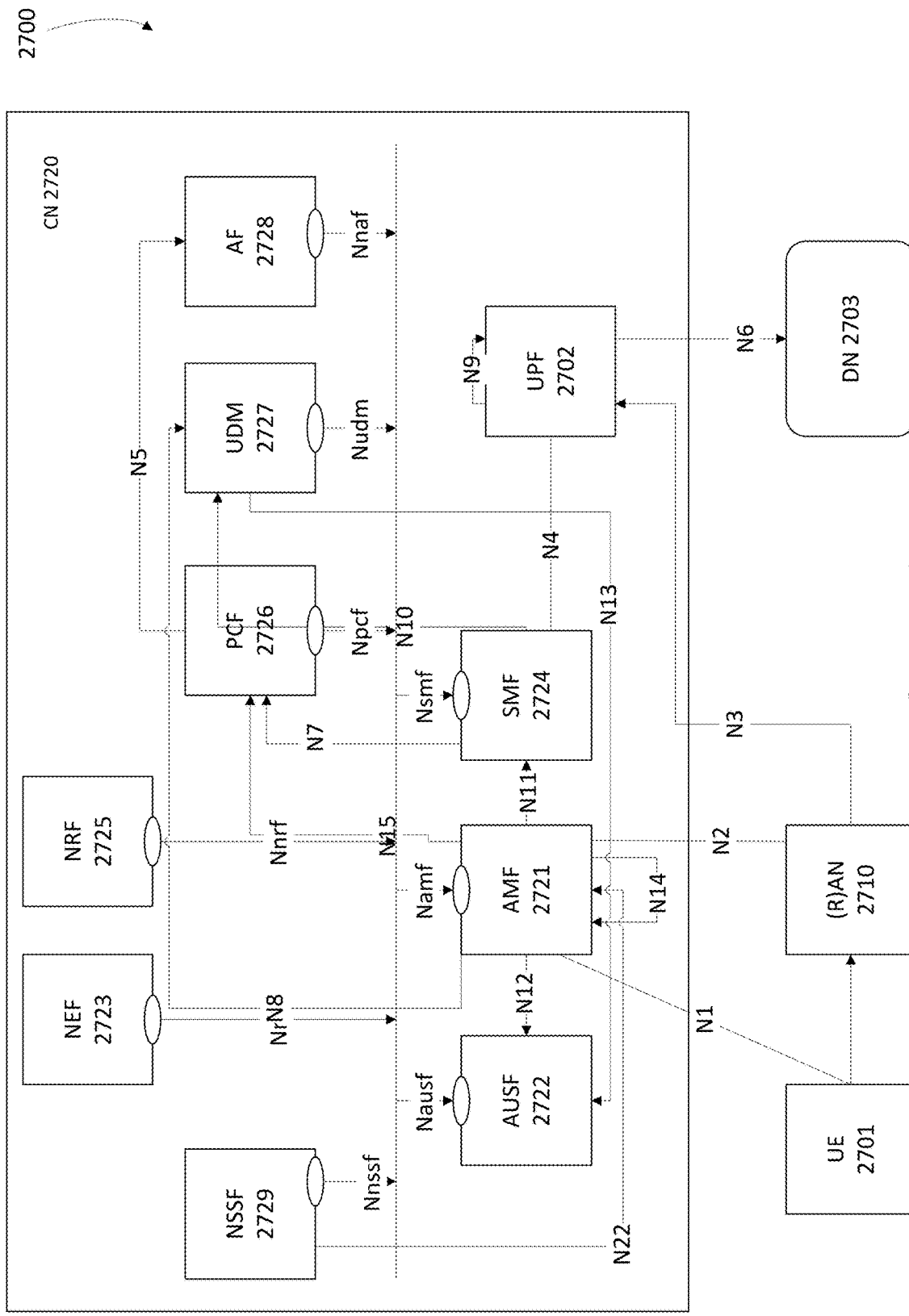
FIG. 27 illustrates an architecture of a system including a second CN in accordance with various embodiments.

FIG. 27 illustrates an architecture of a system 2700 including a second CN 2720 in accordance with various embodiments. The system 2700 is shown to include a UE 2701, which may be the same or similar to the UEs XQ01 and UE 2601 discussed previously; a (R)AN 2710, which may be the same or similar to the RAN XQ10 and RAN 2610 discussed previously, and which may include RAN nodes XQ11 discussed previously; and a DN 2703, which may be, for example, operator services, Internet access or 3rd party services; and a 5GC 2720. The 5GC 2720 may include an AUSF 2722; an AMF 2721; a SMF 2724; a NEF 2723; a PCF 2726; a NRF 2725; a UDM 2727; an AF 2728; a UPF 2702; and a NSSF 2729.

The UPF 2702 may act as an anchor point for intra-RAT and inter-RAT mobility, an external PDU session point of interconnect to DN 2703, and a branching point to support multi-homed PDU session. The UPF 2702 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 2702 may include an uplink classifier to support routing traffic flows to a data network. The DN 2703 may represent various network operator services, Internet access, or third party services. DN 2703 may include, or be similar to, application server XQ30 discussed previously. The UPF 2702 may interact with the SMF 2724 via an N4 reference point between the SMF 2724 and the UPF 2702.

The AUSF 2722 may store data for authentication of UE 2701 and handle authentication-related functionality. The AUSF 2722 may facilitate a common authentication framework for various access types. The AUSF 2722 may communicate with the AMF 2721 via an N12 reference point between the AMF 2721 and the AUSF 2722; and may communicate with the UDM 2727 via an N13 reference point between the UDM 2727 and the AUSF 2722. Additionally, the AUSF 2722 may exhibit an Nausf service-based interface.

The AMF 2721 may be responsible for registration management (e.g., for registering UE 2701, etc.), connection management, reachability management, mobility management, and lawful interception of AMF-related events, and access authentication and authorization. The AMF 2721 may be a termination point for the an N11 reference point between the AMF 2721 and the SMF 2724. The AMF 2721 may provide transport for SM messages between the UE 2701 and the SMF 2724, and act as a transparent proxy for routing SM messages. AMF 2721 may also provide transport for SMS messages between UE 2701 and an SMSF (not shown by FIG. 27). AMF 2721 may act as SEAF, which may include interaction with the AUSF 2722 and the UE 2701, receipt of an intermediate key that was established as a result of the UE 2701 authentication process. Where USIM based authentication is used, the AMF 2721 may retrieve the security material from the AUSF 2722. AMF 2721 may also include a SCM function, which receives a key from the SEA that it uses to derive access-network specific keys. Furthermore, AMF 2721 may be a termination point of a RAN CP interface, which may include or be an N2 reference point between the (R)AN 2710 and the AMF 2721; and the AMF 2721 may be a termination point of NAS (N1) signalling, and perform NAS ciphering and integrity protection.

AMF 2721 may also support NAS signalling with a UE 2701 over an N3 IWF interface. The N3IWF may be used to provide access to untrusted entities. N3IWF may be a termination point for the N2 interface between the (R)AN 2710 and the AMF 2721 for the control plane, and may be a termination point for the N3 reference point between the (R)AN 2710 and the UPF 2702 for the user plane. As such, the AMF 2721 may handle N2 signalling from the SMF 2724 and the AMF 2721 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 2701 and AMF 2721 via an N1 reference point between the UE 2701 and the AMF 2721, and relay uplink and downlink user-plane packets between the UE 2701 and UPF 2702. The N3IWF also provides mechanisms for IPsec tunnel establishment with the UE 2701. The AMF 2721 may exhibit an Namf service-based interface, and may be a termination point for an N14 reference point between two AMFs 2721 and an N17 reference point between the AMF 2721 and a 5G-EIR (not shown by FIG. 27).

The UE 2701 may need to register with the AMF 2721 in order to receive network services. RM is used to register or deregister the UE 2701 with the network (e.g., AMF 2721), and establish a UE context in the network (e.g., AMF 2721). The UE 2701 may operate in an RM-REGISTERED state or an RM-DEREGISTERED state. In the RM-DEREGISTERED state, the UE 2701 is not registered with the network, and the UE context in AMF 2721 holds no valid location or routing information for the UE 2701 so the UE 2701 is not reachable by the AMF 2721. In the RM-REGISTERED state, the UE 2701 is registered with the network, and the UE context in AMF 2721 may hold a valid location or routing information for the UE 2701 so the UE 2701 is reachable by the AMF 2721. In the RM-REGISTERED state, the UE 2701 may perform mobility Registration Update procedures, perform periodic Registration Update procedures triggered by expiration of the periodic update timer (e.g., to notify the network that the UE 2701 is still active), and perform a Registration Update procedure to update UE capability information or to re-negotiate protocol parameters with the network, among others.

The AMF 2721 may store one or more RM contexts for the UE 2701, where each RM context is associated with a specific access to the network. The RM context may be a data structure, database object, etc. that indicates or stores, inter alia, a registration state per access type and the periodic update timer. The AMF 2721 may also store a 5GC MM context that may be the same or similar to the (E)MM context discussed previously. In various embodiments, the AMF 2721 may store a CE mode B Restriction parameter of the UE 2701 in an associated MM context or RM context. The AMF 2721 may also derive the value, when needed, from the UE's usage setting parameter already stored in the UE context (and/or MM/RM context).

CM may be used to establish and release a signaling connection between the UE 2701 and the AMF 2721 over the N1 interface. The signaling connection is used to enable NAS signaling exchange between the UE 2701 and the CN 2720, and comprises both the signaling connection between the UE and the AN (e.g., RRC connection or UE-N3IWF connection for non-3GPP access) and the N2 connection for the UE 2701 between the AN (e.g., RAN 2710) and the AMF 2721. The UE 2701 may operate in one of two CM states, CM-IDLE mode or CM-CONNECTED mode. When the UE 2701 is operating in the CM-IDLE state/mode, the UE 2701 may have no NAS signaling connection established with the AMF 2721 over the N1 interface, and there may be (R)AN 2710 signaling connection (e.g., N2 and/or N3 connections) for the UE 2701. When the UE 2701 is operating in the CM-CONNECTED state/mode, the UE 2701 may have an established NAS signaling connection with the AMF 2721 over the N1 interface, and there may be a (R)AN 2710 signaling connection (e.g., N2 and/or N3 connections) for the UE 2701. Establishment of an N2 connection between the (R)AN 2710 and the AMF 2721 may cause the UE 2701 to transition from CM-IDLE mode to CM-CONNECTED mode, and the UE 2701 may transition from the CM-CONNECTED mode to the CM-IDLE mode when N2 signaling between the (R)AN 2710 and the AMF 2721 is released.

The SMF 2724 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 2701 and a data network (DN) 2703 identified by a Data Network Name (DNN). PDU sessions may be established upon UE 2701 request, modified upon UE 2701 and 5GC 2720 request, and released upon UE 2701 and 5GC 2720 request using NAS SM signaling exchanged over the N1 reference point between the UE 2701 and the SMF 2724. Upon request from an application server, the 5GC 2720 may trigger a specific application in the UE 2701. In response to receipt of the trigger message, the UE 2701 may pass the trigger message (or relevant parts/information of the trigger message) to one or more identified applications in the UE 2701. The identified application(s) in the UE 2701 may establish a PDU session to a specific DNN. The SMF 2724 may check whether the UE 2701 requests are compliant with user subscription information associated with the UE 2701. In this regard, the SMF 2724 may retrieve and/or request to receive update notifications on SMF 2724 level subscription data from the UDM 2727.

The SMF 2724 may include the following roaming functionality: handling local enforcement to apply QoS SLAB (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 2724 may be included in the system 2700, which may be between another SMF 2724 in a visited network and the SMF 2724 in the home network in roaming scenarios. Additionally, the SMF 2724 may exhibit the Nsmf service-based interface.

The NEF 2723 may provide means for securely exposing the services and capabilities provided by 3GPP network functions for third party, internal exposure/re-exposure, Application Functions (e.g., AF 2728), edge computing or fog computing systems, etc. In such embodiments, the NEF 2723 may authenticate, authorize, and/or throttle the AFs. NEF 2723 may also translate information exchanged with the AF 2728 and information exchanged with internal network functions. For example, the NEF 2723 may translate between an AF-Service-Identifier and an internal 5GC information. NEF 2723 may also receive information from other network functions (NFs) based on exposed capabilities of other network functions. This information may be stored at the NEF 2723 as structured data, or at a data storage NF using standardized interfaces. The stored information can then be re-exposed by the NEF 2723 to other NFs and AFs, and/or used for other purposes such as analytics. Additionally, the NEF 2723 may exhibit an Nnef service-based interface.

The NRF 2725 may support service discovery functions, receive NF discovery requests from NF instances, and provide the information of the discovered NF instances to the NF instances. NRF 2725 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 2725 may exhibit the Nnrf service-based interface.

The PCF 2726 may provide policy rules to control plane function(s) to enforce them, and may also support unified policy framework to govern network behaviour. The PCF 2726 may also implement an FE to access subscription information relevant for policy decisions in a UDR of the UDM 2727. The PCF 2726 may communicate with the AMF 2721 via an N15 reference point between the PCF 2726 and the AMF 2721, which may include a PCF 2726 in a visited network and the AMF 2721 in case of roaming scenarios. The PCF 2726 may communicate with the AF 2728 via an N5 reference point between the PCF 2726 and the AF 2728; and with the SMF 2724 via an N7 reference point between the PCF 2726 and the SMF 2724. The system 2700 and/or CN 2720 may also include an N24 reference point between the PCF 2726 (in the home network) and a PCF 2726 in a visited network. Additionally, the PCF 2726 may exhibit an Npcf service-based interface.

The UDM 2727 may handle subscription-related information to support the network entities' handling of communication sessions, and may store subscription data of UE 2701. For example, subscription data may be communicated between the UDM 2727 and the AMF 2721 via an N8 reference point between the UDM 2727 and the AMF. The UDM 2727 may include two parts, an application FE and a UDR (the FE and UDR are not shown by FIG. 27). The UDR may store subscription data and policy data for the UDM 2727 and the PCF 2726, and/or structured data for exposure and application data (including PFDs for application detection, application request information for multiple UEs 2701) for the NEF 2723. The Nudr service-based interface may be exhibited by the UDR 221 to allow the UDM 2727, PCF 2726, and NEF 2723 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 2724 via an N10 reference point between the UDM 2727 and the SMF 2724. UDM 2727 may also support SMS management, wherein an SMS-FE implements the similar application logic as discussed previously. Additionally, the UDM 2727 may exhibit the Nudm service-based interface.

The AF 2728 may provide application influence on traffic routing, provide access to the NCE, and interact with the policy framework for policy control. The NCE may be a mechanism that allows the 5GC 2720 and AF 2728 to provide information to each other via NEF 2723, which may be used for edge computing implementations. In such implementations, the network operator and third party services may be hosted close to the UE 2701 access point of attachment to achieve an efficient service delivery through the reduced end-to-end latency and load on the transport network. For edge computing implementations, the 5GC may select a UPF 2702 close to the UE 2701 and execute traffic steering from the UPF 2702 to DN 2703 via the N6 interface. This may be based on the UE subscription data, UE location, and information provided by the AF 2728. In this way, the AF 2728 may influence UPF (re)selection and traffic routing. Based on operator deployment, when AF 2728 is considered to be a trusted entity, the network operator may permit AF 2728 to interact directly with relevant NFs. Additionally, the AF 2728 may exhibit an Naf service-based interface.

The NSSF 2729 may select a set of network slice instances serving the UE 2701. The NSSF 2729 may also determine allowed NSSAI and the mapping to the subscribed S-NSSAIs, if needed. The NSSF 2729 may also determine the AMF set to be used to serve the UE 2701, or a list of candidate AMF(s) 2721 based on a suitable configuration and possibly by querying the NRF 2725. The selection of a set of network slice instances for the UE 2701 may be triggered by the AMF 2721 with which the UE 2701 is registered by interacting with the NSSF 2729, which may lead to a change of AMF 2721. The NSSF 2729 may interact with the AMF 2721 via an N22 reference point between AMF 2721 and NSSF 2729; and may communicate with another NSSF 2729 in a visited network via an N31 reference point (not shown by FIG. 27). Additionally, the NSSF 2729 may exhibit an Nnssf service-based interface.

As discussed previously, the CN 2720 may include an SMSF, which may be responsible for SMS subscription checking and verification, and relaying SM messages to/from the UE 2701 to/from other entities, such as an SMS-GMSC/IWMSC/SMS-router. The SMS may also interact with AMF 2721 and UDM 2727 for a notification procedure that the UE 2701 is available for SMS transfer (e.g., set a UE not reachable flag, and notifying UDM 2727 when UE 2701 is available for SMS).

The CN 120 may also include other elements that are not shown by FIG. 27, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 27). Individual NFs may share a UDSF for storing their respective unstructured data or individual NFs may each have their own UDSF located at or near the individual NFs. Additionally, the UDSF may exhibit an Nudsf service-based interface (not shown by FIG. 27). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 27 for clarity. In one example, the CN 2720 may include an Nx interface, which is an inter-CN interface between the MME (e.g., MME 2621) and the AMF 2721 in order to enable interworking between CN 2720 and CN 2620. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 28:
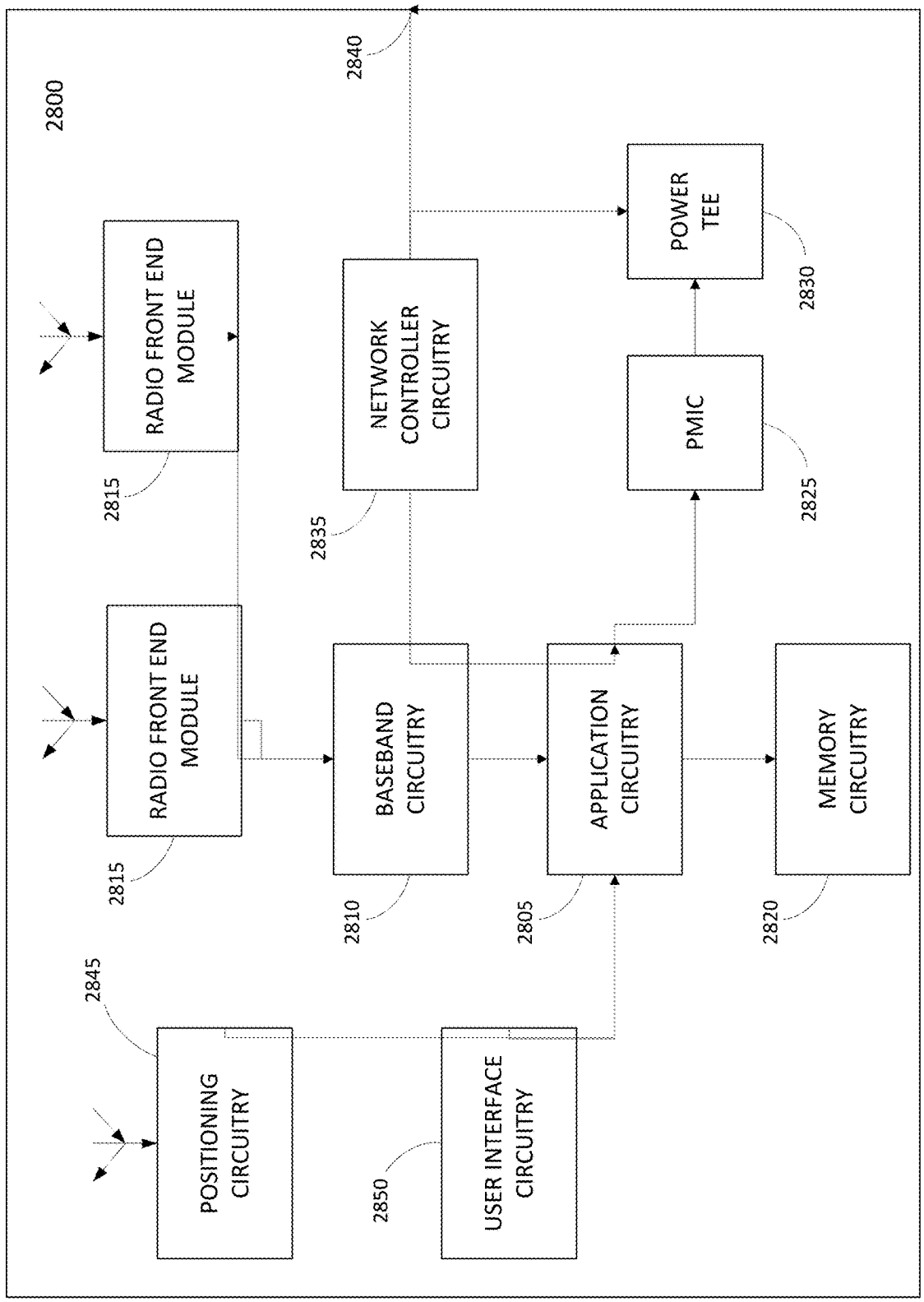
FIG. 28 illustrates an example of infrastructure equipment in accordance with various embodiments.

FIG. 28 illustrates an example of infrastructure equipment 2800 in accordance with various embodiments. The infrastructure equipment 2800 (or "system 2800") may be implemented as a base station, radio head, RAN node such as the RAN nodes XQ11 and/or AP XQ06 shown and described previously, application server(s) XQ30, and/or any other element/device discussed herein. In other examples, the system 2800 could be implemented in or by a UE.

The system 2800 includes application circuitry 2805, baseband circuitry 2810, one or more radio front end modules (RFEMs) 2815, memory circuitry 2820, power management integrated circuitry (PMIC) 2825, power tee circuitry 2830, network controller circuitry 2835, network interface connector 2840, satellite positioning circuitry 2845, and user interface 2850. In some embodiments, the device 2800 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 2805 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 2805 may be coupled with or may include memory/storage elements and may be configured to execute instructions stored in the memory/storage to enable various applications or operating systems to run on the system 2800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 2805 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 2805 may comprise, or may be, a special-purpose processor/controller to operate according to the various embodiments herein. As examples, the processor(s) of application circuitry 2805 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 2800 may not utilize application circuitry 2805, and instead may include a special-purpose processor/controller to process IP data received from an EPC or 5GC, for example.

In some implementations, the application circuitry 2805 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 2805 may comprise logic blocks or logic fabric, and other interconnected resources that may be programmed to perform various functions, such as the procedures, methods, functions, etc. of the various embodiments discussed herein. In such embodiments, the circuitry of application circuitry 2805 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 2810 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 2810 are discussed infra with regard to FIG. 30.

User interface circuitry 2850 may include one or more user interfaces designed to enable user interaction with the system 2800 or peripheral component interfaces designed to enable peripheral component interaction with the system 2800. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 2815 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 3011 of FIG. 30 infra), and the RFEM may be connected to multiple antennas. In alternative implementations, both mmWave and sub-mmWave radio functions may be implemented in the same physical RFEM 2815, which incorporates both mmWave antennas and sub-mmWave.

The memory circuitry 2820 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 2820 may be implemented as one or more of solder down packaged integrated circuits, socketed memory modules and plug-in memory cards.

The PMIC 2825 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 2830 may provide for electrical power drawn from a network cable to provide both power supply and data connectivity to the infrastructure equipment 2800 using a single cable.

The network controller circuitry 2835 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 2800 via network interface connector 2840 using a physical connection, which may be electrical (commonly referred to as a "copper interconnect"), optical, or wireless. The network controller circuitry 2835 may include one or more dedicated processors and/or FPGAs to communicate using one or more of the aforementioned protocols. In some implementations, the network controller circuitry 2835 may include multiple controllers to provide connectivity to other networks using the same or different protocols.

The positioning circuitry 2845 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 2845 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 2845 may include a Micro-Technology for Positioning, Navigation, and Timing (Micro-PNT) IC that uses a master timing clock to perform position tracking/estimation without GNSS assistance. The positioning circuitry 2845 may also be part of, or interact with, the baseband circuitry 2810 and/or RFEMs 2815 to communicate with the nodes and components of the positioning network. The positioning circuitry 2845 may also provide position data and/or time data to the application circuitry 2805, which may use the data to synchronize operations with various infrastructure (e.g., RAN nodes XQ11, etc.), or the like.

The components shown by FIG. 28 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 29:
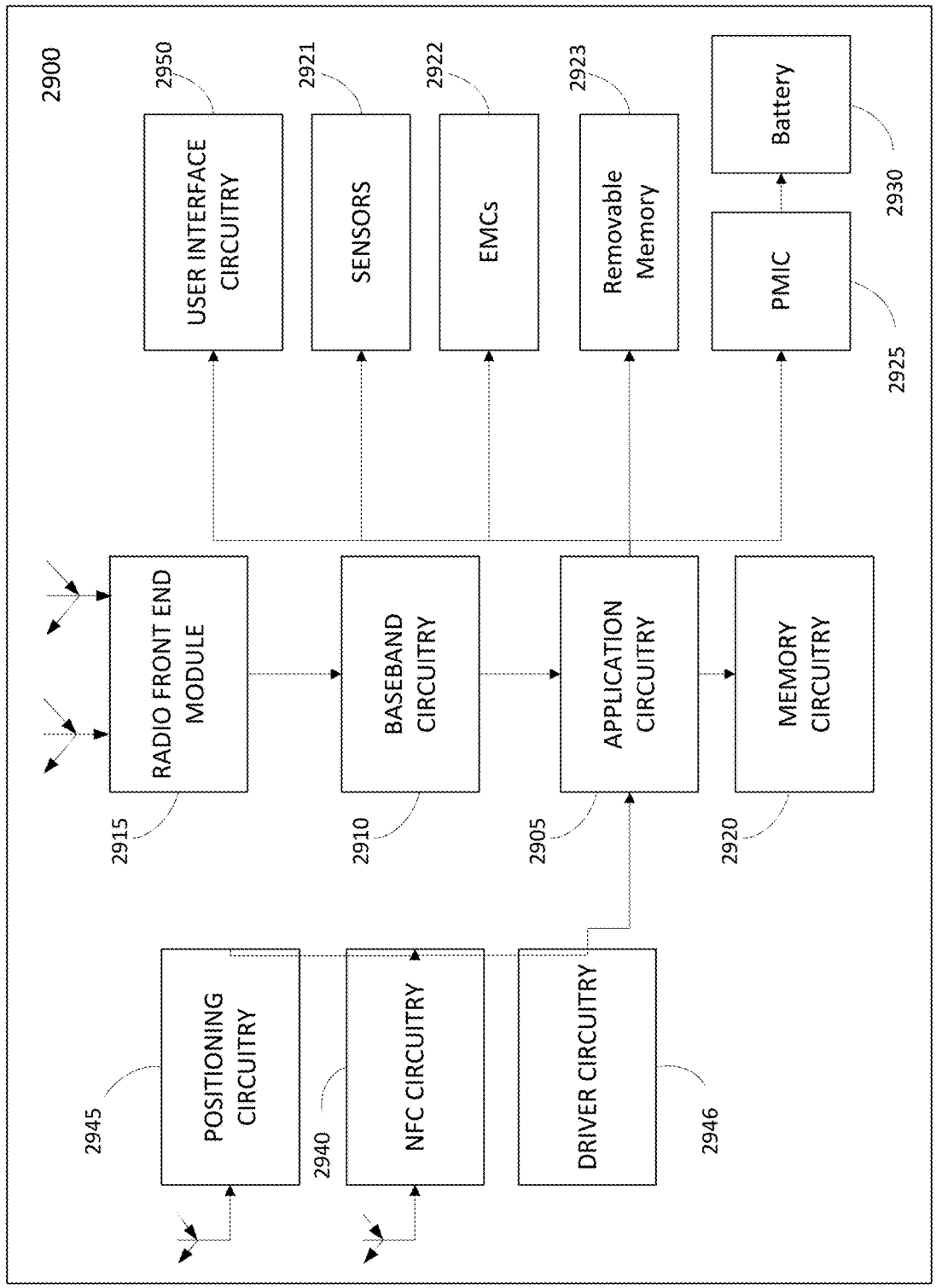
FIG. 29 depicts example components of a computer platform or device in accordance with various embodiments.

FIG. 29 illustrates an example of a platform 2900 (or "device 2900") in accordance with various embodiments. In embodiments, the computer platform 2900 may be suitable for use as UEs XQ01, 2601, 2701, application servers XQ30, and/or any other element/device discussed herein. The platform 2900 may include any combinations of the components shown in the example. The components of platform 2900 may be implemented as integrated circuits (ICs), portions thereof, discrete electronic devices, or other modules, logic, hardware, software, firmware, or a combination thereof adapted in the computer platform 2900, or as components otherwise incorporated within a chassis of a larger system. The block diagram of FIG. 29 is intended to show a high level view of components of the computer platform 2900. However, some of the components shown may be omitted, additional components may be present, and different arrangement of the components shown may occur in other implementations.

Application circuitry 2905 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 2905 may be coupled with or may include memory/storage elements and may be configured to execute instructions stored in the memory/storage to enable various applications or operating systems to run on the system 2900. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 2805 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 2805 may comprise, or may be, a special-purpose processor/controller to operate according to the various embodiments herein.

As examples, the processor(s) of application circuitry 2905 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 2905 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 2905 may be a part of a system on a chip (SoC) in which the application circuitry 2905 and other components are formed into a single integrated circuit, or a single package, such as the Edison™ or Galileo™ SoC boards from Intel® Corporation.

Additionally or alternatively, application circuitry 2905 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 2905 may comprise logic blocks or logic fabric, and other interconnected resources that may be programmed to perform various functions, such as the procedures, methods, functions, etc. of the various embodiments discussed herein. In such embodiments, the circuitry of application circuitry 2905 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 2910 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 2910 are discussed infra with regard to FIG. 30.

The RFEMs 2915 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 3011 of FIG. 30 infra), and the RFEM may be connected to multiple antennas. In alternative implementations, both mmWave and sub-mmWave radio functions may be implemented in the same physical RFEM 2915, which incorporates both mmWave antennas and sub-mmWave.

The memory circuitry 2920 may include any number and type of memory devices used to provide for a given amount of system memory. As examples, the memory circuitry 2920 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 2920 may be developed in accordance with a Joint Electron Devices Engineering Council (JEDEC) low power double data rate (LPDDR)-based design, such as LPDDR2, LPDDR3, LPDDR4, or the like. Memory circuitry 2920 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 2920 may be on-die memory or registers associated with the application circuitry 2905. To provide for persistent storage of information such as data, applications, operating systems and so forth, memory circuitry 2920 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 2900 may incorporate the three-dimensional (3D) cross-point (XPOINT) memories from Intel® and Micron®.

Removable memory circuitry 2923 may include devices, circuitry, enclosures/housings, ports or receptacles, etc. used to couple portable data storage devices with the platform 2900. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 2900 may also include interface circuitry (not shown) that is used to connect external devices with the platform 2900. The external devices connected to the platform 2900 via the interface circuitry include sensor circuitry 2921 and electro-mechanical components (EMCs) 2922, as well as removable memory devices coupled to removable memory circuitry 2923.

The sensor circuitry 2921 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 2922 include devices, modules, or subsystems whose purpose is to enable platform 2900 to change its state, position, and/or orientation, or move or control a mechanism or (sub)system. Additionally, EMCs 2922 may be configured to generate and send messages/signalling to other components of the platform 2900 to indicate a current state of the EMCs 2922. Examples of the EMCs 2922 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 2900 is configured to operate one or more EMCs 2922 based on one or more captured events and/or instructions or control signals received from a service provider and/or various clients.

In some implementations, the interface circuitry may connect the platform 2900 with positioning circuitry 2945. The positioning circuitry 2945 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 2945 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 2945 may include a Micro-PNT IC that uses a master timing clock to perform position tracking/estimation without GNSS assistance. The positioning circuitry 2945 may also be part of, or interact with, the baseband circuitry 2810 and/or RFEMs 2915 to communicate with the nodes and components of the positioning network. The positioning circuitry 2945 may also provide position data and/or time data to the application circuitry 2905, which may use the data to synchronize operations with various infrastructure (e.g., radio base stations), for turn-by-turn navigation applications, or the like In some implementations, the interface circuitry may connect the platform 2900 with Near-Field Communication (NFC) circuitry 2940. NFC circuitry 2940 is configured to provide contactless, short-range communications based on radio frequency identification (RFID) standards, wherein magnetic field induction is used to enable communication between NFC circuitry 2940 and NFC-enabled devices external to the platform 2900 (e.g., an "NFC touchpoint"). NFC circuitry 2940 comprises an NFC controller coupled with an antenna element and a processor coupled with the NFC controller. The NFC controller may be a chip/IC providing NFC functionalities to the NFC circuitry 2940 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 2940, or initiate data transfer between the NFC circuitry 2940 and another active NFC device (e.g., a smartphone or an NFC-enabled POS terminal) that is proximate to the platform 2900.

The driver circuitry 2946 may include software and hardware elements that operate to control particular devices that are embedded in the platform 2900, attached to the platform 2900, or otherwise communicatively coupled with the platform 2900. The driver circuitry 2946 may include individual drivers allowing other components of the platform 2900 to interact with or control various input/output (I/O) devices that may be present within, or connected to, the platform 2900. For example, driver circuitry 2946 may include a display driver to control and allow access to a display device, a touchscreen driver to control and allow access to a touchscreen interface of the platform 2900, sensor drivers to obtain sensor readings of sensor circuitry 2921 and control and allow access to sensor circuitry 2921, EMC drivers to obtain actuator positions of the EMCs 2922 and/or control and allow access to the EMCs 2922, a camera driver to control and allow access to an embedded image capture device, audio drivers to control and allow access to one or more audio devices.

The power management integrated circuitry (PMIC) 2925 (also referred to as "power management circuitry 2925") may manage power provided to various components of the platform 2900. In particular, with respect to the baseband circuitry 2910, the PMIC 2925 may control power-source selection, voltage scaling, battery charging, or DC-to-DC conversion. The PMIC 2925 may often be included when the platform 2900 is capable of being powered by a battery 2930, for example, when the device is included in a UE XQ01, 2601, 2701.

In some embodiments, the PMIC 2925 may control, or otherwise be part of, various power saving mechanisms of the platform 2900. For example, if the platform 2900 is in an RRC_Connected state, where it is still connected to the RAN node as it expects to receive traffic shortly, then it may enter a state known as Discontinuous Reception Mode (DRX) after a period of inactivity. During this state, the platform 2900 may power down for brief intervals of time and thus save power. If there is no data traffic activity for an extended period of time, then the platform 2900 may transition off to an RRC Idle state, where it disconnects from the network and does not perform operations such as channel quality feedback, handover, etc. The platform 2900 goes into a very low power state and it performs paging where again it periodically wakes up to listen to the network and then powers down again. The platform 2900 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 2930 may power the platform 2900, although in some examples the platform 2900 may be mounted deployed in a fixed location, and may have a power supply coupled to an electrical grid. The battery 2930 may be a lithium ion battery, a metal-air battery, such as a zinc-air battery, an aluminum-air battery, a lithium-air battery, and the like. In some implementations, such as in V2X applications, the battery 2930 may be a typical lead-acid automotive battery.

In some implementations, the battery 2930 may be a "smart battery," which includes or is coupled with a Battery Management System (BMS) or battery monitoring integrated circuitry. The BMS may be included in the platform 2900 to track the state of charge (SoCh) of the battery 2930. The BMS may be used to monitor other parameters of the battery 2930 to provide failure predictions, such as the state of health (SoH) and the state of function (SoF) of the battery 2930. The BMS may communicate the information of the battery 2930 to the application circuitry 2905 or other components of the platform 2900. The BMS may also include an analog-to-digital (ADC) convertor that allows the application circuitry 2905 to directly monitor the voltage of the battery 2930 or the current flow from the battery 2930. The battery parameters may be used to determine actions that the platform 2900 may perform, such as transmission frequency, network operation, sensing frequency, and the like.

A power block, or other power supply coupled to an electrical grid may be coupled with the BMS to charge the battery 2930. In some examples, the power block XS30 may be replaced with a wireless power receiver to obtain the power wirelessly, for example, through a loop antenna in the computer platform 2900. In these examples, a wireless battery charging circuit may be included in the BMS. The specific charging circuits chosen may depend on the size of the battery 2930, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 2950 includes various input/output (I/O) devices present within, or connected to, the platform 2900, and includes one or more user interfaces designed to enable user interaction with the platform 2900 and/or peripheral component interfaces designed to enable peripheral component interaction with the platform 2900. The user interface circuitry 2950 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 2900. The output device circuitry may also include speakers or other audio emitting devices, printer(s), and/or the like. In some embodiments, the sensor circuitry 2921 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 2900 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 30:
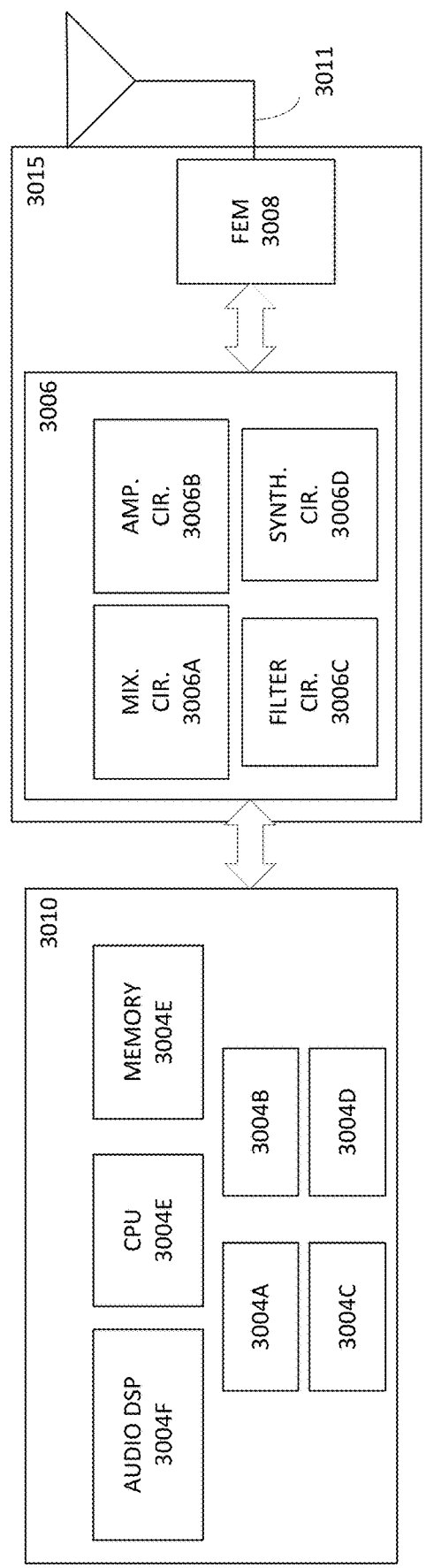
FIG. 30 depicts example components of baseband circuitry and radio frequency end modules in accordance with various embodiments.

FIG. 30 illustrates example components of baseband circuitry 3010 and radio front end modules (RFEM) 3015 in accordance with various embodiments. The baseband circuitry 3010 corresponds to the baseband circuitry 2810 and 2910 of FIGS. 28 and 29, respectively. The RFEM 3015 corresponds to the RFEM 2815 and 2915 of FIGS. 28 and 29, respectively. As shown, the RFEMs 3015 may include Radio Frequency (RF) circuitry 3006, front-end module (FEM) circuitry 3008, antenna array 3011 coupled together at least as shown.

The baseband circuitry 3010 includes circuitry and/or control logic configured to carry out various radio/network protocol and radio control functions that enable communication with one or more radio networks via the RF circuitry 3006. The radio control functions may include, but are not limited to, signal modulation/demodulation, encoding/decoding, radio frequency shifting, etc. In some embodiments, modulation/demodulation circuitry of the baseband circuitry 3010 may include Fast-Fourier Transform (FFT), precoding, or constellation mapping/demapping functionality. In some embodiments, encoding/decoding circuitry of the baseband circuitry 3010 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 3010 is configured to process baseband signals received from a receive signal path of the RF circuitry 3006 and to generate baseband signals for a transmit signal path of the RF circuitry 3006. The baseband circuitry 3010 is configured to interface with application circuitry 2805/2905 (see FIGS. 28 and 29) for generation and processing of the baseband signals and for controlling operations of the RF circuitry 3006. The baseband circuitry 3010 may handle various radio control functions.

The aforementioned circuitry and/or control logic of the baseband circuitry 3010 may include one or more single or multi-core processors. For example, the one or more processors may include a 3G baseband processor 3004A, a 4G/LTE baseband processor 3004B, a 5G/NR baseband processor 3004C, or some other baseband processor(s) 3004D for other existing generations, generations in development or to be developed in the future (e.g., sixth generation (6G), etc.). In other embodiments, some or all of the functionality of baseband processors 3004A-D may be included in modules stored in the memory 3004G and executed via a Central Processing Unit (CPU) 3004E. In other embodiments, some or all of the functionality of baseband processors 3004A-D may be provided as hardware accelerators (e.g., FPGAs, ASICs, etc.) loaded with the appropriate bit streams or logic blocks stored in respective memory cells. In various embodiments, the memory 3004G may store program code of a real-time OS (RTOS), which when executed by the CPU 3004E (or other baseband processor), is to cause the CPU 3004E (or other baseband processor) to manage resources of the baseband circuitry 3010, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 3010 includes one or more audio digital signal processor(s) (DSP) 3004F. The audio DSP(s) 3004F include elements for compression/decompression and echo cancellation and may include other suitable processing elements in other embodiments.

In some embodiments, each of the processors 3004A-3004E include respective memory interfaces to send/receive data to/from the memory 3004G. The baseband circuitry 3010 may further include one or more interfaces to communicatively couple to other circuitries/devices, such as an interface to send/receive data to/from memory external to the baseband circuitry 3010; an application circuitry interface to send/receive data to/from the application circuitry 2805/2905 of FIGS. 28-XT); an RF circuitry interface to send/receive data to/from RF circuitry 3006 of FIG. 30; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 2925.

In alternate embodiments (which may be combined with the above described embodiments), baseband circuitry 3010 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 3010 may include protocol processing circuitry with one or more instances of control circuitry (not shown) to provide control functions for the digital baseband circuitry and/or radio frequency circuitry (e.g., the radio front end modules 3015).

Although not shown by FIG. 30, in some embodiments, the baseband circuitry 3010 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 3010 and/or RF circuitry 3006 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 3010 and/or RF circuitry 3006 are part of a Wi-Fi communication system. In the second example, the protocol processing circuitry would operate Wi-Fi MAC and logical link control (LLC) functions. The protocol processing circuitry may include one or more memory structures (e.g., 3004G) to store program code and data for operating the protocol functions, as well as one or more processing cores to execute the program code and perform various operations using the data. The baseband circuitry 3010 may also support radio communications for more than one wireless protocol.

The various hardware elements of the baseband circuitry 3010 discussed herein may be implemented, for example, as a solder-down substrate including one or more integrated circuits (ICs), a single packaged IC soldered to a main circuit board or a multi-chip module containing two or more ICs. In one example, the components of the baseband circuitry 3010 may be suitably combined in a single chip or chipset, or disposed on a same circuit board. In another example, some or all of the constituent components of the baseband circuitry 3010 and RF circuitry 3006 may be implemented together such as, for example, a system on a chip (SoC) or System-in-Package (SiP). In another example, some or all of the constituent components of the baseband circuitry 3010 may be implemented as a separate SoC that is communicatively coupled with and RF circuitry 3006 (or multiple instances of RF circuitry 3006). In yet another example, some or all of the constituent components of the baseband circuitry 3010 and the application circuitry 2805/2905 may be implemented together as individual SoCs mounted to a same circuit board (e.g., a "multi-chip package").

In some embodiments, the baseband circuitry 3010 may provide for communication compatible with one or more radio technologies. For example, in some embodiments, the baseband circuitry 3010 may support communication with an E-UTRAN or other WMAN, a WLAN, a WPAN. Embodiments in which the baseband circuitry 3010 is configured to support radio communications of more than one wireless protocol may be referred to as multi-mode baseband circuitry.

RF circuitry 3006 may enable communication with wireless networks using modulated electromagnetic radiation through a non-solid medium. In various embodiments, the RF circuitry 3006 may include switches, filters, amplifiers, etc. to facilitate the communication with the wireless network. RF circuitry 3006 may include a receive signal path, which may include circuitry to down-convert RF signals received from the FEM circuitry 3008 and provide baseband signals to the baseband circuitry 3010. RF circuitry 3006 may also include a transmit signal path, which may include circuitry to up-convert baseband signals provided by the baseband circuitry 3010 and provide RF output signals to the FEM circuitry 3008 for transmission.

In some embodiments, the receive signal path of the RF circuitry 3006 may include mixer circuitry 3006a, amplifier circuitry 3006b and filter circuitry 3006c. In some embodiments, the transmit signal path of the RF circuitry 3006 may include filter circuitry 3006c and mixer circuitry 3006a. RF circuitry 3006 may also include synthesizer circuitry 3006d for synthesizing a frequency for use by the mixer circuitry 3006a of the receive signal path and the transmit signal path. In some embodiments, the mixer circuitry 3006a of the receive signal path may be configured to down-convert RF signals received from the FEM circuitry 3008 based on the synthesized frequency provided by synthesizer circuitry 3006d. The amplifier circuitry 3006b may be configured to amplify the down-converted signals and the filter circuitry 3006c may be a low-pass filter (LPF) or band-pass filter (BPF) configured to remove unwanted signals from the down-converted signals to generate output baseband signals. Output baseband signals may be provided to the baseband circuitry 3010 for further processing. In some embodiments, the output baseband signals may be zero-frequency baseband signals, although this is not a requirement. In some embodiments, mixer circuitry 3006a of the receive signal path may comprise passive mixers, although the scope of the embodiments is not limited in this respect.

In some embodiments, the mixer circuitry 3006a of the transmit signal path may be configured to up-convert input baseband signals based on the synthesized frequency provided by the synthesizer circuitry 3006d to generate RF output signals for the FEM circuitry 3008. The baseband signals may be provided by the baseband circuitry 3010 and may be filtered by filter circuitry 3006c.

In some embodiments, the mixer circuitry 3006a of the receive signal path and the mixer circuitry 3006a of the transmit signal path may include two or more mixers and may be arranged for quadrature downconversion and upconversion, respectively. In some embodiments, the mixer circuitry 3006a of the receive signal path and the mixer circuitry 3006a of the transmit signal path may include two or more mixers and may be arranged for image rejection (e.g., Hartley image rejection). In some embodiments, the mixer circuitry 3006a of the receive signal path and the mixer circuitry 3006a of the transmit signal path may be arranged for direct downconversion and direct upconversion, respectively. In some embodiments, the mixer circuitry 3006a of the receive signal path and the mixer circuitry 3006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 3006 may include analog-to-digital converter (ADC) and digital-to-analog converter (DAC) circuitry and the baseband circuitry 3010 may include a digital baseband interface to communicate with the RF circuitry 3006.

In some dual-mode embodiments, a separate radio IC circuitry may be provided for processing signals for each spectrum, although the scope of the embodiments is not limited in this respect.

In some embodiments, the synthesizer circuitry 3006d may be a fractional-N synthesizer or a fractional N/N+1 synthesizer, although the scope of the embodiments is not limited in this respect as other types of frequency synthesizers may be suitable. For example, synthesizer circuitry 3006d may be a delta-sigma synthesizer, a frequency multiplier, or a synthesizer comprising a phase-locked loop with a frequency divider.

The synthesizer circuitry 3006d may be configured to synthesize an output frequency for use by the mixer circuitry 3006a of the RF circuitry 3006 based on a frequency input and a divider control input. In some embodiments, the synthesizer circuitry 3006d may be a fractional N/N+1 synthesizer.

In some embodiments, frequency input may be provided by a voltage controlled oscillator (VCO), although that is not a requirement. Divider control input may be provided by either the baseband circuitry 3010 or the application circuitry 2805/2905 depending on the desired output frequency. In some embodiments, a divider control input (e.g., N) may be determined from a look-up table based on a channel indicated by the application circuitry 2805/2905.

Synthesizer circuitry 3006d of the RF circuitry 3006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 3006d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 3006 may include an IQ/polar converter.

FEM circuitry 3008 may include a receive signal path, which may include circuitry configured to operate on RF signals received from antenna array 3011, amplify the received signals and provide the amplified versions of the received signals to the RF circuitry 3006 for further processing. FEM circuitry 3008 may also include a transmit signal path, which may include circuitry configured to amplify signals for transmission provided by the RF circuitry 3006 for transmission by one or more of antenna elements of antenna array 3011. In various embodiments, the amplification through the transmit or receive signal paths may be done solely in the RF circuitry 3006, solely in the FEM circuitry 3008, or in both the RF circuitry 3006 and the FEM circuitry 3008.

In some embodiments, the FEM circuitry 3008 may include a TX/RX switch to switch between transmit mode and receive mode operation. The FEM circuitry 3008 may include a receive signal path and a transmit signal path. The receive signal path of the FEM circuitry 3008 may include an LNA to amplify received RF signals and provide the amplified received RF signals as an output (e.g., to the RF circuitry 3006). The transmit signal path of the FEM circuitry 3008 may include a power amplifier (PA) to amplify input RF signals (e.g., provided by RF circuitry 3006), and one or more filters to generate RF signals for subsequent transmission by one or more antenna elements of the antenna array 3011.

The antenna array 3011 comprises one or more antenna elements, each of which is configured convert electrical signals into radio waves to travel through the air and to convert received radio waves into electrical signals. For example, digital baseband signals provided by the baseband circuitry 3010 is converted into analog RF signals (e.g., modulated waveform) that will be amplified and transmitted via the antenna elements of the antenna array 3011 including one or more antenna elements (not shown). The antenna elements may be omnidirectional, direction, or a combination thereof. The antenna elements may be formed in a multitude of arranges as are known and/or discussed herein. The antenna array 3011 may comprise microstrip antennas or printed antennas that are fabricated on the surface of one or more printed circuit boards. The antenna array 3011 may be formed in as a patch of metal foil (e.g., a patch antenna) in a variety of shapes, and may be coupled with the RF circuitry 3006 and/or FEM circuitry 3008 using metal transmission lines or the like.

Processors of the application circuitry 2805/2905 and processors of the baseband circuitry 3010 may be used to execute elements of one or more instances of a protocol stack. For example, processors of the baseband circuitry 3010, alone or in combination, may be used execute Layer 3, Layer 2, or Layer 1 functionality, while processors of the application circuitry 2805/2905 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 31:
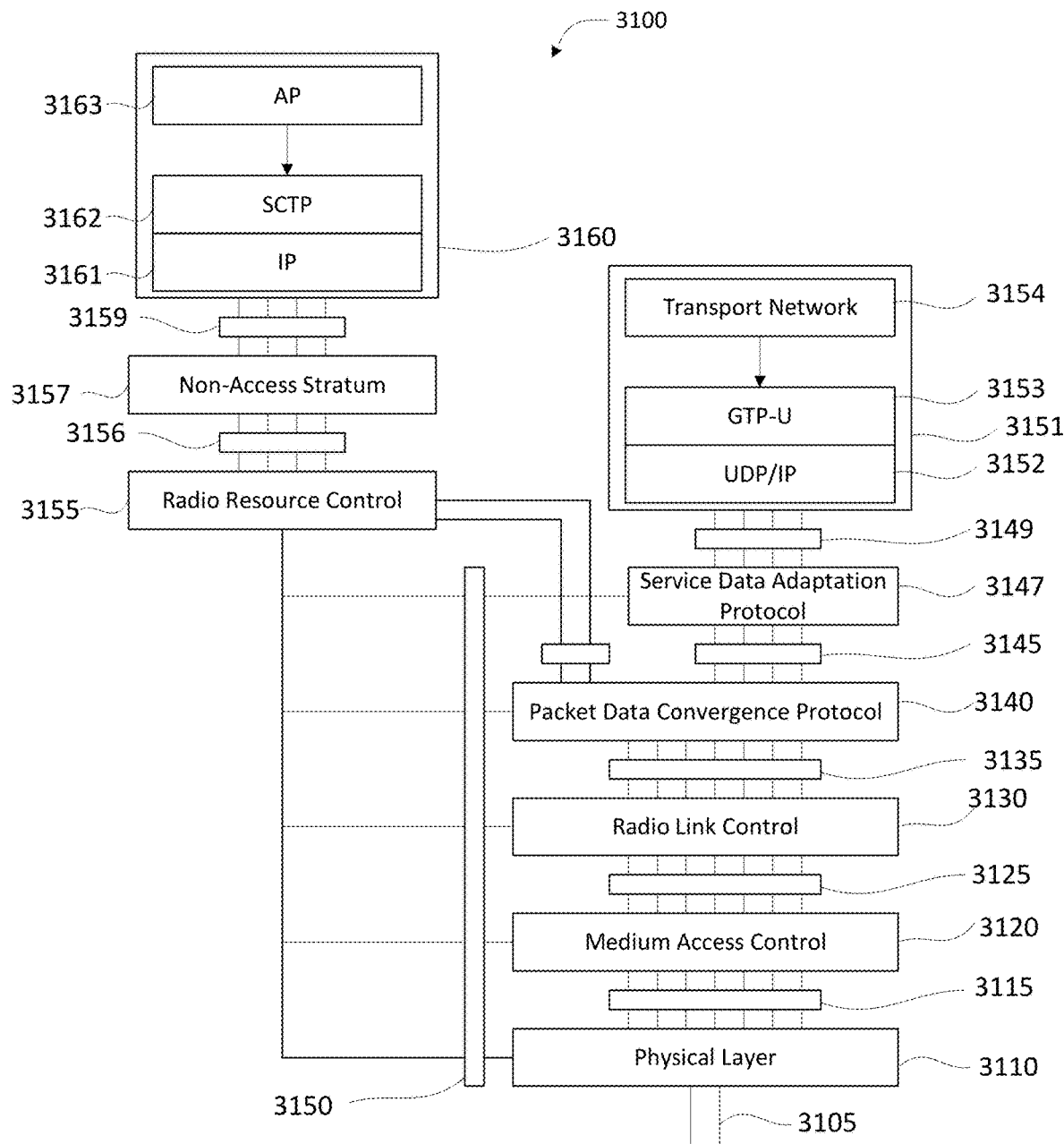
FIG. 31 illustrates various protocol functions that may be implemented in a wireless communication device according to various embodiments.

FIG. 31 illustrates various protocol functions that may be implemented in a wireless communication device according to various embodiments. In particular, FIG. 31 includes an arrangement 3100 showing interconnections between various protocol layers/entities. The following description of FIG. 31 is provided for various protocol layers/entities that operate in conjunction with the 5G/NR system standards and LTE system standards, but some or all of the aspects of FIG. 31 may be applicable to other wireless communication network systems as well.

The protocol layers of arrangement 3100 may include one or more of PHY 3110, MAC 3120, RLC 3130, PDCP 3140, SDAP 3147, RRC 3155, and NAS layer 3157, in addition to other higher layer functions not illustrated. The protocol layers may include one or more service access points (e.g., items 3159, 3156, 3150, 3149, 3145, 3135, 3125, and 3115 in FIG. 31) that may provide communication between two or more protocol layers.

The PHY 3110 may transmit and receive physical layer signals 3105 that may be received from or transmitted to one or more other communication devices. The physical layer signals 3105 may comprise one or more physical channels, such as those discussed herein. The PHY 3110 may further perform link adaptation or adaptive modulation and coding (AMC), power control, cell search (e.g., for initial synchronization and handover purposes), and other measurements used by higher layers, such as the RRC 3155. The PHY 3110 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 3110 may process requests from and provide indications to an instance of MAC 3120 via one or more PHY-SAP 3115. According to some embodiments, requests and indications communicated via PHY-SAP 3115 may comprise one or more transport channels.

Instance(s) of MAC 3120 may process requests from, and provide indications to, an instance of RLC 3130 via one or more MAC-SAPs 3125. These requests and indications communicated via the MAC-SAP 3125 may comprise one or more logical channels. The MAC 3120 may perform mapping between the logical channels and transport channels, multiplexing of MAC SDUs from one or more logical channels onto TBs to be delivered to PHY 3110 via the transport channels, de-multiplexing MAC SDUs to one or more logical channels from TBs delivered from the PHY 3110 via transport channels, multiplexing MAC SDUs onto TBs, scheduling information reporting, error correction through HARQ, and logical channel prioritization.

Instance(s) of RLC 3130 may process requests from and provide indications to an instance of PDCP 3140 via one or more radio link control service access points (RLC-SAP) 3135. These requests and indications communicated via RLC-SAP 3135 may comprise one or more RLC channels. The RLC 3130 may operate in a plurality of modes of operation, including: Transparent Mode™, Unacknowledged Mode (UM), and Acknowledged Mode (AM). The RLC 3130 may execute transfer of upper layer protocol data units (PDUs), error correction through automatic repeat request (ARQ) for AM data transfers, and concatenation, segmentation and reassembly of RLC SDUs for UM and AM data transfers. The RLC 3130 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 3140 may process requests from and provide indications to instance(s) of RRC 3155 and/or instance(s) of SDAP 3147 via one or more packet data convergence protocol service access points (PDCP-SAP) 3145. These requests and indications communicated via PDCP-SAP 3145 may comprise one or more radio bearers. The PDCP 3140 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 3147 may process requests from and provide indications to one or more higher layer protocol entities via one or more SDAP-SAP 3149. These requests and indications communicated via SDAP-SAP 3149 may comprise one or more QoS flows. The SDAP 3147 may map QoS flows to DRBs, and vice versa, and may also mark QFIs in DL and UL packets. A single SDAP entity 3147 may be configured for an individual PDU session. In the UL direction, the NG-RAN XQ10 may control the mapping of QoS Flows to DRB(s) in two different ways, reflective mapping or explicit mapping. For reflective mapping, the SDAP 3147 of a UE XQ01 may monitor the QFIs of the DL packets for each DRB, and may apply the same mapping for packets flowing in the UL direction. For a DRB, the SDAP 3147 of the UE XQ01 may map the UL packets belonging to the QoS flows(s) corresponding to the QoS flow ID(s) and PDU session observed in the DL packets for that DRB. To enable reflective mapping, the NG-RAN 2710 may mark DL packets over the Uu interface with a QoS flow ID. The explicit mapping may involve the RRC 3155 configuring the SDAP 3147 with an explicit QoS flow to DRB mapping rule, which may be stored and followed by the SDAP 3147. In embodiments, the SDAP 3147 may only be used in NR implementations and may not be used in LTE implementations.

The RRC 3155 may configure, via one or more management service access points (M-SAP), aspects of one or more protocol layers, which may include one or more instances of PHY 3110, MAC 3120, RLC 3130, PDCP 3140 and SDAP 3147. In embodiments, an instance of RRC 3155 may process requests from and provide indications to one or more NAS entities 3157 via one or more RRC-SAPs 3156. The main services and functions of the RRC 3155 may include broadcast of system information (e.g., included in MIBs or SIBs related to the NAS), broadcast of system information related to the access stratum (AS), paging, establishment, maintenance and release of an RRC connection between the UE XQ01 and RAN XQ10 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 3157 may form the highest stratum of the control plane between the UE XQ01 and the AMF 2721. The NAS 3157 may support the mobility of the UEs XQ01 and the session management procedures to establish and maintain IP connectivity between the UE XQ01 and a P-GW in LTE systems.

According to various embodiments, one or more protocol entities of arrangement 3100 may be implemented in UEs XQ01, RAN nodes XQ11, AMF 2721 in NR implementations or MME 2621 in LTE implementations, UPF 2702 in NR implementations or S-GW 2622 and P-GW 2623 in LTE implementations, or the like to be used for control plane or user plane communications protocol stack between the aforementioned devices. In such embodiments, one or more protocol entities that may be implemented in one or more of UE XQ01, gNB XQ11, AMF 2721, etc. may communicate with a respective peer protocol entity that may be implemented in or on another device using the services of respective lower layer protocol entities to perform such communication. In some embodiments, a gNB-CU of the gNB XQ11 may host the RRC 3155, SDAP 3147, and PDCP 3140 of the gNB that controls the operation of one or more gNB-DUs, and the gNB-DUs of the gNB XQ11 may each host the RLC 3130, MAC 3120, and PHY 3110 of the gNB XQ11.

In a first example, a control plane protocol stack may comprise, in order from highest layer to lowest layer, NAS 3157, RRC 3155, PDCP 3140, RLC 3130, MAC 3120, and PHY 3110. In this example, upper layers 3160 may be built on top of the NAS 3157, which includes an IP layer 3161, an SCTP 3162, and an application layer signaling protocol (AP) 3163.

In NR implementations, the AP 3163 may be an NG application protocol layer (NGAP or NG-AP) 3163 for the NG interface XQ13 defined between the NG-RAN node XQ11 and the AMF 2721, or the AP 3163 may be an Xn application protocol layer (XnAP or Xn-AP) 3163 for the Xn interface XQ12 that is defined between two or more RAN nodes XQ11.

The NG-AP 3163 may support the functions of the NG interface XQ13 and may comprise Elementary Procedures (EPs). An NG-AP EP may be a unit of interaction between the NG-RAN node XQ11 and the AMF 2721. The NG-AP 3163 services may comprise two groups: UE-associated services (e.g., services related to a UE XQ01) and non-UE-associated services (e.g., services related to the whole NG interface instance between the NG-RAN node XQ11 and AMF 2721). These services may include functions including, but not limited to: a paging function for the sending of paging requests to NG-RAN nodes XQ11 involved in a particular paging area; a UE context management function for allowing the AMF 2721 to establish, modify, and/or release a UE context in the AMF 2721 and the NG-RAN node XQ11; a mobility function for UEs XQ01 in ECM-CONNECTED mode for intra-system HOs to support mobility within NG-RAN and inter-system HOs to support mobility from/to EPS systems; a NAS Signaling Transport function for transporting or rerouting NAS messages between UE XQ01 and AMF 2721; a NAS node selection function for determining an association between the AMF 2721 and the UE XQ01; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes XQ11 via CN XQ20; and/or other like functions.

The XnAP 3163 may support the functions of the Xn interface XQ12 and may comprise XnAP basic mobility procedures and XnAP global procedures. The XnAP basic mobility procedures may comprise procedures used to handle UE mobility within the NG RAN XQ11 (or E-UTRAN 2610), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE XQ01, such as Xn interface setup and reset procedures, NG-RAN update procedures, cell activation procedures, and the like.

In LTE implementations, the AP 3163 may be an S1 Application Protocol layer (S1-AP) 3163 for the S1 interface XQ13 defined between an E-UTRAN node XQ11 and an MME, or the AP 3163 may be an X2 application protocol layer (X2AP or X2-AP) 3163 for the X2 interface XQ12 that is defined between two or more E-UTRAN nodes XQ11.

The S1 Application Protocol layer (S1-AP) 3163 may support the functions of the S1 interface, and similar to the NG-AP discussed previously, the S1-AP may comprise S1-AP EPs. An S1-AP EP may be a unit of interaction between the E-UTRAN node XQ11 and an MME 2621 within an LTE CN XQ20. The S1-AP 3163 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 3163 may support the functions of the X2 interface XQ12 and may comprise X2AP basic mobility procedures and X2AP global procedures. The X2AP basic mobility procedures may comprise procedures used to handle UE mobility within the E-UTRAN XQ20, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE XQ01, such as X2 interface setup and reset procedures, load indication procedures, error indication procedures, cell activation procedures, and the like.

The SCTP layer (alternatively referred to as the SCTP/IP layer) 3162 may provide guaranteed delivery of application layer messages (e.g., NGAP or XnAP messages in NR implementations, or S1-AP or X2AP messages in LTE implementations). The SCTP 3162 may ensure reliable delivery of signaling messages between the RAN node XQ11 and the AMF 2721/MME 2621 based, in part, on the IP protocol, supported by the IP 3161. The Internet Protocol layer (IP) 3161 may be used to perform packet addressing and routing functionality. In some implementations the IP layer 3161 may use point-to-point transmission to deliver and convey PDUs. In this regard, the RAN node XQ11 may comprise L2 and L1 layer communication links (e.g., wired or wireless) with the MME/AMF to exchange information.

In a second example, a user plane protocol stack may comprise, in order from highest layer to lowest layer, SDAP 3147, PDCP 3140, RLC 3130, MAC 3120, and PHY 3110. The user plane protocol stack may be used for communication between the UE XQ01, the RAN node XQ11, and UPF 2702 in NR implementations or an S-GW 2622 and P-GW 2623 in LTE implementations. In this example, upper layers 3151 may be built on top of the SDAP 3147, and may include a user datagram protocol (UDP) and IP security layer (UDP/IP) 3152, a General Packet Radio Service (GPRS) Tunneling Protocol for the user plane layer (GTP-U) 3153, and a User Plane PDU layer (UP PDU) 3163.

The transport network layer 3154 (also referred to as a "transport layer") may be built on IP transport, and the GTP-U 3153 may be used on top of the UDP/IP layer 3152 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 3153 may be used for carrying user data within the GPRS core network and between the radio access network and the core network. The user data transported can be packets in any of IPv4, IPv6, or PPP formats, for example. The UDP/IP 3152 may provide checksums for data integrity, port numbers for addressing different functions at the source and destination, and encryption and authentication on the selected data flows. The RAN node XQ11 and the S-GW 2622 may utilize an S1-U interface to exchange user plane data via a protocol stack comprising an L1 layer (e.g., PHY 3110), an L2 layer (e.g., MAC 3120, RLC 3130, PDCP 3140, and/or SDAP 3147), the UDP/IP layer 3152, and the GTP-U 3153. The S-GW 2622 and the P-GW 2623 may utilize an S5/S8a interface to exchange user plane data via a protocol stack comprising an L1 layer, an L2 layer, the UDP/IP layer 3152, and the GTP-U 3153. As discussed previously, NAS protocols may support the mobility of the UE XQ01 and the session management procedures to establish and maintain IP connectivity between the UE XQ01 and the P-GW 2623.

Moreover, although not shown by FIG. 31, an application layer may be present above the AP 3163 and/or the transport network layer 3154. The application layer may be a layer in which a user of the UE XQ01, RAN node XQ11, or other network element interacts with software applications being executed, for example, by application circuitry 2805 or application circuitry 2905, respectively. The application layer may also provide one or more interfaces for software applications to interact with communications systems of the UE XQ01 or RAN node XQ11, such as the baseband circuitry 3010. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 32:
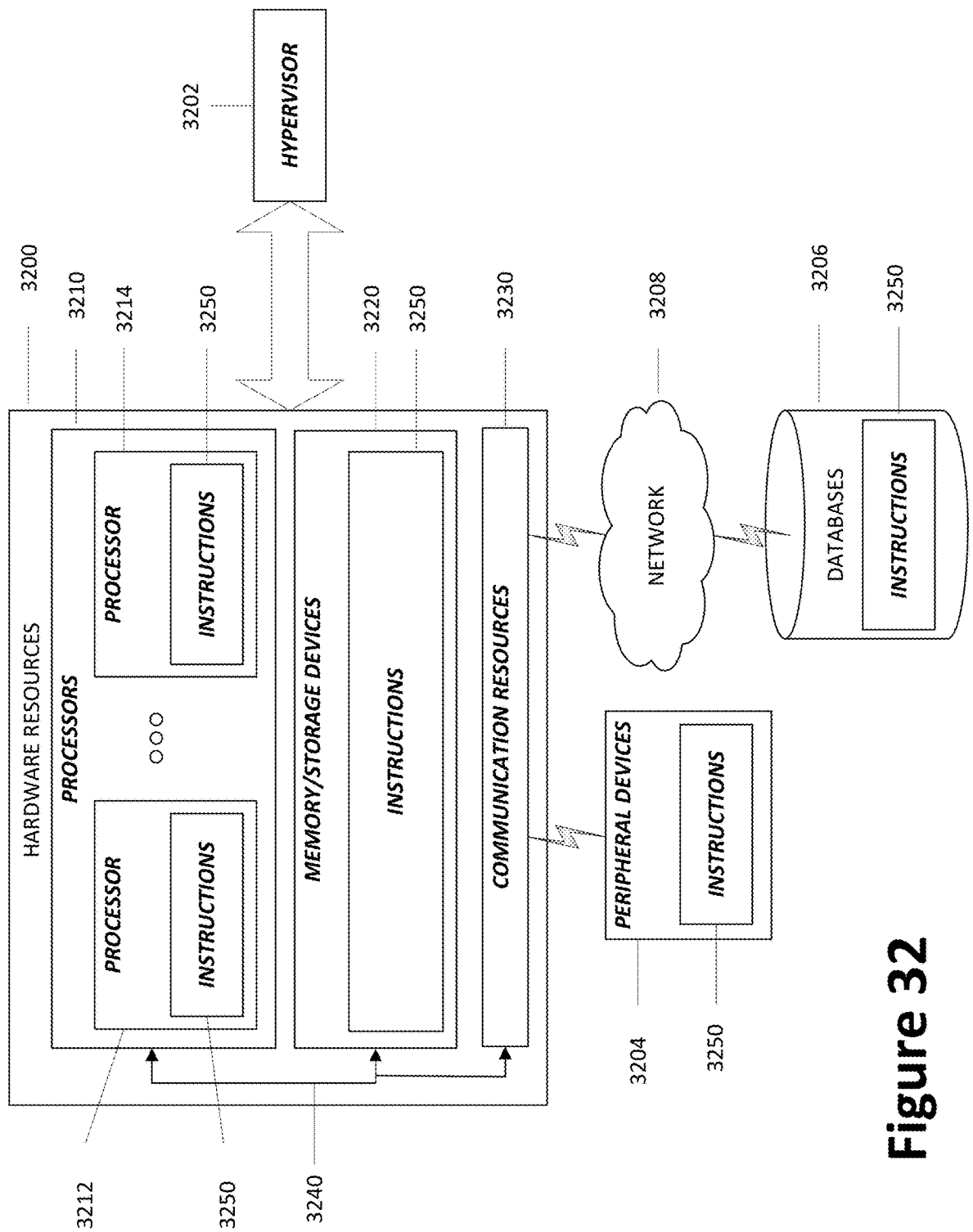
FIG. 32 is a block diagram illustrating components, according to some example embodiments, able to read instructions from a machine-readable or computer-readable medium (for example, a non-transitory machine-readable storage medium) and perform any one or more of the methodologies discussed herein.

FIG. 32 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 32 shows a diagrammatic representation of hardware resources 3200 including one or more processors (or processor cores) 3210, one or more memory/storage devices 3220, and one or more communication resources 3230, each of which may be communicatively coupled via a bus 3240. For embodiments where node virtualization (e.g., NFV) is utilized, a hypervisor 3202 may be executed to provide an execution environment for one or more network slices/sub-slices to utilize the hardware resources 3200.

The processors 3210 may include, for example, a processor 3212 and a processor 3214. The processor(s) 3210 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 3220 may include main memory, disk storage, or any suitable combination thereof. The memory/storage devices 3220 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 3230 may include interconnection or network interface components or other suitable devices to communicate with one or more peripheral devices 3204 or one or more databases 3206 via a network 3208. For example, the communication resources 3230 may include wired communication components (e.g., for coupling via USB), cellular communication components, NFC components, Bluetooth® (or Bluetooth® Low Energy) components, Wi-Fi® components, and other communication components.

Instructions 3250 may comprise software, a program, an application, an applet, an app, or other executable code for causing at least any of the processors 3210 to perform any one or more of the methodologies discussed herein. The instructions 3250 may reside, completely or partially, within at least one of the processors 3210 (e.g., within the processor's cache memory), the memory/storage devices 3220, or any suitable combination thereof. Furthermore, any portion of the instructions 3250 may be transferred to the hardware resources 3200 from any combination of the peripheral devices 3204 or the databases 3206. Accordingly, the memory of processors 3210, the memory/storage devices 3220, the peripheral devices 3204, and the databases 3206 are examples of computer-readable and machine-readable media.

Example Procedures

Figure 22:
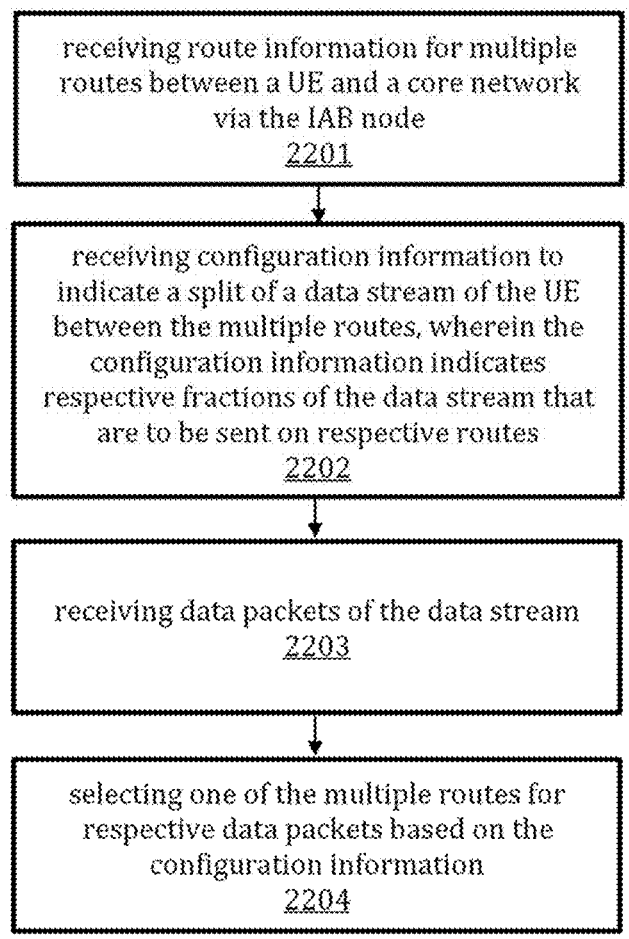
FIG. 22 is a flowchart of a process in accordance with various embodiments.

In some embodiments, the electronic device(s), network(s), system(s), chip(s) or component(s), or portions or implementations thereof, of FIGS. 25-32, or some other figure herein, may be configured to perform one or more processes, techniques, or methods as described herein, or portions thereof. One such process is depicted in FIG. 22. For example, the process may include, at 2201, receiving route information for multiple routes between a UE and a core network via the IAB node. At 2202, the process may include receiving configuration information to indicate a split of a data stream of the UE between the multiple routes, wherein the configuration information indicates respective fractions of the data stream that are to be sent on respective routes.

At 2203, the process may include receiving data packets of the data stream. At 2204, the process may include selecting one of the multiple routes for respective data packets based on the configuration information. For example, the routes may be selected such that average fractions of data transmitted via the respective routes substantially match the configured fractions. In some embodiments, the average fractions may be determined over a predetermined time period or number of data packets. Additionally, or alternatively, the average fractions substantially match the configured fractions if they are within a threshold of the configured fractions or within a rounding error of the configured fractions (e.g., as close as possible to the configured fractions given the number of data packets used to determine the average fractions).

In various embodiments, the process of FIG. 22 may be performed by an IAB node or a portion thereof. For example, in some embodiments, some or all aspects of the process of FIG. 22 may be performed by baseband circuitry of the IAB node.

Figure 23:
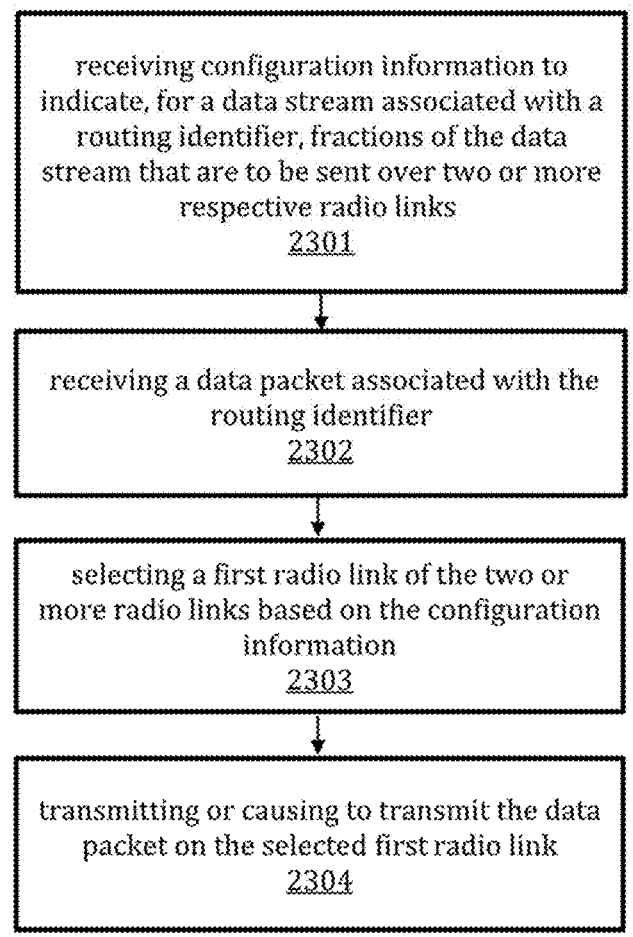
FIG. 23 is a flowchart of another process in accordance with various embodiments.

FIG. 23 illustrates another process in accordance with various embodiments. At 2301, the process may include receiving configuration information to indicate, for a data stream associated with a routing identifier, fractions of the data stream that are to be sent over two or more respective radio links. In some embodiments, the radio links may be egress radio links.

At 2302, the process may include receiving a data packet associated with the routing identifier. At 2303, the process may include selecting a first radio link of the two or more radio links based on the configuration information. At 2304, the process may include transmitting or causing to transmit the data packet on the selected first radio link.

For example, the first radio link may be selected such that average fractions of data transmitted via the respective radio links substantially match the configured fractions. In some embodiments, the average fractions may be determined over a predetermined time period or number of data packets. Additionally, or alternatively, the average fractions substantially match the configured fractions if they are within a threshold of the configured fractions or within a rounding error of the configured fractions (e.g., as close as possible to the configured fractions given the number of data packets used to determine the average fractions).

In various embodiments, the process of FIG. 23 may be performed by an IAB node or a portion thereof. For example, in some embodiments, some or all aspects of the process of FIG. 23 may be performed by baseband circuitry of the IAB node.

Figure 24:
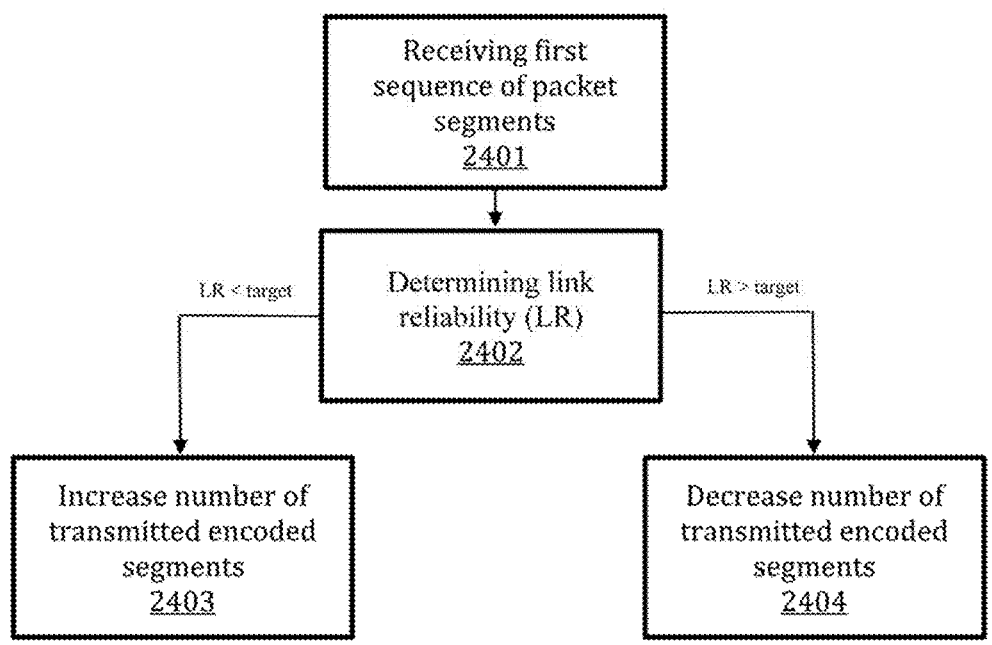
FIG. 24 is a flowchart of another process in accordance with various embodiments.

FIG. 24 illustrates another process in accordance with various embodiments. The process of FIG. 24 may be performed by an IAB node or components thereof, for example, circuitry that implements a BAP layer in the IAB node.

The process may include, at 2401, receiving a first sequence of packet segments.

The process may further include, at 2402, determining a link reliability. In some embodiments, the determination of the link reliability may be performed by decoding the first sequence of packet segments and determining how many encoded segments have been sent on a particular link.

If it is determined that the link reliability is less than a target (for example, the number of encoded segments is less than a predefined number), the process may further include, at 2403, increasing a number of transmitted encoded segments. This may be done by re-encoding the packet and providing one or more re-encoded packet segments into a transmission buffer for transmission on the link. In some embodiments, the re-encoded packet segments may be added to original encoded packets that are in the transmission buffer or have already been transmitted such that a total number of packet segments to be transmitted is equal to the predefined number.

If it is determined that the link reliability is greater than a target (for example, the number of encoded segments is greater than the predefined number), the process may further include, at 2404, decreasing a number of transmitted encoded segments. In some embodiments, one or more encoded segments received may be not transmitted to avoid unnecessary redundancy.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a method in a source node of transmitting data to a destination node in a multi-hop wireless network, comprising: receiving a packet to be transmitted to the destination node; determining a set of weights corresponding to each of a set of routes to the destination node; generating network coded segments based on the received packet; and transmitting network coded segments on each route of the set of routes, wherein the number of network coded segments is proportional to the weight corresponding to the route.

Example 2 may include the method of Example 1 or some other example herein, wherein the set of weights are determined based on information provided by the destination node, which includes ratios of number of segments received by the destination node via each route of the set of routes.

Example 3 may include the method of Example 1 or some other example herein, wherein generating network coded segments is performed at PDCP layer.

Example 4 may include the method of Example 1 or some other example herein, wherein determining the set of weights is based on data-transmission capabilities of each of the set of routes.

Example 5 may include the method of Example 1 or some other example herein, wherein the set of weights are to cause a probability of transmitting a network coded segment over a route to be proportional to a supported data rate of the route.

Example 6 may include a method for transmitting data over multiple routes in a relay node servicing a UE, comprising: configuring multiple routes from the relay node to a destination node, wherein each of the multiple routes has a distinct routing identifier; receiving information for configuring a split of the data stream of the UE, wherein the information comprises fractions of the UE's data that is to be associated with the distinct routing identifiers; selecting, for a given packet, one of the distinct routing identifiers according to the fraction corresponding to chosen routing identifier; and transmitting a packet with a header, wherein the header includes the chosen routing identifier.

Example 7 may include the method of example 6 or some other example herein, wherein selecting one of the distinct routing identifiers comprises: selecting the routing identifier such that the long term averaged fractions of data transmitted via the routes corresponding to the distinct routing identifiers substantially matches the configured fractions.

Example 8 may include a method of transmitting data over multiple routes in a relay node comprising: receiving information for configuring a split of a data stream corresponding to a first routing identifier, wherein the information comprises fractions of the data stream that are to be associated with each of two or more egress radio links; receiving a packet associated with the first routing identifier; determining that there are two or more egress radio links corresponding to the first routing identifier; selecting one of the two or more egress radio links according to the fraction corresponding to the selected radio link; and transmitting the packet on the selected egress radio link.

Example 9 may include the method of example 8 or some other example herein, wherein selecting one of the egress radio links comprises: selecting the egress link such that the long term averaged fractions of data transmitted via the two or more egress links substantially matches the configured fractions.

Example 10 may include a method of an IAB node, the method comprising: receiving route information for multiple routes between a UE and a core network via the IAB node; receiving configuration information to indicate a split of a data stream of the UE between the multiple routes, wherein the configuration information indicates respective fractions of the data stream that are to be sent on respective routes; receiving data packets of the data stream; and selecting one of the multiple routes for respective data packets based on the configuration information.

Example 11 may include the method of example 10 or some other example herein, wherein the route information includes respective route identifiers for individual routes of the multiple routes.

Example 12 may include the method of example 11 or some other example herein, wherein the configuration information indicates the fractions associated with respective route identifiers.

Example 13 may include the method of example 11-12 or some other example herein, further comprising transmitting or causing transmission of the data packets with the selected route identifier included in the respective data packet.

Example 14 may include the method of example 13 or some other example herein, wherein the selected route identifier is included in a header of the respective data packet.

Example 15 may include the method of example 10-14 or some other example herein, wherein selecting one of the multiple routes for the respective data packets includes selecting one of the multiple routes such that average fractions of data transmitted via the respective routes substantially match the configured fractions.

Example 16 may include the method of example 15 or some other example herein, wherein the average fractions are over a predetermined time period or number of data packets.

Example 17 may include the method of example 15-16 or some other example herein, wherein the average fractions substantially match the configured fractions if they are within a threshold of the configured fractions or within a rounding error of the configured fractions.

Example 18 may include a method of an IAB node, the method comprising: receiving configuration information to indicate, for a data stream associated with a routing identifier, fractions of the data stream that are to be sent over two or more respective radio links; receiving a data packet associated with the routing identifier; selecting a first radio link of the two or more radio links based on the configuration information; and transmitting or causing to transmit the data packet on the selected radio link.

Example 19 may include the method of example 18 or some other example herein, wherein the radio links are egress radio links.

Example 20 may include the method of example 18-19 or some other example herein, wherein selecting the first radio link based on the configuration information comprises selecting the first radio link such that average fractions of data associated with the routing identifier that are transmitted via the respective radio links substantially matches the configured fractions.

Example 21 may include the method of example 20 or some other example herein, wherein the average fractions are over a predetermined time period or number of data packets.

Example 22 may include the method of example 20-21 or some other example herein, wherein the average fractions substantially match the configured fractions if they are within a threshold of the configured fractions or within a rounding error of the configured fractions.

Example 23 may include a method in an IAB node of performing initial setup comprising: establishing a connection to the network via a parent node; broadcasting information to enable incoming access requests, wherein the broadcast information further indicates that UEs are barred from performing access requests to the iab node; receiving an indication from the network that the initial setup phase is complete; and modifying the broadcast system information to indicate that UEs are no longer barred from performing access requests to the iab node.

Example 24 may include a method in a first IAB node of performing initial setup, comprising: identifying a second IAB node with which to attach; receiving broadcast system information from the second IAB node, wherein the broadcast system information is to indicate that access requests by UEs are barred; transmitting an access request to the second IAB node, wherein the first IAB node indicates during the access procedure that it is an IAB node; and establishing a connection to the network through the second IAB node.

Example 25 may include the method for integration of relay nodes into a network comprising: signaling a threshold from a first set of nodes that are integrated into the network; receiving an access request from a second node that is not in the first set of nodes, at a node in the first set of nodes; integrating the second node into the network; and signaling a threshold from a second set of nodes, wherein the second set of nodes includes the first set of nodes and the second node.

Example 26 may include a method in a relay node of integrating into the network comprising: receiving threshold information from a first set of nodes that are integrated into the network; performing measurements of signals of the first set of nodes to determine which of the first set of nodes' measurements are above their corresponding thresholds; determining a second set of nodes, wherein the second set of nodes is a subset of the first set of nodes for which the measurements are above the corresponding thresholds; and selecting as a parent a second node in the second set of nodes such that the measurement of the second node is the better than the measurement of the other nodes in the second set.

Example 27 may include the method of 26 further comprising: determining that no nodes in the first set of nodes have measurements that are above their corresponding threshold; receiving an indication of new threshold information; determining a second set of nodes, wherein the second set of nodes is a subset of the first set of nodes for which the measurements are above the corresponding thresholds, based on the new threshold information; and selecting as a parent a second node in the second set of nodes such that the measurement of the second node is the better than the measurement of the other nodes in the second set.

Example 28 may include a method of transmitting data in an IAB node, the method comprising: receiving a first sequence of packet segments from one or more ingress links; decoding, if the first sequence of packet segments includes a minimum number of segments have been received, a packet; and transmitting, on one or more egress links, a second sequence of packet segments generated from the packet.

Example 29 may include the method of example 28 or some other example herein, further comprising: forwarding one or more segments of the first sequence of packet segments on the one or more egress links prior to receiving the minimum number of segments.

Example 30 may include the method of example 29 or some other example herein, wherein the number of segments of the first sequence of packet segments forwarded is fewer than the number of received first sequence of packet segments.

Example 31 may include the method of example 29 or some other example herein, wherein the number of segments of the first sequence of packet segments forwarded on an egress link depends on the link quality of the egress link.

Example 32 may include the method of example 28 or some other example herein, wherein the number of segments in the second sequence of packet segments transmitted over an egress link depends on the link quality of the egress link.

Example 33 may include a method of adaptive coded forwarding comprising:
determining a reliability target on a link is less than a predetermined threshold; and encoding and forwarding extra outgoing segments based on said determining.

Example 34 may include the method of example 33 or some other example herein, wherein determining the reliability target on the link comprises: determining a sufficient number of encoded segments have been received at a node; decoding a packet based on said determining the sufficient number has been received; and determining a number of encoded segments sent on one or more outgoing links is less than a predefined number.

Example 35 may include the method of example 34 or some other example herein, wherein encoding and forwarding extra outgoing symbols based on said determining comprises: encoding the packet into additional segments for transmission on the link as the extra outgoing symbols, wherein the additional segments and the number of encoded segments is at least the predefined number.

Example 36 may include a method of adaptive coded forwarding comprising: receiving encoded packet segments of a link; forwarding the encoded packet segments to a pre-transmission buffer associated with the link; determining a number of the encoded packet segments in the pre-transmission buffer is sufficient to decode a packet; decoding the packet based on the number of the encoded packet segments; re-encoding the packet to generate re-encoded packet segments; supply the pre-transmission buffer with the re-encoded packet segments; determining a number of transmitted segments is less than a predefined number; adding one or more re-encoded packet segments to a transmission buffer to provide a total number of segments to be transmitted to be a predefined number.

Example 37 may include the method of example 36 or some other example herein, further comprising: transmitting segments in the transmission buffer.

Example 38 may include the method of example 37 or some other example herein, further comprising: emptying the pre-transmission buffer.

Example 39 may include the method of example 36 or some other example herein, wherein the decoding and encoding is performed by a backhaul adaptation (BAP) layer of an integrated access and backhaul (IAB) node.

Example 40 may include a method of adaptive coded forwarding comprising:
determining a reliability target on a link is greater than a predetermined threshold; and throttling a number of outgoing symbols to reduce excess redundancy based on said determining.

Example 41 may include a method comprising: receiving encoded segments on a link; determining a link reliability is greater than a predetermined threshold or less than a predetermined threshold; if greater than the predetermined threshold, reducing a number of encoded segments to be transmitted on the link; and if less than the predetermined threshold, increasing a number of encoded segments to be transmitted on the link.

Example 42 may include the method of example 41 or some other example herein, wherein if greater than the predetermined threshold, reducing the number of encoded segments to be transmitted on the link by a number sufficient to set the link reliability to the predetermined threshold.

Example 43 may include the method of example 41 or some other example herein, wherein if less than the predetermined threshold, increasing the number of encoded segments to be transmitted on the link by a number sufficient to set the link reliability to the predetermined threshold.

Example 44 may include the method of example 41 or some other example herein, wherein increasing the number of encoded segments comprises: decoding the encoded segments to obtain packet data; and re-encoding the packet data into re-encoded segments; and transmitting one or more of the re-encoded segments.

Example 45 may include the method of example 44 or some other example herein, further comprising transmitting one or more of the re-encoded segments along with one or more received encoded segments.

Example 46 may include an apparatus comprising means to perform one or more elements of a method described in or related to any of examples 1-45, or any other method or process described herein.

Example 47 may include one or more non-transitory computer-readable media comprising instructions to cause an electronic device, upon execution of the instructions by one or more processors of the electronic device, to perform one or more elements of a method described in or related to any of examples 1-45, or any other method or process described herein.

Example 48 may include an apparatus comprising logic, modules, or circuitry to perform one or more elements of a method described in or related to any of examples 1-45, or any other method or process described herein.

Example 49 may include a method, technique, or process as described in or related to any of examples 1-45, or portions or parts thereof.

Example 50 may include an apparatus comprising: one or more processors and one or more computer-readable media comprising instructions that, when executed by the one or more processors, cause the one or more processors to perform the method, techniques, or process as described in or related to any of examples 1-45, or portions thereof.

Example 51 may include a signal as described in or related to any of examples 1-45, or portions or parts thereof.

Example 52 may include a datagram, packet, frame, segment, protocol data unit (PDU), or message as described in or related to any of examples 1-45, or portions or parts thereof, or otherwise described in the present disclosure.

Example 53 may include a signal encoded with data as described in or related to any of examples 1-45, or portions or parts thereof, or otherwise described in the present disclosure.

Example 54 may include a signal encoded with a datagram, packet, frame, segment, protocol data unit (PDU), or message as described in or related to any of examples 1-45, or portions or parts thereof, or otherwise described in the present disclosure.

Example 55 may include an electromagnetic signal carrying computer-readable instructions, wherein execution of the computer-readable instructions by one or more processors is to cause the one or more processors to perform the method, techniques, or process as described in or related to any of examples 1-45, or portions thereof.

Example 56 may include a computer program comprising instructions, wherein execution of the program by a processing element is to cause the processing element to carry out the method, techniques, or process as described in or related to any of examples 1-45, or portions thereof.

Example 57 may include a signal in a wireless network as shown and described herein.

Example 58 may include a method of communicating in a wireless network as shown and described herein.

Example 59 may include a system for providing wireless communication as shown and described herein.

Example 60 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

For the purposes of the present document, the following abbreviations may apply to the examples and embodiments discussed herein.

3GPP Third Generation Partnership Project
4G Fourth Generation
5G Fifth Generation
5GC 5G Core network
ACK Acknowledgement
AF Application Function
AM Acknowledged Mode
AMBR Aggregate Maximum Bit Rate
AMF Access and Mobility Management Function
AN Access Network
ANR Automatic Neighbour Relation
AP Application Protocol, Antenna Port, Access Point
API Application Programming Interface
APN Access Point Name
ARP Allocation and Retention Priority
ARQ Automatic Repeat Request
AS Access Stratum
ASN.1 Abstract Syntax Notation One
AUSF Authentication Server Function
AWGN Additive White Gaussian Noise
BAP Backhaul Adaptation Protocol
BCH Broadcast Channel
BER Bit Error Ratio
BFD Beam Failure Detection
BLER Block Error Rate
BPSK Binary Phase Shift Keying
BRAS Broadband Remote Access Server
BSS Business Support System
BS Base Station
BSR Buffer Status Report
BW Bandwidth
BWP Bandwidth Part
C-RNTI Cell Radio Network Temporary Identity
CA Carrier Aggregation, Certification Authority
CAPEX CAPital EXpenditure
CBRA Contention Based Random Access
CC Component Carrier, Country Code, Cryptographic Checksum
CCA Clear Channel Assessment
CCE Control Channel Element
CCCH Common Control Channel
CE Coverage Enhancement
CDM Content Delivery Network
CDMA Code-Division Multiple Access
CFRA Contention Free Random Access
CG Cell Group
CI Cell Identity
CID Cell-ID (e.g., positioning method)
CIM Common Information Model
CIR Carrier to Interference Ratio
CK Cipher Key
CM Connection Management, Conditional Mandatory
CMAS Commercial Mobile Alert Service
CMD Command
CMS Cloud Management System
CO Conditional Optional
CoMP Coordinated Multi-Point
CORESET Control Resource Set
COTS Commercial Off-The-Shelf
CP Control Plane, Cyclic Prefix, Connection Point
CPD Connection Point Descriptor
CPE Customer Premise Equipment
CPICH Common Pilot Channel
CQI Channel Quality Indicator
CPU CSI processing unit, Central Processing Unit
C/R Command/Response field bit
CRAN Cloud Radio Access Network, Cloud RAN
CRB Common Resource Block
CRC Cyclic Redundancy Check
CRI Channel-State Information Resource Indicator, CSI-RS Resource Indicator
C-RNTI Cell RNTI
CS Circuit Switched
CSAR Cloud Service Archive
CSI Channel-State Information
CSI-IM CSI Interference Measurement
CSI-RS CSI Reference Signal
CSI-RSRP CSI reference signal received power
CSI-RSRQ CSI reference signal received quality
CSI-SINR CSI signal-to-noise and interference ratio
CSMA Carrier Sense Multiple Access
CSMA/CA CSMA with collision avoidance
CSS Common Search Space, Cell-specific Search Space
CTS Clear-to-Send
CW Codeword
CWS Contention Window Size
D2D Device-to-Device
DC Dual Connectivity, Direct Current
DCI Downlink Control Information
DF Deployment Flavour
DL Downlink
DMTF Distributed Management Task Force
DPDK Data Plane Development Kit
DM-RS, DMRS Demodulation Reference Signal
DN Data network
DRB Data Radio Bearer
DRS Discovery Reference Signal
DRX Discontinuous Reception
DSL Domain Specific Language. Digital Subscriber Line
DSLAM DSL Access Multiplexer
DwPTS Downlink Pilot Time Slot
E-LAN Ethernet Local Area Network
E2E End-to-End
ECCA extended clear channel assessment, extended CCA
ECCE Enhanced Control Channel Element, Enhanced CCE
ED Energy Detection
EDGE Enhanced Datarates for GSM Evolution (GSM Evolution)
EGMF Exposure Governance Management Function
EGPRS Enhanced GPRS
EIR Equipment Identity Register
eLAA enhanced Licensed Assisted Access, enhanced LAA
EM Element Manager eMBB Enhanced Mobile Broadband
EMS Element Management System
eNB evolved NodeB, E-UTRAN Node B
EN-DC E-UTRA-NR Dual Connectivity
EPC Evolved Packet Core
EPDCCH enhanced PDCCH, enhanced Physical Downlink Control Cannel
EPRE Energy per resource element
EPS Evolved Packet System
EREG enhanced REG, enhanced resource element groups
ETSI European Telecommunications Standards Institute
ETWS Earthquake and Tsunami Warning System
eUICC embedded UICC, embedded Universal Integrated Circuit Card
E-UTRA Evolved UTRA
E-UTRAN Evolved UTRAN
EV2X Enhanced V2X
F1AP F1 Application Protocol
F1-C F1 Control plane interface
F1-U F1 User plane interface
FACCH Fast Associated Control CHannel
FACCH/F Fast Associated Control Channel/Full rate
FACCH/H Fast Associated Control Channel/Half rate
FACH Forward Access Channel
FAUSCH Fast Uplink Signalling Channel
FB Functional Block
FBI Feedback Information
FCC Federal Communications Commission
FCCH Frequency Correction CHannel
FDD Frequency Division Duplex
FDM Frequency Division Multiplex
FDMA Frequency Division Multiple Access
FE Front End
FEC Forward Error Correction
FFS For Further Study
FFT Fast Fourier Transformation
feLAA further enhanced Licensed Assisted Access, further enhanced LAA
FN Frame Number
FPGA Field-Programmable Gate Array
FR Frequency Range
G-RNTI GERAN Radio Network Temporary Identity
GERAN GSM EDGE RAN, GSM EDGE Radio Access Network
GGSN Gateway GPRS Support Node
GLONASS GLObal'naya NAvigatsionnaya Sputnikovaya Sistema (Engl.: Global Navigation Satellite System)
gNB Next Generation NodeB
gNB-CU gNB-centralized unit, Next Generation NodeB centralized unit
gNB-DU gNB-distributed unit, Next Generation NodeB distributed unit
GNSS Global Navigation Satellite System
GPRS General Packet Radio Service
GSM Global System for Mobile Communications, Groupe Special Mobile
GTP GPRS Tunneling Protocol
GTP-U GPRS Tunnelling Protocol for User Plane
GTS Go To Sleep Signal (related to WUS)
GUMMEI Globally Unique MME Identifier
GUTI Globally Unique Temporary UE Identity
HARQ Hybrid ARQ, Hybrid Automatic Repeat Request
HANDO, HO Handover
HFN HyperFrame Number
HHO Hard Handover
HLR Home Location Register
HN Home Network
HO Handover
HPLMN Home Public Land Mobile Network
HSDPA High Speed Downlink Packet Access
HSN Hopping Sequence Number
HSPA High Speed Packet Access
HSS Home Subscriber Server
HSUPA High Speed Uplink Packet Access
HTTP Hyper Text Transfer Protocol
HTTPS Hyper Text Transfer Protocol Secure (https is http/1.1 over SSL, e.g. port 443)
I-Block Information Block
ICCID Integrated Circuit Card Identification
IAB Integrated Access and Backhaul
ICIC Inter-Cell Interference Coordination
ID Identity, identifier
IDFT Inverse Discrete Fourier Transform
IE Information element
IBE In-Band Emission
IEEE Institute of Electrical and Electronics Engineers
IEI Information Element Identifier
IEIDL Information Element Identifier Data Length
IETF Internet Engineering Task Force
IF Infrastructure
IM Interference Measurement, Intermodulation, IP Multimedia
IMC IMS Credentials
IMEI International Mobile Equipment Identity
IMGI International mobile group identity
IMPI IP Multimedia Private Identity
IMPU IP Multimedia PUblic identity
IMS IP Multimedia Subsystem
IMSI International Mobile Subscriber Identity
IoT Internet of Things
IP Internet Protocol
Ipsec IP Security, Internet Protocol Security
IP-CAN IP-Connectivity Access Network
IP-M IP Multicast
IPv4 Internet Protocol Version 4
IPv6 Internet Protocol Version 6
IR Infrared
IS In Sync
IRP Integration Reference Point
ISDN Integrated Services Digital Network
ISIM IM Services Identity Module
ISO International Organisation for Standardisation
ISP Internet Service Provider
IWF Interworking-Function
I-WLAN Interworking WLAN
K Constraint length of the convolutional code, USIM Individual key
kB Kilobyte (1000 bytes)
kbps kilo-bits per second
Kc Ciphering key
Ki Individual subscriber authentication key
KPI Key Performance Indicator
KQI Key Quality Indicator
KSI Key Set Identifier
ksps kilo-symbols per second
KVM Kernel Virtual Machine
L1 Layer 1 (physical layer)
L1-RSRP Layer 1 reference signal received power
L2 Layer 2 (data link layer)
L3 Layer 3 (network layer)
LAA Licensed Assisted Access
LAN Local Area Network
LBT Listen Before Talk LCM LifeCycle Management
LCR Low Chip Rate
LCS Location Services
LCID Logical Channel ID
LI Layer Indicator
LLC Logical Link Control, Low Layer Compatibility
LPLMN Local PLMN
LPP LTE Positioning Protocol
LSB Least Significant Bit
LTE Long Term Evolution
LWA LTE-WLAN aggregation
LWIP LTE/WLAN Radio Level Integration with IPsec Tunnel
LTE Long Term Evolution
M2M Machine-to-Machine
MAC Medium Access Control (protocol layering context)
MAC Message authentication code (security/encryption context)
MAC-A MAC used for authentication and key agreement (TSG T WG3 context)
MAC-I MAC used for data integrity of signalling messages (TSG T WG3 context)
MANO Management and Orchestration
MBMS Multimedia Broadcast and Multicast Service
MB SFN Multimedia Broadcast multicast service Single Frequency Network
MCC Mobile Country Code
MCG Master Cell Group
MCOT Maximum Channel Occupancy Time
MCS Modulation and coding scheme
MDAF Management Data Analytics Function
MDAS Management Data Analytics Service
MDT Minimization of Drive Tests
ME Mobile Equipment
MeNB master eNB
MER Message Error Ratio
MGL Measurement Gap Length
MGRP Measurement Gap Repetition Period
MIB Master Information Block, Management Information Base
MIMO Multiple Input Multiple Output
MLC Mobile Location Centre
MM Mobility Management
MME Mobility Management Entity
MN Master Node
MO Measurement Object, Mobile Originated
MPBCH MTC Physical Broadcast CHannel
MPDCCH MTC Physical Downlink Control CHannel
MPDSCH MTC Physical Downlink Shared CHannel
MPRACH MTC Physical Random Access CHannel
MPUSCH MTC Physical Uplink Shared Channel
MPLS MultiProtocol Label Switching
MS Mobile Station
MSB Most Significant Bit
MSC Mobile Switching Centre
MSI Minimum System Information, MCH Scheduling Information
MSID Mobile Station Identifier
MSIN Mobile Station Identification Number
MSISDN Mobile Subscriber ISDN Number
MT Mobile Terminated, Mobile Termination
MTC Machine-Type Communications
mMTC massive MTC, massive Machine-Type Communications
MU-MIMO Multi User MIMO
MWUS MTC wake-up signal, MTC WUS
NACK Negative Acknowledgement
NAI Network Access Identifier
NAS Non-Access Stratum, Non-Access Stratum layer
NCT Network Connectivity Topology
NC-JT Non-Coherent Joint Transmission
NEC Network Capability Exposure
NE-DC NR-E-UTRA Dual Connectivity
NEF Network Exposure Function
NF Network Function
NFP Network Forwarding Path
NFPD Network Forwarding Path Descriptor
NFV Network Functions Virtualization
NFVI NFV Infrastructure
NFVO NFV Orchestrator
NG Next Generation, Next Gen
NGEN-DC NG-RAN E-UTRA-NR Dual Connectivity
NM Network Manager
NMS Network Management System
N-PoP Network Point of Presence
NMIB, N-MIB Narrowband MIB
NPBCH Narrowband Physical Broadcast CHannel
NPDCCH Narrowband Physical Downlink Control CHannel
NPDSCH Narrowband Physical Downlink Shared CHannel
NPRACH Narrowband Physical Random Access CHannel
NPUSCH Narrowband Physical Uplink Shared CHannel
NPSS Narrowband Primary Synchronization Signal
NSSS Narrowband Secondary Synchronization Signal
NR New Radio, Neighbour Relation
NRF NF Repository Function
NRS Narrowband Reference Signal
NS Network Service
NSA Non-Standalone operation mode
NSD Network Service Descriptor
NSR Network Service Record
NSSAI 'Network Slice Selection Assistance Information
S-NNSAI Single-NSSAI
NSSF Network Slice Selection Function
NW Network
NWUS Narrowband wake-up signal, Narrowband WUS
NZP Non-Zero Power
O&M Operation and Maintenance
ODU2 Optical channel Data Unit—type 2
OFDM Orthogonal Frequency Division Multiplexing
OFDMA Orthogonal Frequency Division Multiple Access
OOB Out-of-band
OOS Out of Sync
OPEX OPerating EXpense
OSI Other System Information
OSS Operations Support System
OTA over-the-air
PAPR Peak-to-Average Power Ratio
PAR Peak to Average Ratio
PBCH Physical Broadcast Channel
PC Power Control, Personal Computer
PCC Primary Component Carrier, Primary CC
PCell Primary Cell
PCI Physical Cell ID, Physical Cell Identity
PCEF Policy and Charging Enforcement Function
PCF Policy Control Function
PCRF Policy Control and Charging Rules Function
PDCP Packet Data Convergence Protocol, Packet Data Convergence Protocol layer
PDCCH Physical Downlink Control Channel
PDCP Packet Data Convergence Protocol
PDN Packet Data Network, Public Data Network PDSCH Physical Downlink Shared Channel
PDU Protocol Data Unit
PEI Permanent Equipment Identifiers
PFD Packet Flow Description
P-GW PDN Gateway
PHICH Physical hybrid-ARQ indicator channel
PHY Physical layer
PLMN Public Land Mobile Network
PIN Personal Identification Number
PM Performance Measurement
PMI Precoding Matrix Indicator
PNF Physical Network Function
PNFD Physical Network Function Descriptor
PNFR Physical Network Function Record
POC PTT over Cellular
PP, PTP Point-to-Point
PPP Point-to-Point Protocol
PRACH Physical RACH
PRB Physical resource block
PRG Physical resource block group
ProSe Proximity Services, Proximity-Based Service
PRS Positioning Reference Signal
PRR Packet Reception Radio
PS Packet Services
PSBCH Physical Sidelink Broadcast Channel
PSDCH Physical Sidelink Downlink Channel
PSCCH Physical Sidelink Control Channel
PSSCH Physical Sidelink Shared Channel
PSCell Primary SCell
PSS Primary Synchronization Signal
PSTN Public Switched Telephone Network
PT-RS Phase-tracking reference signal
PTT Push-to-Talk
PUCCH Physical Uplink Control Channel
PUSCH Physical Uplink Shared Channel
QAM Quadrature Amplitude Modulation
QCI QoS class of identifier
QCL Quasi co-location
QFI QoS Flow ID, QoS Flow Identifier
QoS Quality of Service
QPSK Quadrature (Quaternary) Phase Shift Keying
QZSS Quasi-Zenith Satellite System
RA-RNTI Random Access RNTI
RAB Radio Access Bearer, Random Access Burst
RACH Random Access Channel
RADIUS Remote Authentication Dial In User Service
RAN Radio Access Network
RAND RANDom number (used for authentication)
RAR Random Access Response
RAT Radio Access Technology
RAU Routing Area Update
RB Resource block, Radio Bearer
RBG Resource block group
REG Resource Element Group
Rel Release
REQ REQuest
RF Radio Frequency
RI Rank Indicator
MV Resource indicator value
RL Radio Link
RLC Radio Link Control, Radio Link Control layer
RLC AM RLC Acknowledged Mode
RLC UM RLC Unacknowledged Mode
RLF Radio Link Failure
RLM Radio Link Monitoring
RLM-RS Reference Signal for RLM
RM Registration Management
RMC Reference Measurement Channel
RMSI Remaining MSI, Remaining Minimum System Information
RN Relay Node
RNC Radio Network Controller
RNL Radio Network Layer
RNTI Radio Network Temporary Identifier
ROHC RObust Header Compression
RRC Radio Resource Control, Radio Resource Control layer
RRM Radio Resource Management
RS Reference Signal
RSRP Reference Signal Received Power
RSRQ Reference Signal Received Quality
RSSI Received Signal Strength Indicator
RSU Road Side Unit
RSTD Reference Signal Time difference
RTP Real Time Protocol
RTS Ready-To-Send
RTT Round Trip Time
Rx Reception, Receiving, Receiver
S1AP S1 Application Protocol
S1-MME S1 for the control plane
S1-U S1 for the user plane
S-GW Serving Gateway
S-RNTI SRNC Radio Network Temporary Identity
S-TMSI SAE Temporary Mobile Station Identifier
SA Standalone operation mode
SAE System Architecture Evolution
SAP Service Access Point
SAPD Service Access Point Descriptor
SAPI Service Access Point Identifier
SCC Secondary Component Carrier, Secondary CC
SCell Secondary Cell
SC-FDMA Single Carrier Frequency Division Multiple Access
SCG Secondary Cell Group
SCM Security Context Management
SCS Subcarrier Spacing
SCTP Stream Control Transmission Protocol
SDAP Service Data Adaptation Protocol, Service Data Adaptation Protocol layer
SDL Supplementary Downlink
SDNF Structured Data Storage Network Function
SDP Session Description Protocol
SDSF Structured Data Storage Function
SDU Service Data Unit
SEAF Security Anchor Function
SeNB secondary eNB
SEPP Security Edge Protection Proxy
SFI Slot format indication
SFTD Space-Frequency Time Diversity, SFN and frame timing difference
SFN System Frame Number
SgNB Secondary gNB
SGSN Serving GPRS Support Node
S-GW Serving Gateway
SI System Information
SI-RNTI System Information RNTI
SIB System Information Block
SIM Subscriber Identity Module
SIP Session Initiated Protocol
SiP System in Package
SL Sidelink
SLA Service Level Agreement
SM Session Management
SMF Session Management Function SMS Short Message Service
SMSF SMS Function
SMTC SSB-based Measurement Timing Configuration
SN Secondary Node, Sequence Number
SoC System on Chip
SON Self-Organizing Network
SpCell Special Cell
SP-CSI-RNTI Semi-Persistent CSI RNTI
SPS Semi-Persistent Scheduling
SQN Sequence number
SR Scheduling Request
SRB Signalling Radio Bearer
SRS Sounding Reference Signal
SS Synchronization Signal
SSB Synchronization Signal Block, SS/PBCH Block
SSBRI SS/PBCH Block Resource Indicator, Synchronization Signal Block Resource Indicator
SSC Session and Service Continuity
SS-RSRP Synchronization Signal based Reference Signal Received Power
SS-RSRQ Synchronization Signal based Reference Signal Received Quality
SS-SINR Synchronization Signal based Signal to Noise and Interference Ratio
SSS Secondary Synchronization Signal
SSSG Search Space Set Group
SSSIF Search Space Set Indicator
SST Slice/Service Types
SU-MIMO Single User MIMO
SUL Supplementary Uplink
TA Timing Advance, Tracking Area
TAC Tracking Area Code
TAG Timing Advance Group
TAU Tracking Area Update
TB Transport Block
TBS Transport Block Size
TBD To Be Defined
TCI Transmission Configuration Indicator
TCP Transmission Communication Protocol
TDD Time Division Duplex
TDM Time Division Multiplexing
TDMA Time Division Multiple Access
TE Terminal Equipment
TEID Tunnel End Point Identifier
TFT Traffic Flow Template
TMSI Temporary Mobile Subscriber Identity
TNL Transport Network Layer
TPC Transmit Power Control
TPMI Transmitted Precoding Matrix Indicator
TR Technical Report
TRP, TRxP Transmission Reception Point
TRS Tracking Reference Signal
TRx Transceiver
TS Technical Specifications, Technical Standard
TTI Transmission Time Interval
Tx Transmission, Transmitting, Transmitter
U-RNTI UTRAN Radio Network Temporary Identity
UART Universal Asynchronous Receiver and Transmitter
UCI Uplink Control Information
UE User Equipment
UDM Unified Data Management
UDP User Datagram Protocol
UDSF Unstructured Data Storage Network Function
UICC Universal Integrated Circuit Card
UL Uplink
UM Unacknowledged Mode
UML Unified Modelling Language
UMTS Universal Mobile Telecommunications System
UP User Plane
UPF User Plane Function
URI Uniform Resource Identifier
URL Uniform Resource Locator
URLLC Ultra-Reliable and Low Latency
USB Universal Serial Bus
USIM Universal Subscriber Identity Module
USS UE-specific search space
UTRA UMTS Terrestrial Radio Access
UTRAN Universal Terrestrial Radio Access Network
UwPTS Uplink Pilot Time Slot
V2I Vehicle-to-Infrastruction
V2P Vehicle-to-Pedestrian
V2V Vehicle-to-Vehicle
V2X Vehicle-to-everything
VIM Virtualized Infrastructure Manager
VL Virtual Link,
VLAN Virtual LAN, Virtual Local Area Network
VM Virtual Machine
VNF Virtualized Network Function
VNFFG VNF Forwarding Graph
VNFFGD VNF Forwarding Graph Descriptor
VNFM VNF Manager
VoIP Voice-over-IP, Voice-over-Internet Protocol
VPLMN Visited Public Land Mobile Network
VPN Virtual Private Network
VRB Virtual Resource Block
WiMAX Worldwide Interoperability for Microwave Access
WLAN Wireless Local Area Network
WMAN Wireless Metropolitan Area Network
WPAN Wireless Personal Area Network
X2-C X2-Control plane
X2-U X2-User plane
XML eXtensible Markup Language
XRES EXpected user RESponse
XOR eXclusive OR
ZC Zadoff-Chu
ZP Zero Power Terminology For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. One or more non-transitory, computer-readable media (NTCRM) having instructions, stored thereon, that when executed cause an integrated access and backhaul (IAB) node to:
   receive route information for multiple routes between a user equipment (UE) and a core network via the IAB node;
   receive configuration information to indicate a split of a data stream of the UE between the multiple routes, wherein the configuration information indicates respective fractions of the data stream that are to be sent on respective routes;
   receive data packets of the data stream; and
   select one of the multiple routes for respective data packets based on the configuration information such that average fractions of data transmitted via the respective routes substantially match the fractions indicated by the configuration information.

2. The one or more NTCRM of claim 1, wherein the route information includes respective route identifiers for individual routes of the multiple routes.

3. The one or more NTCRM of claim 2, wherein the configuration information indicates the fractions associated with the respective route identifiers.

4. The one or more NTCRM of claim 2, wherein the instructions, when executed, further cause the IAB node to transmit the data packets with the route identifier for the selected route included in the respective data packet.

5. The one or more NTCRM of claim 4, wherein the route identifier is included in a header of the respective data packet.

6. The one or more NTCRM of claim 1, wherein the average fractions are over a predetermined time period or number of data packets.

7. The one or more NTCRM of claim 1, wherein the average fractions substantially match the fractions indicated by the configuration information if they are within a threshold of the fractions or within a rounding error of the fractions.

8. One or more non-transitory, computer-readable media (NTCRM) having instructions, stored thereon, that when executed cause an integrated access and backhaul (IAB) node to:
   receive configuration information to indicate, for a data stream associated with a routing identifier, fractions of the data stream that are to be sent over two or more respective radio links;
   receive a data packet associated with the routing identifier;
   select a first radio link of the two or more radio links based on the configuration information; and
   encode the data packet for transmission on the selected radio link such that average fractions of data associated with the routing identifier that are transmitted via the respective radio links substantially match the fractions indicated by the configuration information.

9. The one or more NTCRM of claim 8, wherein the radio links are egress radio links.

10. The one or more NTCRM of claim 8, wherein the average fractions are over a predetermined time period or number of data packets.

11. The one or more NTCRM of claim 8, wherein the average fractions substantially match the fractions indicated by the configuration information if they are within a threshold of the fractions or within a rounding error of the fractions.

* * * * *